United States Patent
Wu et al.

(10) Patent No.: US 12,528,851 B2
(45) Date of Patent: Jan. 20, 2026

(54) IL2-BASED THERAPEUTICS AND METHODS OF USE THEREOF

(71) Applicant: Regeneron Pharmaceuticals, Inc., Tarrytown, NY (US)

(72) Inventors: Jiaxi Wu, Elmsford, NY (US); Nicolin Bloch, Ossining, NY (US); Tong Zhang, New Rochelle, NY (US); Chia-Yang Lin, Scarsdale, NY (US); Samuel Davis, New York, NY (US); Eric Smith, New York, NY (US); Erica Ullman, Yorktown Heights, NY (US)

(73) Assignee: Regeneron Pharmaceuticals, Inc., Tarrytown, NY (US)

( * ) Notice: Subject to any disclaimer, the term of this patent is extended or adjusted under 35 U.S.C. 154(b) by 0 days.

(21) Appl. No.: 17/806,566

(22) Filed: Jun. 13, 2022

(65) Prior Publication Data
US 2022/0402989 A1    Dec. 22, 2022

Related U.S. Application Data

(60) Provisional application No. 63/365,375, filed on May 26, 2022, provisional application No. 63/210,111, filed on Jun. 14, 2021.

(51) Int. Cl.
| | | |
|---|---|---|
| *C07K 14/55* | (2006.01) | |
| *A61K 39/00* | (2006.01) | |
| *A61P 35/00* | (2006.01) | |
| *C07K 14/715* | (2006.01) | |
| *C07K 16/28* | (2006.01) | |

(52) U.S. Cl.
CPC ............. *C07K 14/55* (2013.01); *A61P 35/00* (2018.01); *C07K 14/7155* (2013.01); *C07K 16/2818* (2013.01); *A61K 2039/505* (2013.01); *C07K 2317/21* (2013.01); *C07K 2317/76* (2013.01); *C07K 2317/92* (2013.01); *C07K 2319/33* (2013.01)

(58) Field of Classification Search
CPC C07K 14/55; C07K 14/7155; C07K 16/2818; C07K 2317/21; C07K 2317/76; C07K 2317/92; C07K 2319/33; C07K 2317/73; C07K 2319/00; A61P 35/00; A61K 2039/505
See application file for complete search history.

(56) References Cited

U.S. PATENT DOCUMENTS

| | | | |
|---|---|---|---|
| 1,362,062 A | 12/1920 | Tilden | |
| 2,882,777 A | 4/1959 | Hirvonen | |
| 3,233,920 A | 2/1966 | Ammann | |
| 5,116,943 A | 5/1992 | Koths et al. | |
| 5,206,344 A | 4/1993 | Katre et al. | |
| 6,348,192 B1 | 2/2002 | Chan et al. | |
| 6,689,353 B1 | 2/2004 | Wang et al. | |
| 6,955,807 B1 | 10/2005 | Shanafelt et al. | |
| 6,967,092 B1 | 11/2005 | McKearn et al. | |
| 7,404,956 B2 | 7/2008 | Peters et al. | |
| 8,012,465 B2 | 9/2011 | Elias et al. | |
| 8,124,084 B2 | 2/2012 | Lefrancois et al. | |
| 8,349,311 B2 | 1/2013 | Wittrup et al. | |
| 8,734,774 B2 | 5/2014 | Frelinger et al. | |
| 8,809,504 B2 | 8/2014 | Lauermann | |
| 8,945,571 B2 | 2/2015 | Mössner et al. | |
| 9,206,243 B2 | 12/2015 | Monzón et al. | |
| 9,266,938 B2 | 2/2016 | Ast et al. | |
| 9,359,415 B2 | 6/2016 | Alvarez et al. | |
| 9,447,159 B2 | 9/2016 | Ast et al. | |
| 9,931,413 B2 | 4/2018 | Chang et al. | |
| 9,987,500 B2 * | 6/2018 | Papadopoulos ........... A61P 3/10 |
| 10,174,091 B1 | 1/2019 | Higginson-Scott et al. | |
| 10,174,092 B1 | 1/2019 | Higginson-Scott et al. | |
| 10,407,481 B2 | 9/2019 | Alvarez | |
| 10,464,993 B2 | 11/2019 | Lefrancois et al. | |
| 10,633,453 B2 | 4/2020 | Cheng et al. | |
| 10,696,724 B2 | 6/2020 | Winston et al. | |
| 10,787,494 B2 | 9/2020 | Struthers et al. | |
| 10,946,068 B2 | 3/2021 | Higginson-Scott et al. | |
| 10,961,310 B2 | 3/2021 | Viney et al. | |
| 11,225,520 B2 | 1/2022 | Novina et al. | |
| 11,352,403 B2 | 6/2022 | Winston et al. | |
| 2007/0036752 A1 | 2/2007 | Gillies et al. | |

(Continued)

FOREIGN PATENT DOCUMENTS

| | | |
|---|---|---|
| CA | 3098653 A1 | 11/2019 |
| EP | 3596108 A1 | 1/2020 |

(Continued)

OTHER PUBLICATIONS

Chen X, Xu J, Guo Q, et al. Therapeutic efficacy of an anti-PD-L1 antibody based immunocytokine in a metastatic mouse model of colorectal cancer. Biochem Biophys Res Commun. 2016;480(2):160-165. doi: 10.1016/j.bbrc.2016.10.011 (Year: 2016).*

Könitzer JD, Sieron A, Wacker A, Enenkel B. Reformatting Rituximab into Human IgG2 and IgG4 Isotypes Dramatically Improves Apoptosis Induction In Vitro. PLoS One. 2015; 10(12):e0145633. Published Dec. 29, 2015. doi: 10.1371/journal.pone.0145633 (Year: 2015).*

Chen X, Zaro JL, Shen WC. Fusion protein linkers: property, design and functionality. Adv Drug Deliv Rev. 2013;65(10): 1357-1369. doi: 10.1016/j.addr.2012.09.039 (Year: 2013).*

Konitzer et al., Reformatting Rituximab into Human IgG2 and IgG4 Isotypes Dramatically Improves Apoptosis Induction In Vitro, 2015, PLOS One, vol. 10, Issue 12, pp. 1-20 (Year: 2015).*

(Continued)

*Primary Examiner* — Jeffrey Stucker
*Assistant Examiner* — Brittney E Donoghue
(74) *Attorney, Agent, or Firm* — Fox Rothschild LLP; Aparna Patankar

(57) ABSTRACT

The present disclosure relates to a fusion protein comprising an antigen-binding moiety that binds specifically to human PD-1 and an IL2 moiety, and methods of use thereof.

44 Claims, 28 Drawing Sheets
Specification includes a Sequence Listing.

(56) References Cited

U.S. PATENT DOCUMENTS

| | | |
|---|---|---|
| 2015/0203579 A1 | 7/2015 | Papadopoulos et al. |
| 2015/0258260 A1 | 9/2015 | Tuseth |
| 2017/0216403 A1 | 8/2017 | Wittrup et al. |
| 2017/0233448 A1 | 8/2017 | Malek |
| 2017/0368169 A1 | 12/2017 | Loew et al. |
| 2018/0265584 A1 | 9/2018 | Viney et al. |
| 2018/0326010 A1 | 11/2018 | Deak et al. |
| 2019/0062395 A1 | 2/2019 | Merchant et al. |
| 2019/0119345 A1 | 4/2019 | Krupnick et al. |
| 2019/0169254 A1 | 6/2019 | Higginson-Scott et al. |
| 2019/0241638 A1 | 8/2019 | Bernett et al. |
| 2019/0359672 A1 | 11/2019 | Struthers et al. |
| 2019/0389933 A1 | 12/2019 | Bernett et al. |
| 2020/0140512 A1 | 5/2020 | Bernett et al. |
| 2020/0308242 A1 † | 10/2020 | Lowe |
| 2020/0316118 A1 | 10/2020 | Jounaidi et al. |
| 2020/0317787 A1 † | 10/2020 | Li |
| 2021/0094996 A1 | 4/2021 | Viney et al. |
| 2021/0130430 A1 † | 5/2021 | Winston |
| 2021/0238246 A1 | 8/2021 | Garcia et al. |
| 2021/0260163 A1 | 8/2021 | Yu et al. |
| 2021/0269496 A1 | 9/2021 | Rios et al. |
| 2021/0277085 A1 | 9/2021 | Higginson-Scott et al. |
| 2021/0380699 A1 | 12/2021 | Campbell et al. |
| 2021/0403524 A1 | 12/2021 | Winston et al. |
| 2022/0125884 A1 | 4/2022 | Baca et al. |
| 2022/0227837 A1 | 7/2022 | Li |
| 2022/0235133 A1 | 7/2022 | Li et al. |
| 2022/0241375 A1 | 8/2022 | Moebius et al. |
| 2022/0289806 A1 | 9/2022 | Xu et al. |
| 2022/0324933 A1 | 10/2022 | Li |
| 2022/0378933 A1 | 12/2022 | Li et al. |

FOREIGN PATENT DOCUMENTS

| | | | |
|---|---|---|---|
| EP | 3660039 A1 | 6/2020 | |
| EP | 3997115 A1 | 5/2022 | |
| EP | 3606946 B1 | 8/2022 | |
| WO | 2003048334 A2 | 6/2003 | |
| WO | 2006121168 A1 | 11/2006 | |
| WO | 2008156712 A1 | 12/2008 | |
| WO | WO-2010020766 A2 * | 2/2010 | ......... C07K 14/5418 |
| WO | 2010085495 A1 | 7/2010 | |
| WO | 2012088446 A1 | 6/2012 | |
| WO | 2013053775 A1 | 4/2013 | |
| WO | 2014153111 A2 | 9/2014 | |
| WO | WO-2016022671 A1 * | 2/2016 | ............ A61K 38/00 |
| WO | 2016164937 A2 | 10/2016 | |
| WO | 2017127514 A1 | 7/2017 | |
| WO | 2017220989 A1 | 12/2017 | |
| WO | 2018089420 A1 | 5/2018 | |
| WO | 2018170168 A1 | 9/2018 | |
| WO | 2018170288 A1 | 9/2018 | |
| WO | 2018176505 A1 | 10/2018 | |
| WO | 2018184965 A1 | 10/2018 | |
| WO | WO-2018184964 A1 * | 10/2018 | ......... A61K 38/2013 |
| WO | 2018215938 A1 | 11/2018 | |
| WO | 2018217989 A1 | 11/2018 | |
| WO | 2018226750 A1 | 12/2018 | |
| WO | 2019010224 A1 | 1/2019 | |
| WO | 2019104092 A1 | 5/2019 | |
| WO | 2019112852 A1 | 6/2019 | |
| WO | 2019112854 A1 | 6/2019 | |
| WO | 2019051127 A9 | 8/2019 | |
| WO | 2019166946 A1 | 9/2019 | |
| WO | 2019173832 A1 † | 9/2019 | |
| WO | 2019173832 A2 | 9/2019 | |
| WO | 2019191295 A1 | 10/2019 | |
| WO | 2019168791 A3 | 11/2019 | |
| WO | 2019214757 A1 | 11/2019 | |
| WO | 2020005819 A8 | 1/2020 | |
| WO | 2020020783 A1 | 1/2020 | |
| WO | 2020057645 A1 | 3/2020 | |
| WO | 2020061142 A1 | 3/2020 | |
| WO | 2020070150 A1 | 4/2020 | |
| WO | 2020127369 A1 † | 6/2020 | |
| WO | 2020132136 A1 | 6/2020 | |
| WO | 2020132138 A1 | 6/2020 | |
| WO | 2020132368 A1 | 6/2020 | |
| WO | 2020236875 A1 | 11/2020 | |
| WO | 2020242884 A1 | 12/2020 | |
| WO | 2021034890 A1 | 2/2021 | |
| WO | 2021097376 A1 | 5/2021 | |
| WO | 2021127487 A2 | 6/2021 | |
| WO | 2021127495 A1 | 6/2021 | |
| WO | 2021168192 A2 | 8/2021 | |
| WO | 2021258213 A1 | 12/2021 | |

OTHER PUBLICATIONS

Park et al., "GI101, a novel triple-trageting bispecific CD80-IgG4-IL2 variant fusion protein, elicits synergistic anti-tumor effects in preclinical models", Immunotherapy of Cancer 2019, 3(Supp 5):v500.

Ren et al., "Selective delivery of low-affinity IL-2 to PD-1+ T cells rejuvenates antitumor immunity with reduced toxicity", J Clin Invest (2022), 132(3):e153604 (13 pp).

Mullard, "Restoring IL-2 to its cancer immunotherapy glory", Nature Reviews (2021), 20:163-165.

Diab et al., "PIVOT IO 001: first disclosure of efficacy and safety of bempegaldesleukin(BEMPEG) in combination with nivolumab (NIVO) versus NIVO monotherapy in advanced melanoma (MEL)" Presented at Paris 2022 ESMO Congress, 18 pp.

Tannir et al. "LBA68-Bempegaldesleukin (BEMPEG) plus nivolumab (NIVO) compared to the investigator's choice of Sunitinib (SUN) or Cabozantinib(CABO) in previously untreated advanced renal cell carcinoma (RCC): Results from a Phase 3 randomized study (PIVOT-09)" Presented at Paris 2022 ESMO Congress, 13 pp.

Läubli et al., "ANV419, an IL-2R-ẞy targeted antibody-IL-2 fusion protein, induces selective effector cell proliferation in patients with progressed cancer", Poster 749P at ESMO Annual Meeting 2022.

"Annual Meeting on Women's Cancer®", Society of Gynecologic Onocology Annual Meeting, Phoenix, Arizona, Mar. 18-21, 2022 (17 pages).

Adusumilli et al., "A Phase I Trial of Regional Mesothelin-Targeted CAR T-cell Therapy in Patients with Malignant Pleural Disease, in Combination with the Anti-PD-1 Agent Pembrolizumab", Cancer Discov (2021), 11(11):2748-2763.

Al-Lazikani et al., "Standard Conformations for the Canonical Structures of Immunoglobulins", J. Mol. Biol. (1997), 273:927-948.

"A Study of the Effects of ALKS 4230 (Nemvaleukin Alfa) on Subjects With Solid Tumors", Alkermes, Inc., ClinicalTrials.gov Identifier: NCT02799095 (2016), available at: https://clinicaltrials.gov/ct2/show/NCT02799095 accessed on Jun. 10, 2022 (10 pages).

"Phase 3 Study of Nemvaleukin Alfa in Combination With Pembrolizumab (ARTISTRY-7)", Alkermes, Inc., ClinicalTrials.gov Identifier: NCT05092360, (2021), available at https://clinicaltrials.gov/ct2/show/NCT05092360 accessed on Jun. 10, 2022 (10 pages).

"Atara Biotherapeutics Exclusively Licenses Mesothelin-Targeted CAR T Immunotherapy for Solid Tumors," Globe Newswire (2019), available at https://investors.atarabio.com/news-events/press-releases/detail/146/atara-biotherapeutics-exclusively-licenses (4 pages).

"Atara Biotherapeutics Provides Update on ATA2271 Autologous CAR T Trial," Business Wire (2022) available at https://investors.atarabio.com/news-events/press-releases/detail/265/atara-biotherapeutics-provides-update-on-ata2271-autologous accessed on Jun. 10, 2022 (3 pages).

"Pipeline ATA2271/ATA3271," available at: https://www.atarabio.com/pipeline/ATA2271-ATA3271 accessed Jun. 10, 2022 (4 pages).

Altschul et al., "Basic Local Alignment Search Tool", J Mol Biol (1990), 215:403-10.

Altschul et al., "Gapped BLAST and PSI-BLAST: a new generation of protein database serach programs," Nucleic Acids Res. (1997), 25(17):3389-3402.

"Bayer and Atara Biotherapeutics enter strategic collaboration for next generation, mesothelin-targeted CAR-T cell therapies for solid tumors," Press release (2020) available at: https://media.bayer.com/baynews/baynews.nsf/id/Bayer-Atara-Biotherapeutics-enter-strategic-collaboration-generation-mesothelin-targeted-CAR-T (8 pages).

(56) References Cited

OTHER PUBLICATIONS

Burova et al., "Preclinical Development of the Anti-LAG-3 Antibody REGN3767: Characterization and Activity in Combination with the Anti-PD-1 Antibody Cemiplimab in Human PD-1xLAG-3-Knockin Mice", Mol Cancer Ther (2019), 18(11):2051-2062.
Card et al., "A soluble single-chain T-cell receptor IL-2 fusion protein retains MHC-restricted peptide specificity and IL-2 bioactivity", Cancer Immunol Immunother (2004), 53(4):345-57 (Abstract only).
Chen et al., "Fusion protein linkers: property, design and functionality", Adv Drug Deliv Rev. (2013), 65(10): 1357-1369.
Fontenot et al., "A function for interleukin 2 in Foxp3-expressing regulatory T cells", Nat Immunol. (2005), 6 (11):1142-51 (Abstract only).
Hernandez et al., "Sustained IL-2R signaling of limited duration by high-dose mIL-2/mCD25 fusion protein amplifies tumor-reactive CD8+ T cells to enhance antitumor immunity", Cancer Immunol Immunother (Oct. 10, 2020), 13 pp, available at https://doi.org/10.1007/s00262-020-02722-5.
Herzog et al., "Artistry-7: a Phase 3, Multicenter Study of Nemvaleukin Alfa, a Novel Engineered Cytokine, in Combination With Pembrolizumab Versus Chemotherapy in Patients With Platinum-Resistant Epithelial Ovarian, Fallopian Tube, or Primary Peritoneal Cancer", Society for Gynecologic Oncology (SGO) Annual Meeting (Mar. 18-21, 2022), Phoenix, AZ (1 page).
Imai et al., "Depletion of CD4+CD25+ regulatory T cells enhances interleukin-2-induced antitumor immunity in a mouse model of colon adenocarcinoma", Cancer Sci (2007), 98(3):416-23.
International Search Report mailed Apr. 21, 2021 for PCT/US2020/066096 (4 pages).
International Search Report mailed Jun. 28, 2021 for PCT/US2020/066086 (5 pages).
Kabat, "Sequences of Proteins of Immunological Interest," National Institutes of Health, Bethesda, Md. (1991).
Klein et al., "Cergutuzumab amunaleukin (CEA-IL2v), a CEA-targeted IL-2 variant-based immunocytokine for combination cancer immunotherapy: Overcoming limitations of aldesleukin and conventional IL-2-based immunocytokines," Oncoimmunology (2017), 6(3):e1277306 (15 pp).
Klein et al., "Design and characterization of structured protein linkers with differing flexibilities", Protein Eng Des Sel (2014), 27(10): 325-330.
Kontermann, "Strategies for extended serum half-life of protein therapeutics", Curr Opin Biotechnol (2011), 22 (6):868-76 (Abstract only).
Krieg et al., "Improved IL-2 immunotherapy by selective stimulation of IL-2 receptors on lymphocytes and endothelial cells", Proc Nat Acad Sci USA (2010), 107(26):11906-11.
Lefranc et al., "IMGT unique numbering for immunoglobulin and T cell receptor variable domains and Ig superfamily V-like domains", Dev Comp Immunol (2003), 27(1):55-77 (Abstract only).
Liparoto et al., "Analysis of the role of the interleukin-2 receptor gamma chain in ligand binding", Biochemistry (2002), 41(8):2543-51.
Martin et al., "Modeling antibody hypervariable loops: A combined algorithm", Proc. Natl. Acad. Sci. USA (1989), 86:9268-9272.
Matulonis et al., "Final results from the KEYNOTE-100 trial of pembrolizumab in patients with advanced recurrent ovarian cancer", J Clin Oncol (2020), 38(Supp 15):6005.
Memorial Sloan Kettering Cancer Center, "Mesothelin-targeted CAR T-cell Therapy in Patients With Mesothelioma" ClinicalTrials.gov Identifier: NCT04577326 (2020), available at https://clinicaltrials.gov/ct2/show/NCT04577326 accessed on Jun. 10, 2022 (9 pages).
Meyers et al., "Optimal alignments in linear space", Comput. Appl. Biosci. (1988), 4:11-17.
Millington et al., "Effects of an agonist interleukin-2/Fc fusion protein, a mutant antagonist interleukin-15/Fc fusion protein, and sirolimus on cardiac allograft survival in non-human primates", J Heart Lung Transplant (2012), 31 (4):427-35.

Needleman et al., "A general method applicable to the search for similarities in the amino acid sequnce of two proteins", J. Mol. Biol. (1970), 48(3):444-453 (Abstract only).
Pearson, "Using the FASTA program to search protein and DNA sequence databases", Methods Mol. Biol. (1994), 24: 307-331.
Puskas et al., " Development of an attenuated interleukin-2 fusion protein that can be activated by tumour-expressed proteases", Immunology (2011), 133(2):206-20.
Taniguchi et al., "Structure and expression of a cloned cDNA for human interleukin-2", Nature (1983), 302 (5906):305-10 (Abstract only).
Taylor et al., "A transgenic mouse that expresses a diversity of human sequence heavy and light chain Immunoglobulins", Nucl. Acids Res. (1992), 20(23):6287-6295.
TCR2 Therapeutics, "The Power of Tomorrow: Engaging the TCR to Transform the Treatment of Solid Tumors", Corporate Presentation (2022) (22 pages).
Waldmann, "The biology of interleukin-2 and interleukin-15: Implications for cancer therapy and vaccine design", Nat Rev Immunol (2006), 6(8):595-601 (Abstract only).
Ward et al., "IL-2/CD25: A Long-Acting Fusion Protein That Promotes Immune Tolerance by Selectively Targeting the IL-2 Receptor on Regulatory T Cells", J Immunol (2018), 201(9):2579-2592.
Weidle et al., "TCR-MHC/peptide interaction: prospects for new anti-tumoral agents", Cancer Genomics Proteomics (2014), 11(6):267-77.
Weigel et al., "Mutant proteins of human interleukin 2. Renaturation yield, proliferative activity and receptor binding", Eur J Biochem (1989), 180(2):295-300.
Winer et al., "347 Clinical outcomes of ovarian cancer patients treated with ALKS 4230, a novel engineered cytokine, In combination with pembrolizumab: ARTISTRY-1 trial", J ImmunoTherapy Can (2020), 8(Supp 3):doi: 10.1136/itc-2020-SITC2020.0347 (Abstract only).
Winer et al., "Clinical outcomes of ovarian cancer patients treated with the novel engineered cytokine nemvaleukin alfa in combination with the PD-1 inhibitor pembrolizumab: recent data from Artistry-1", Society for Gynecologic Oncology (SGO) Annual Meeting (Mar. 18-21, 2022), Phoenix, AZ (17 Pages).
Wrangle et al., "IL-2 and Beyond in Cancer Immunotherapy", J Interferon Cytokine Res (2018), 38(2):45-68.
Arenas-Ramirez et al., "Interleukin-2: Biology, Design and Application" Trends Immunology (2015), 36(12): 763-777.
Anonomous, "Agonist" Biology Dictionary (2017) 4 pp.
Carmenate et al., "Human IL-2 Mutein with Higher Antitumor Efficacy Than Wild Type IL-2" J Immunol (2013), 190: 6230-6238.
Casadesús et al., "A rationally-engineered IL-2 improves the antitumor effect of anti-CD20 therapy" OncoImmunology (2020), 9(1): 1-12.
Hernandez et al., "Amplification of neoantigen-specific antitumor responses using a long-lasting IL-2 fusion protein" J Immunol (2020), 204 (1 Supplement): 239.9.
Hutmacher et al., "Targeted Delivery of IL2 to the Tumor Stroma Potentiates the Action of Immune Checkpoint Inhibitors by Preferential Activation of NK and CD8+ T Cells" Cancer Immunol Res. (2019), 7(4): 572-583.
International Search Report mailed Apr. 21, 2021 for PCT/US2020/066096.
International Search Report mailed Jun. 28, 2021 for PCT/US2020/066086.
Kosmac et al., "KY1043, a novel CD25-directed PD-L1 IL-2 immunocytokine, delivers potent anti-tumor activity in vivo via an expansion of a Tcf1hi PD-1+ CD8+ T cell population" Poster (2020).
Lopes et al., "ALKS 4230: a novel engineered IL-2 fusion protein with an improved cellular selectivity profile for cancer immunotherapy" J Immunother Cancer. (2020), 8(1): e000673 (13 pp.).
Malek et al., "Interleukin-2 Receptor Signaling: At the Interface between Tolerance and Immunity" Immunity (2010 ), 33: 153-65.
Mansurov et al., "Masking the immunotoxicity of interleukin-12 by fusing it with a domain of its receptor via a tumor-protease-cleavable linker" Nature Biomedical Engineering (2022), 6: 819-29.

(56) References Cited

OTHER PUBLICATIONS

Melder et al., "Pharmacokinetics and in vitro and in vivo anti-tumor response of an interleukin-2-human serum albumin fusion protein in mice" Cancer Immunol Immunother (2005), 54(6): 535-47.

Quayle et al., "CUE-101, a Novel E7-pHLA-IL2-Fc Fusion Protein, Enhances Tumor Antigen-Specific T-Cell Activation for the Treatment of HPV16-Drive Malignancies" Clin Cancer Res. (2020), 26(8): 1953-64.

Soriano et al., "A novel engineered fusion protein effectively targets and expands disease specific anti-tumor T-cells," The Essential Protein Engineering & Cell Therapy Summit Boston (2019), poster.

Stauber et al., "Crystal structure of the II-2 signaling complex: Paradigm for a heterotrimeric cytokine receptor" PNAS (2005) 103(8):2788-93.

Stoklasek et al., "Combined IL-15/IL-15R? Immunotherapy Maximizes IL-15 Activity In Vivo" J Immunol. (2006), 177(9):6072-80.

Sun et al., "A next-generation tumor-targeting IL-2 preferentially promotes tumor-infiltrating CD8+ T-cell response and effective tumor control" Nature Communications (2019), 10:3874.

Van Krinks et al., "KY1043, a novel PD-L1 IL-2 immunocytokine directed towards CD25, delivers potent anti-tumour activity in vitro and in vivo," Society for Immunotherapy of Cancer (SITC) (2019), Poster.

Vidarsson et al., "IgG subclasses and allotypes: from structure to effector functions" Frontiers in Immunology (2014), 5(520):1-17.

Wang et al., "IgG Fc engineering to modulate antibody effector functions" Protein Cell (2018), 9(1):63-73.

De Weerd et al., "The interferons and their receptors—distribution and regulation" Immunol Cell Biol. (2012), 90:483-91.

Written Opinion mailed May 17, 2022 for PCT/US2020/066086.

Written Opinion mailed May 17, 2022 for PCT/US2020/066096.

International Search Report and Written Opinion issued Sep. 2, 2022 for PCT/US2022/072895 (17 pp.).

Penichet et al., "Antibody-IL-2 fusion proteins: a novel strategy for immune protection", Human Antibodies (1997), 8 (3):106-118.

Cheung et al., "Antibody-IL-2 fusion proteins: a novel strategy for immune protection", Proceedings of the National Academy of Sciences (2019), 116(8):3100-3105.

Floudas et al., "A Pilot Study of the PD-1 Targeting Agent AMP-224 Used With Low-Dose Cyclophosphamide and Stereotactic Body Radiation Therapy in Patients With Metastatic Colorectal Cancer," Clin. Colorectal Cancer, 18(4): e349-e360 (epub Jul. 2, 2019).

\* cited by examiner
† cited by third party

IL2-BASED THERAPEUTICS AND METHODS OF USE THEREOF

CROSS-REFERENCE TO RELATED APPLICATIONS

This application claims the benefit of priority to U.S. Provisional Patent Application No. 63/210,111 filed Jun. 14, 2021, and U.S. Provisional Patent Application No. 63/365,375 filed May 26, 2022, the disclosures of all of which are hereby incorporated by reference herein in their entireties.

FIELD

The present disclosure relates generally to IL2-based therapeutics and methods of use thereof and more specifically to a fusion protein comprising an IL2 moiety and an antigen-binding moiety that binds specifically to human PD-1 as well as methods of use thereof.

BACKGROUND

Interleukin 2 (IL-2 or IL2) is a pluripotent cytokine produced primarily by activated T cells. It stimulates the proliferation and differentiation of T cells, induces the generation of cytotoxic T lymphocytes (CTLs) and the differentiation of peripheral blood lymphocytes to cytotoxic cells and lymphokine-activated killer (LAK) cells, promotes cytokine and cytolytic molecule expression by T cells, facilitates the proliferation and differentiation of B-cells and the synthesis of immunoglobulin by B-cells, and stimulates the generation, proliferation, and activation of natural killer (NK) cells (see Waldmann, 2006, Nat Rev Immunol 6:595-601 and Malek, 2008, Annu Rev Immunol 26:453-79). IL2 is involved in the maintenance of peripheral CD4+CD25+ regulatory T (Treg) cells (see, e.g., Fontenot et al., 2005, Nature Immunol 6:1142-51), which are also known as suppressor T cells. They suppress effector T cells from destroying their (self-)target, either through cell-cell contact by inhibiting T cell help and activation or through release of immunosuppressive cytokines such as IL-10 or TGFβ. Depletion of Treg cells was shown to enhance IL2-induced anti-tumor immunity (Imai et al., 2007, Cancer Sci 98:416-23).

However, IL2 is not optimal for inhibiting tumor growth due to its pleiotropic effects. The use of IL2 as an antineoplastic agent has been limited by the serious toxicities that accompany the doses necessary for a tumor response. Proleukin® (marketed by Prometheus Laboratories, San Diego, Calif.) is a recombinant form of IL2 that is approved for the treatment of metastatic melanoma and metastatic renal cancer, but its side effects are so severe that its use is only recommended in a hospital setting with access to intensive care. The major side effect of IL2 therapy is vascular leak syndrome (VLS), which leads to the accumulation of interstitial fluid in the lungs and liver, resulting in pulmonary edema and liver damage. There is no treatment for VLS other than withdrawal of IL2. It has been shown that IL2-induced pulmonary edema resulted from direct binding of IL2 to lung endothelial cells, which express low to intermediate levels of functional high-affinity IL2 receptors (Krieg et al., 2010, Proc Nat Acad Sci USA 107:11906-11). Despite the general acceptance in the field of CD122 directed IL2 therapies being developed for cancer therapy, it has been surprisingly discovered that such molecules have poor therapeutic indices for cancer therapy, with high, toxic doses required to confer modest anti-cancer effects.

Thus, there is a pressing need in the art for novel IL2 therapies with improved therapeutic efficacy and safety profiles.

SUMMARY

This disclosure addresses one or more of the needs mentioned above. The fusion proteins of the present disclosure comprise an antigen-binding moiety that specifically binds to human PD-1, which targets tumor-reactive T cells. The antigen-binding moiety is helpful in selectively reconstituting activity on tumor-reactive T cells. The fusion proteins further comprise an IL2 moiety wherein the IL2 moiety comprises IL2 bound to IL2Rα. In certain embodiments, the fusion proteins comprise an unmodified IL2 sequence. In certain embodiments, the fusion proteins retain an ability to engage endogenous IL2Rα. The fusion protein comprises the IL2 moiety in a trans-sequestered conformation. This maintains engagement with activated CD8+ T cells; however, the bound configuration of the IL2 moiety helps in masking of the IL2 and attenuating its activity, thus leading to reduced systemic toxicity. For example, the fusion proteins of the present disclosure do not induce acute pulmonary edema (vascular leakage) in mice as compared to wild-type IL2. The fusion proteins of the present disclosure provide enhanced anti-tumor efficacy and improved therapeutic index as compared to IL2 alone or in combination with a PD-1 inhibitor (e.g., an anti-PD-1 antibody or antigen-binding fragment thereof).

In one aspect, the disclosed technology relates to a fusion protein including: (i) an antigen-binding moiety that binds specifically to human programmed cell death protein 1 (PD-1) and (ii) an interleukin 2 (IL2) moiety. In some embodiments, the antigen-binding moiety includes an antibody or antigen-binding fragment thereof that binds specifically to human PD-1. In some embodiments, the antibody or antigen-binding fragment thereof that binds to human PD-1 is a human monoclonal antibody. In some embodiments, the antigen-binding moiety includes three heavy chain complementarity determining regions (HCDRs) (HCDR1, HCDR2, and HCDR3) and three light chain CDRs (LCDR1, LCDR2, and LCDR3), wherein: HCDR1 includes an amino acid sequence of SEQ ID NO: 43, 4, or 24; HCDR2 includes an amino acid sequence of SEQ ID NO: 45, 6, or 26; HCDR3 includes an amino acid sequence of SEQ ID NO: 47, 8, or 28; LCDR1 includes an amino acid sequence of SEQ ID NO: 12 or 32; LCDR2 includes an amino acid sequence of SEQ ID NO: 14; and LCDR3 includes an amino acid sequence of SEQ ID NO: 16 or 35.

In some embodiments, the antigen-binding moiety includes HCDR1, HCDR2, HCDR3, LCDR1, LCDR2, and LCDR3 including respective amino acid sequences of (i) SEQ ID NOs: 43, 45, 47, 12, 14, and 16; (ii) SEQ ID NOs: 4, 6, 8, 12, 14, and 16; or (iii) SEQ ID NOs: 24, 26, 28, 32, 14, and 35. In some embodiments, the antigen-binding moiety includes HCDR1, HCDR2, HCDR3, LCDR1, LCDR2, and LCDR3 including respective amino acid sequences of SEQ ID NOs: 43, 45, 47, 12, 14, and 16. In some embodiments, the antigen-binding moiety includes a heavy chain variable region (HCVR) including an amino acid sequence of SEQ ID NO: 41, 2, or 22; and a light chain variable region (LCVR) including an amino acid sequence of SEQ ID NO: 10 or 30. In some embodiments, the HCVR includes the amino acid sequence of SEQ ID NO: 2 and the LCVR includes the amino acid sequence of SEQ ID NO: 10. In some embodiments, the HCVR includes the amino acid sequence of SEQ ID NO: 22 and the LCVR includes the amino acid sequence of SEQ ID NO: 30. In some embodiments, the HCVR includes the amino acid sequence of SEQ ID NO: 41 and the LCVR includes the amino acid sequence of SEQ ID NO: 10. In some embodiments, the antigen-binding moiety includes a heavy chain constant region of SEQ ID NO: 55 and a light chain constant region of SEQ ID NO: 56. In some embodiments, the antigen-binding moiety includes a heavy chain and a light chain wherein the heavy chain includes an amino acid sequence of SEQ ID NO: 61, 57, or 59 and the light chain includes an amino acid sequence of SEQ ID NO: 62, 58, or 60. In some embodiments, the antigen-binding moiety includes a heavy chain/light chain sequence pair of SEQ ID NOs: 61/62, 57/58, or 59/60.

In some embodiments, the antigen-binding moiety includes a heavy chain/light chain sequence pair of SEQ ID NOs: 61/62. In some embodiments, the IL2 moiety includes (i) IL2 or a fragment thereof; and (ii) IL2 receptor alpha (IL2Rα) or a fragment thereof. In some embodiments, the IL2 or fragment thereof is human IL2 (hIL2) or a fragment thereof. In some embodiments, the IL2Rα or fragment thereof is human IL2Rα (hIL2Rα) or a fragment thereof. In some embodiments, the IL2 or fragment thereof includes the amino acid sequence of SEQ ID NO: 53. In some embodiments, the IL2Rα or fragment thereof includes the amino acid sequence of SEQ ID NO: 51. In some embodiments, the IL2 or fragment thereof is connected to the C-terminal of the IL2Rα or fragment thereof via a linker. In some embodiments, the IL2 moiety is connected to the C-terminal of the heavy chain constant region of the antigen-binding moiety via a linker. In some embodiments, the linker includes an amino acid sequence of one or more repeats of GGGGS (SEQ ID NO: 67). In some embodiments, the linker includes an amino acid sequence of SEQ ID NO: 50 or 52. In some embodiments, the IL2 moiety includes the amino acid sequence of SEQ ID NO: 54.

In another aspect, the disclosed technology relates to a fusion protein including: (i) a first polypeptide including a light chain variable region (LCVR) of a human antibody that binds specifically to human PD-1; and (ii) a second polypeptide that includes (a) a heavy chain variable region (HCVR) of the antibody that binds specifically to human PD-1 and (b) an IL2 moiety. In some embodiments, the HCVR includes three heavy chain complementarity determining regions (HCDRs) (HCDR1, HCDR2, and HCDR3) and the LCVR includes three light chain CDRs (LCDR1, LCDR2, and LCDR3), wherein: HCDR1 includes an amino acid sequence of SEQ ID NO: 43, 4, or 24; HCDR2 includes an amino acid sequence of SEQ ID NO: 45, 6, or 26; HCDR3 includes an amino acid sequence of SEQ ID NO: 47, 8, or 28; LCDR1 includes an amino acid sequence of SEQ ID NO: 12 or 32; LCDR2 includes an amino acid sequence of SEQ ID NO: 14; and LCDR3 includes an amino acid sequence of SEQ ID NO: 16 or 35. In some embodiments, the HCDR1, HCDR2, HCDR3, LCDR1, LCDR2 and LCDR3 including amino acid sequences of (i) SEQ ID NOs: 43, 45, 47, 12, 14, and 16; (ii) SEQ ID NOs: 4, 6, 8, 12, 14, and 16; or (iii) SEQ ID NOs: 24, 26, 28, 32, 14 and 35. In some embodiments, the HCDR1, HCDR2, HCDR3, LCDR1, LCDR2 and LCDR3 include the amino acid sequences of SEQ ID NOs: 43, 45, 47, 12, 14, and 16, respectively.

In some embodiments, the HCVR and the LCVR include amino acid sequences of (i) SEQ NOs: 41 and 10; (ii) SEQ ID NOs: 2 and 10; or (iii) SEQ ID NOs: 22 and 30. In some embodiments, the first polypeptide includes a light chain constant region linked to the LCVR. In some embodiments, the light chain constant region includes an amino acid sequence of SEQ ID NO: 56. In some embodiments, the second polypeptide includes a heavy chain constant region linked to the HCVR and wherein the IL2 moiety is linked to the C-terminal of the heavy chain constant region. In some embodiments, the heavy chain constant region includes an amino acid sequence of SEQ ID NO: 55. In some embodiments, the first polypeptide includes a light chain sequence of SEQ ID NO: 62, 58, or 60. In some embodiments, the second polypeptide includes a heavy chain sequence of SEQ ID NO: 61, 57, or 59.

In some embodiments, the fusion protein includes a heavy chain/light chain sequence pair of SEQ ID NOs: 61/62, 57/58, or 59/60. In some embodiments, the fusion protein includes a heavy chain/light chain sequence pair of SEQ ID NOs: 61/62. In some embodiments, the IL2 moiety includes (i) IL2 or a fragment thereof; and (ii) IL2Rα or a fragment thereof. In some embodiments, the IL2 moiety is connected to the C-terminal of the heavy chain constant region via a linker. In some embodiments, the IL2 or fragment thereof is connected to the C-terminal of IL2Rα or fragment thereof via a linker. In some embodiments, the IL2 or fragment thereof is human IL2 (hIL2) or a fragment thereof. In some embodiments, the IL2Rα or fragment thereof is human IL2Rα (hIL2Rα) or a fragment thereof. In some embodiments, the IL2 or fragment thereof includes the amino acid sequence of SEQ ID NO: 53. In some embodiments, the IL2Rα or fragment thereof includes the amino acid sequence of SEQ ID NO: 51. In some embodiments, the linker includes an amino acid sequence of one or more repeats of GGGGS (SEQ ID NO: 67). In some embodiments, the linker includes an amino acid sequence of SEQ ID NO: 50 or 52. In some embodiments, the IL2 moiety includes the amino acid sequence of SEQ ID NO: 54. In some embodiments, the first polypeptide includes the amino acid sequence of SEQ ID NO: 62, 58, or 60.

In some embodiments, the second polypeptide includes the amino acid sequence of SEQ ID NO: 63, 64, or 65. In some embodiments, the first polypeptide includes the amino acid sequence of SEQ ID NO: 58 and the second polypeptide includes the amino acid sequence of SEQ ID NO: 64. In some embodiments, the first polypeptide includes the amino acid sequence of SEQ ID NO: 60 and the second polypeptide includes the amino acid sequence of SEQ ID NO: 63. In some embodiments, the first polypeptide includes the amino acid sequence of SEQ ID NO: 62 and the second polypeptide includes the amino acid sequence of SEQ ID NO: 65. In some embodiments, the fusion protein forms a dimeric fusion protein. In some embodiments, the fusion protein dimerizes through their respective heavy chain constant regions.

In some embodiments, the fusion protein does not cross-compete with REGN2810, pembrolizumab or nivolumab for binding to PD-1. In some embodiments, the fusion protein exhibits reduced activity in activating human IL2Rα/β/γ and IL2Rβ/γ complexes as compared to IL2. In some embodiments, the fusion protein exhibits increased activity in activating human IL2Rα as compared to a non-targeted IL2Rα-IL2. In some embodiments, the fusion protein exhibits increased activity in stimulating T cells as measured by a level of IFN-γ release as compared to a wild-type human IL2. In some embodiments, the fusion protein exhibits attenuated binding to IL2Rα, IL2Rβ and IL2Rγ.

In another aspect, the disclosed technology relates to a nucleic acid or plurality of nucleic acids including a polynucleotide sequence encoding a fusion protein disclosed herein. In another aspect, the disclosed technology relates to vector including a nucleic acid or plurality of nucleic acids disclosed herein. In another aspect, the disclosed technology relates to a host cell including a nucleic acid or plurality of nucleic acids or a vector disclosed herein. In some embodiments, the host cell expresses a first vector including a polynucleotide sequence that encodes the first polypeptide of a fusion protein disclosed herein and a second vector including a polynucleotide sequence that encodes the second polypeptide of a fusion protein disclosed herein.

In another aspect, the disclosed technology relates to a method of producing a fusion protein disclosed herein, including culturing a host cell disclosed herein under conditions permitting production of the fusion protein or fragment, and recovering the fusion protein or fragment thereof so produced.

In another aspect, the disclosed technology relates to a pharmaceutical composition including a fusion protein disclosed herein. In some embodiments, the pharmaceutical composition further includes an anti-PD-1 antibody or antigen-binding fragment thereof. In some embodiments, the anti-PD-1 antibody or antigen-binding fragment thereof does not cross-compete with the fusion protein for binding to PD-1.

In another aspect, the disclosed technology relates to a method of treating cancer, including administering to a subject in need thereof a therapeutically effective amount of a fusion protein or pharmaceutical composition disclosed herein. In some embodiments, the method includes administering to the subject the fusion protein in an amount of 0.005 mg/kg to 10 mg/kg of the subject's body weight. In some embodiments, the method further includes administering a second therapeutic agent or therapy to the subject.

BRIEF DESCRIPTION OF THE FIGURES

FIGS. 1A and 1B show tumor volume (mm$^3$) (FIG. 1A) and percent survival (FIG. 1B) of isotype control Ab, isotype control-hIL2Rα-IL2+anti-PD-1, REGN10486+Isotype control Ab treated mice. FIGS. 1C and 1D show tumor volume (mm$^3$) (FIG. 1C) and percent survival (FIG. 1D) of Isotype control, REGN10486, REGN10595, and REGN10597 treated mice.

DETAILED DESCRIPTION

Figure 1A:
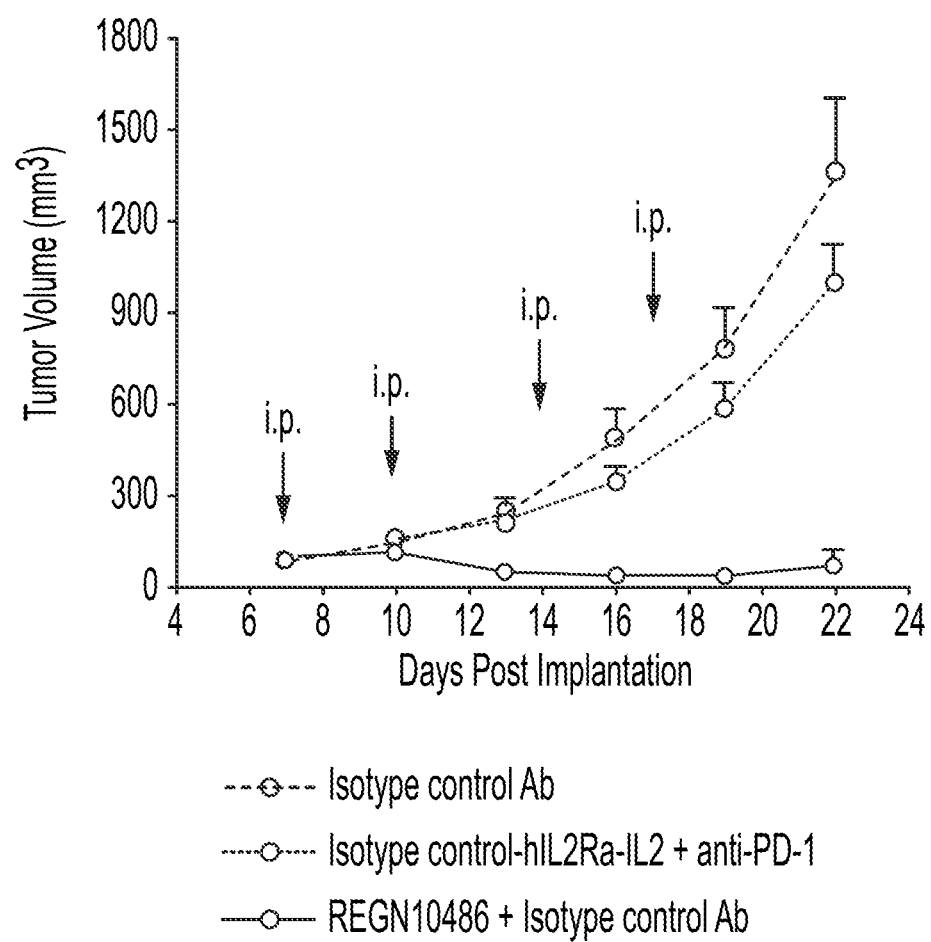
FIGS. 1A, 1B, 1C, and 1D are graphs showing the results of an in vivo study as described in Example 6.

It is to be understood that the present disclosure is not limited to the particular methods and experimental conditions described, as such methods and conditions may vary. It is also to be understood that the terminology used herein is for the purpose of describing particular embodiments only, and is not intended to be limiting, and that the scope of the present disclosure will be limited only by the appended claims. Unless defined otherwise, all technical and scientific terms used herein have the same meaning as commonly understood by one of ordinary skill in the art to which this disclosure belongs. Although any methods and materials similar or equivalent to those described herein can be used in the practice or testing of the present disclosure, preferred methods and materials are now described. All publications mentioned herein are hereby incorporated by reference in their entirety unless otherwise stated.

Fusion Proteins

In one aspect, this disclosure provides a fusion protein comprising: (i) an antigen-binding moiety that binds specifically to human PD-1, and (ii) an IL2 moiety. The disclosed fusion protein is surprisingly effective in stimulating T cells and inhibiting tumor growth as compared to an anti-hPD1 antibody (such as REGN2810). In certain embodiments, the fusion protein exhibits a better safety profile as compared to an anti-PD-1-targeted IL2 molecule (such as REGN13233).

The disclosed fusion protein can be monomers or multimers, e.g., dimers (homodimers or heterodimers) or high order complexes. For simplicity, the fusion proteins that are homodimers (or higher order multimers of the same polypeptide) are described by their constituent monomers; however, upon recombinant expression of the component monomers in a suitable cell line, a homodimeric (or higher order multimer) molecule can be produced.

In some embodiments, the antigen-binding moiety comprises an antibody or antigen-binding fragment thereof that binds specifically to human PD-1. In some embodiments, the antigen-binding moiety that binds to human PD-1 is a human monoclonal antibody.

As used herein, the term "antibody" refers to an immunoglobulin molecule comprised of four polypeptide chains, two heavy (H) chains and two light (L) chains inter-connected by disulfide bonds (i.e., "full antibody molecules"), as well as a multimer thereof (e.g., IgM) or antigen-binding fragments thereof. Each heavy chain is comprised of a heavy chain variable region ("HCVR" or "VH") and a heavy chain constant region (comprised of domains CH1, CH2, and CH3). Each light chain is comprised of a light chain variable region ("LCVR or "VL") and a light chain constant region (CL). The VH and VL regions can be further subdivided into regions of hypervariability, termed complementarity determining regions (CDR), interspersed with regions that are more conserved, termed framework regions (FR). Each VH and VL is composed of three CDRs and four FRs, arranged from amino-terminus to carboxy-terminus in the following order: FR1, CDR1, FR2, CDR2, FR3, CDR3, FR4. In some embodiments, the FRs of the antibody (or antigen-binding fragment thereof) may be identical to the human germline sequences or may be naturally or artificially modified. An amino acid consensus sequence may be defined based on a side-by-side analysis of two or more CDRs. The term "antibody," as used herein, also includes antigen-binding fragments of full antibody molecules.

As used herein, the terms "antigen-binding fragment" of an antibody, "antigen-binding portion" of an antibody, and the like, include any naturally occurring, enzymatically obtainable, synthetic, or genetically engineered polypeptide or glycoprotein that specifically binds an antigen to form a complex. Antigen-binding fragments of an antibody may be derived, e.g., from full antibody molecules using any suitable standard techniques such as proteolytic digestion or recombinant genetic engineering techniques involving the manipulation and expression of DNA encoding antibody variable and optionally constant domains. Such DNA is known and/or is readily available from, e.g., commercial sources, DNA libraries (including, e.g., phage-antibody libraries), or can be synthesized. The DNA may be sequenced and manipulated chemically or by using molecular biology techniques, for example, to arrange one or more variable and/or constant domains into a suitable configuration, or to introduce codons, create cysteine residues, modify, add or delete amino acids, etc.

Non-limiting examples of antigen-binding fragments include: (i) Fab fragments; (ii) F(ab')2 fragments; (iii) Fd fragments; (iv) Fv fragments; (v) single-chain Fv (scFv) molecules; (vi) dAb fragments; and (vii) minimal recognition units consisting of the amino acid residues that mimic the hypervariable region of an antibody (e.g., an isolated complementarity determining region (CDR) such as a CDR3 peptide), or a constrained FR3-CDR3-FR4 peptide. Other engineered molecules, such as domain-specific antibodies, single domain antibodies, domain-deleted antibodies, chimeric antibodies, CDR-grafted antibodies, diabodies, triabodies, tetrabodies, minibodies, nanobodies (e.g., monovalent nanobodies, bivalent nanobodies, etc.), small modular immunopharmaceuticals (SMIPs), and shark variable IgNAR domains, are also encompassed within the expression "antigen-binding fragment," as used herein.

An antigen-binding fragment of an antibody will typically comprise at least one variable domain. The variable domain may be of any size or amino acid composition and will generally comprise at least one CDR adjacent to or in frame with one or more framework sequences. In antigen-binding fragments having a $V_H$ domain associated with a $V_L$ domain, the $V_H$ and $V_L$ domains may be situated relative to one another in any suitable arrangement. For example, the variable region may be dimeric and contain $V_H$-$V_H$, $V_H$-$V_L$ or $V_L$-$V_L$ dimers. Alternatively, the antigen-binding fragment of an antibody may contain a monomeric $V_H$ or $V_L$ domain.

In some embodiments, an antigen-binding fragment of an antibody may contain at least one variable domain covalently linked to at least one constant domain. Non-limiting, exemplary configurations of variable and constant domains that may be found within an antigen-binding fragment of an antibody of the present disclosure include: (i) $V_H$-$C_H1$; (ii) $V_H$—$C_H2$; (iii) $V_H$-$C_H3$; (iv) $V_H$-$C_H1$-$C_H2$; (v) $V_H$-$C_H1$-$C_H2$-$C_H3$; (vi) $V_H$-$C_H2$-$C_H3$; (vii) $V_H$-$C_L$; (viii) $V_L$-$C_H1$; (ix) $V_L$-$C_H2$; (x) $V_L$-$C_H3$; (Xi) $V_L$-$C_H1$-$C_H2$; (xii) $V_L$-$C_H1$-$C_H2$-$C_H3$; (Xiii) $V_L$-$C_H2$- $C_H3$; and (xiv) $V_L$-$C_L$. In any configuration of variable and constant domains, including any of the exemplary configurations listed above, the variable and constant domains may be either directly linked to one another or may be linked by a full or partial hinge or linker region. A hinge region may consist of at least 2 (e.g., 5, 10, 15, 20, 40, 60 or more) amino acids which result in a flexible or semi-flexible linkage between adjacent variable and/or constant domains in a single polypeptide molecule. Moreover, an antigen-binding fragment of an antibody of the present disclosure may comprise a homo-dimer or heterodimer (or other multimer) of any of the variable and constant domain configurations listed above in non-covalent association with one another and/or with one or more monomeric $V_H$ or $V_L$ domain (e.g., by disulfide bond(s)).

The antibodies or antigen-binding fragments thereof comprised in the fusion proteins disclosed herein may be human antibodies or antigen-binding fragments thereof. As used herein, the term "human antibody" refers to antibodies having variable and constant regions derived from human germline immunoglobulin sequences. The human antibodies or antigen-binding fragments thereof that are comprised in the fusion proteins of the present disclosure may nonetheless include amino acid residues not encoded by human germline immunoglobulin sequences (e.g., mutations introduced by random or site-specific mutagenesis in vitro or by somatic mutation in vivo), for example, in the CDRs and, in particular, CDR3. However, the term "human antibody," as used herein, is not intended to include antibodies in which CDR sequences derived from the germline of another mammalian species, such as a mouse, have been grafted onto human framework sequences.

The antibodies comprised in the fusion proteins disclosed herein may be recombinant human antibodies. As used herein, the term "recombinant human antibody" includes all human antibodies that are prepared, expressed, created or isolated by recombinant means, such as antibodies expressed using a recombinant expression vector transfected into a host cell (described further below), antibodies isolated from a recombinant, combinatorial human antibody library (described further below), antibodies isolated from an animal (e.g., a mouse) that is transgenic for human immunoglobulin genes (see, e.g., Taylor et al. (1992) Nucl. Acids Res. 20:6287-6295) or antibodies prepared, expressed, created or isolated by any other means that involves splicing of human immunoglobulin gene sequences to other DNA sequences. Such recombinant human antibodies have variable and constant regions derived from human germline immunoglobulin sequences. In some embodiments, however, such recombinant human antibodies are subjected to in vitro mutagenesis (or, when an animal transgenic for human Ig sequences is used, in vivo somatic mutagenesis), and thus the amino acid sequences of the $V_H$ and $V_L$ regions of the recombinant antibodies are sequences that, while derived from and related to human germline $V_H$ and $V_L$ sequences, may not naturally exist within the human antibody germline repertoire in vivo.

In some embodiments, the antibodies or antigen-binding fragments thereof specifically bind human PD-1. As used herein, the term "specifically binds" or the like means that an antibody or antigen-binding fragment thereof forms a complex with an antigen that is relatively stable under physiologic conditions. Methods for determining whether an antibody specifically binds to an antigen are well known in the art and include, for example, equilibrium dialysis, surface plasmon resonance, and the like. For example, an antibody that "specifically binds" human PD-1, as used in the context of the present disclosure, includes antibodies that bind human PD-1 or a portion thereof with a $K_D$ of less than about 500 nM, less than about 300 nM, less than about 200 nM, less than about 100 nM, less than about 90 nM, less than about 80 nM, less than about 70 nM, less than about 60 nM, less than about 50 nM, less than about 40 nM, less than about 30 nM, less than about 20 nM, less than about 10 nM, less than about 5 nM, less than about 4 nM, less than about 3 nM, less than about 2 nM, less than about 1 nM or less than about 0.5 nM, as measured in a surface plasmon resonance assay. An isolated antibody that specifically binds human PD-1 may, however, have cross-reactivity to other antigens, such as PD-1 molecules from other (non-human) species.

In some embodiments, the antibody or antigen-binding fragment thereof comprises three heavy chain complementarity determining regions (HCDRs) (HCDR1, HCDR2, and HCDR3) and three light chain CDRs (LCDR1, LCDR2, and LCDR3), wherein: HCDR1 comprises an amino acid sequence of SEQ ID NO: 4, 24, or 43; HCDR2 comprises an amino acid sequence of SEQ ID NO: 6, 26, or 45; HCDR3 comprises an amino acid sequence of SEQ ID NO: 8, 28, or 47; LCDR1 comprises an amino acid sequence of SEQ ID NO: 12 or 32; LCDR2 comprises an amino acid sequence of SEQ ID NO: 14; and LCDR3 comprises an amino acid sequence of SEQ ID NO: 16 or 35.

In some embodiments, the antibody or antigen-binding fragment thereof comprises HCDR1, HCDR2, HCDR3, LCDR1, LCDR2, and LCDR3 comprising respective amino acid sequences of (i) SEQ ID NOs: 4, 6, 8, 12, 14, and 16; (ii) SEQ ID NOs: 24, 26, 28, 32, 14, and 35; or (iii) SEQ ID NOs: 43, 45, 47, 12, 14, and 16.

In some embodiments, the antibody or antigen-binding fragment thereof comprises HCDR1, HCDR2, HCDR3, LCDR1, LCDR2, and LCDR3 comprising amino acid sequences of SEQ ID NOs: 43, 45, 47, 12, 14, and 16, respectively.

In some embodiments, the antibody or antigen-binding fragment thereof comprises a heavy chain variable region (HCVR) comprising an amino acid sequence of SEQ ID NO: 2, 22, or 41 or an amino acid sequence having 80%, 85%, 90%, 95%, 97%, 98% or 99% sequence identity to SEQ ID NO: 2, 22, or 41; and a light chain variable region (LCVR) comprising an amino acid sequence of SEQ ID NO: 10 or 30 or an amino acid sequence having 80%, 85%, 90%, 95%, 97%, 98% or 99% sequence identity to SEQ ID NO: 10 or 30.

In some embodiments, the antibody or antigen-binding fragment thereof comprises a HCVR comprising the amino acid sequence of SEQ ID NO: 2 or an amino acid sequence having 80%, 85%, 90%, 95%, 97%, 98% or 99% sequence identity to SEQ ID NO: 2 and a LCVR comprising the amino acid sequence of SEQ ID NO: 10 or an amino acid sequence having 80%, 85%, 90%, 95%, 97%, 98% or 99% sequence identity to SEQ ID NO: 10.

In some embodiments, the antibody or antigen-binding fragment thereof comprises a HCVR comprising the amino acid sequence of SEQ ID NO: 22 or an amino acid sequence having 80%, 85%, 90%, 95%, 97%, 98% or 99% sequence identity to SEQ ID NO:22 and a LCVR comprising the amino acid sequence of SEQ ID NO: 30 or an amino acid sequence having 80%, 85%, 90%, 95%, 97%, 98% or 99% sequence identity to SEQ ID NO: 30.

In some embodiments, the antibody or antigen-binding fragment thereof comprises a HCVR comprising the amino acid sequence of SEQ ID NO: 41 or an amino acid sequence having 80%, 85%, 90%, 95%, 97%, 98% or 99% sequence identity to SEQ ID NO: 41 and a LCVR comprising the amino acid sequence of SEQ ID NO: 10 or an amino acid sequence having 80%, 85%, 90%, 95%, 97%, 98% or 99% sequence identity to SEQ ID NO: 10.

In some embodiments, the fusion protein further comprises a heavy chain constant region of SEQ ID NO: 55 or an amino acid sequence having 80%, 85%, 90%, 95%, 97%, 98% or 99% sequence identity to SEQ ID NO: 55 and a light chain constant region of SEQ ID NO: 56 or an amino acid sequence having 80%, 85%, 90%, 95%, 97%, 98% or 99% sequence identity to SEQ ID NO: 56.

In some embodiments, the fusion protein comprises a heavy chain and a light chain wherein the heavy chain comprises an amino acid sequence of SEQ ID NO: 57, 59, or 61 or an amino acid sequence having 80%, 85%, 90%, 95%, 97%, 98% or 99% sequence identity to SEQ ID NO: 57, 59, or 61 and the light chain has an amino acid sequence of SEQ ID NO: 58, 60, or 62 or an amino acid sequence having 80%, 85%, 90%, 95%, 97%, 98% or 99% sequence identity to SEQ ID NO: 58, 60, or 62.

In some embodiments, the fusion protein comprises a heavy chain and a light chain wherein the heavy chain comprises the amino acid sequence of SEQ ID NO: 57 or an amino acid sequence having 80%, 85%, 90%, 95%, 97%, 98% or 99% sequence identity to SEQ ID NO: 57 and the light chain comprises the amino acid sequence of SEQ ID NO: 58 or an amino acid sequence having 80%, 85%, 90%, 95%, 97%, 98% or 99% sequence identity to SEQ ID NO: 58.

In some embodiments, the fusion protein comprises a heavy chain and a light chain wherein the heavy chain comprises the amino acid sequence of SEQ ID NO: 59 or an amino acid sequence having 80%, 85%, 90%, 95%, 97%, 98% or 99% sequence identity to SEQ ID NO: 59 and the light chain comprises the amino acid sequence of SEQ ID NO: 61 or an amino acid sequence having 80%, 85%, 90%, 95%, 97%, 98% or 99% sequence identity to SEQ ID NO: 61.

In some embodiments, the fusion protein comprises a heavy chain and a light chain wherein the heavy chain comprises the amino acid sequence of SEQ ID NO: 61 or an amino acid sequence having 80%, 85%, 90%, 95%, 97%, 98% or 99% sequence identity to SEQ ID NO: 61 and the light chain comprises the amino acid sequence of SEQ ID NO: 62 or an amino acid sequence having 80%, 85%, 90%, 95%, 97%, 98% or 99% sequence identity to SEQ ID NO: 62.

In some embodiments, the fusion protein comprises a heavy chain/light chain sequence pair of SEQ ID NOs: 57/58, 59/60, or 61/62. In some embodiments, the fusion protein comprises a heavy chain/light chain amino acid sequence pair of SEQ ID NOs: 61/62.

In some embodiments, the IL2 moiety comprises (i) IL2 or a fragment thereof; and (ii) IL2 receptor alpha (IL2Rα) or a fragment thereof.

In some embodiments, the IL2 moiety may include a wild type or variant IL2 domain, which is fused to an IL2 binding domain of IL-2Rα, optionally via a linker. The IL2 binding domain of IL-2Rα can be N-terminal or C-terminal to the wild type or variant IL2 domain. In some embodiments, the IL2 binding domain of IL-2Rα is N-terminal to the wild type or variant IL2 domain.

In some embodiments, the IL2 moiety comprises the amino acid sequence of SEQ ID NO: 54 or an amino acid sequence having 80%, 85%, 90%, 95%, 97%, 98% or 99% sequence identity to SEQ ID NO: 54.

In eukaryotic cells, human IL2 is synthesized as a precursor polypeptide of 153 amino acids, from which 20 amino acids are removed to generate mature secreted IL2 (Taniguchi et al., 1983, Nature 302(5906):305-10). Mature human IL2 has the following amino acid sequence:

```
                                           (SEQ ID NO: 75)
APTSSSTKKTQLQLEHLLLDLQMILNGINNYKNPKLTRMLT

FKFYMPKKATELKHLQCLEEELKPLEEVLNLAQSKNFHLRP

RDLISNINVIVLELKGSETTFMCEYADETATIVEFLNRWIT

FCQSIISTLT
```

In some embodiments, the IL2 moieties can be IL2Rα directed, e.g., they have one or more amino acid substitutions in the IL2 domain that make them preferentially bind to IL-2Rα as compared to IL-2Rβ. In some embodiments, the IL2 moieties are not CD122 directed, e.g., they do not have amino acid substitutions in the IL2 domain that make them preferentially bind to IL-2Rβ as compared to IL-2Rα.

In some embodiments, the fusion protein of the disclosure has one or more amino acid substitutions in the IL2 domain that reduce binding to IL-2Rβ. For example, in some embodiments, the IL2 moiety can have up to 50-fold (and in some embodiments up to 100-fold) to 1,000-fold attenuated binding to human IL-2Rβ as compared to wild-type human IL2. In some embodiments, the IL2 moiety with reduced binding to IL-2Rβ may retain its affinity to IL-2Rα or have reduced binding to IL-2Rα. For example, in some embodiments, the IL2 moiety may have up to 50-fold attenuated binding to human IL2-Rα as compared to wild-type human IL2. In one embodiment, the IL2 domain comprises one or more amino acid substitutions that reduce affinity to IL-2Rβ and preserve affinity to IL2-Rα. An exemplary amino acid substitution is N88D. Other amino acid substitutions that reduce or abolish the affinity of IL2 to IL-2Rβ are D20T, N88R, N88D or Q126D (see, e.g., US Patent Publication No. US 2007/0036752).

In some embodiments, the IL2 domain comprises one or more amino acid substitutions that reduce affinity to IL2-Rα and preserve or reduce affinity to a lesser degree, to IL-2Rβ, resulting in CD122 directed IL2 moieties. Exemplary CD122 directed IL2 domains are those comprising both H16A and F42A substitutions. Accordingly, in some embodiments, the IL2 moiety comprises the amino acid sequence of human IL2 with H16A and F42A substitutions.

In some embodiments, the IL2 moiety comprises an amino acid substitution that eliminates the O-glycosylation site of IL2 at a position corresponding to residue 3 of human IL2. Exemplary amino acid substitutions at T3 are T3A, T3G, T3Q, T3E, T3N, T3D, T3R, T3K, and T3P. In a specific embodiment, the substitution is T3A.

In some embodiments, the IL2 domain may include a substitution at C125. C125 can be substituted with S, V, or A to reduce protein aggregation, as described in U.S. Pat. No. 4,518,584. In some embodiments, the IL2 domain may include a substitution of methionine 104 with a neutral amino acid such as alanine, as described in U.S. Pat. No. 5,206,344. In some embodiments, the IL2 domain may be devoid of the N-terminal alanine residue of IL2, resulting in des-A1 IL2.

In some embodiments, the IL2 domain can have amino acid deletions and/or substitutions selected from des-A1 M104A IL2, des-A1 M104A C125S IL2, M104A IL2, M104A C125A IL2, des-A1 M104A C125A IL2, and M104A C125S IL2, in addition to other variations alter the binding of IL2 to its receptor. These and other mutants may be found in U.S. Pat. No. 5,116,943 and in Weiger et al., 1989, Eur J Biochem 180:295-300.

In some embodiments, the IL2 domain may include an amino acid sequence having at least about 90%, at least about 91%, at least about 92%, about at least 93%, at least about 94%, at least about 95%, at least about 96%, at least about 97%, at least about 98%, at least about 99% or 100% sequence identity to mature human IL2. [0063]. In some embodiments, the IL2 or fragment thereof comprises the amino acid sequence of SEQ ID NO: 53 or an amino acid sequence having 80%, 85%, 90%, 95%, 97%, 98% or 99% sequence identity to SEQ ID NO: 53.

In some embodiments, the IL2 moiety further includes an IL2 binding domain of IL-2Rα (referred to as "IL2-Rα domain"), e.g., the extracellular domain of an IL-2Rα, fused at the C-terminus or the N-terminus of IL2, optionally via a linker. In some embodiments, the IL2Rα or fragment thereof is human IL2Rα (hIL2Rα) or a fragment thereof. In some embodiments, the IL2-Rα domain may include the mature human IL-2Rα extracellular domain (corresponding to amino acids 22-272 of human IL-Rα). In some embodiments, the IL2-Rα domain may include an IL2 binding portion of the human IL-2Rα extracellular domain (comprising the two "sushi" domains, which corresponds to amino acids 22-186 of human IL-2Rα). In some embodiments, the IL2-Rα domain may include an alternative IL2 binding portion of the human IL-2Rα extracellular domain, which corresponds to amino acids 22-240 of human IL-2Rα.

In some embodiments, the IL2-Rα domain or the IL2 binding portion of the IL-2Rα extracellular domain has an amino acid sequence with at least about 90%, at least about 95%, at least about 96%, at least about 97%, at least about 98%, at least about 99% or 100% sequence identity to any of the sequences above, i.e., any one of amino acids 22-186 of IL-2Rα, amino acids 22-240 of IL-2Rα, or amino acids 22-272 of IL-2Rα, or any IL2 binding portion thereof.

In some embodiments, the IL2-Rα domain or the IL2 binding portion can comprise or consist of an amino acid sequence having at least about 90%, at least about 95%, at least about 96%, at least about 97%, at least about 98%, at least about 99% or 100% sequence identity to an IL2 binding portion of human IL-2Rα, optionally wherein the binding portion has an amino acid sequence of (a) at least 160 amino acids, at least 161 amino acids, at least 162 amino acids, at least 164 amino acids or at least 165 amino acids and/or (b) up to 251, up to 240, up to 230, up to 220, up to 210, up to 200, up to 190, up to 180 or up to 170 amino acids of the extracellular domain of human IL2-Rα. In particular embodiments, the portion of human IL-2Rα is bounded by any one of (a) and (b) in the preceding sentence, e.g., at least 160 and up to 180 amino acids from human IL-2Rα, at least 162 and up to 200 amino acids from human IL-2Rα, at least 160 and up to 220 amino acids from human IL-2Rα, at least 164 and up to 190 amino acids from human IL-2Rα, and so on and so forth.

In some embodiments, the IL2-Rα domain or the IL2 binding portion comprises or consists of an amino acid sequence having at least about 90%, at least about 95%, at least about 96%, at least about 97%, at least about 98%, at least about 99% or 100% sequence identity to amino acids 22-186, with or without an additional up to 5 amino acids, up to 10 amino acids, up to 15 amino acids, up to 20 amino acids, up to 30 amino acids, or up to 40 amino acids C-terminal to amino acid residue 186, of IL2-Rα.

In some embodiments, the IL2-Rα domain or the IL-2Rα extracellular domain has at least one fewer O-glycosylation and/or N-glycosylation compared to the extracellular domain of native IL-2Rα, for example, by a substitution at one or more of amino acid N49, amino acid N68, amino acid T74, amino acid T85, amino acid T197, amino acid T203, amino acid T208, and amino acid T216. In some embodiments, the one or more substitutions are from asparagine to an amino acid selected from alanine, threonine, serine, arginine, aspartic acid, glutamine, glutamic acid, glycine, histidine, isoleucine, leucine, lysine, methionine, phenylalanine, proline, tryptophan, tyrosine, and valine. In some embodiments, the one or more substitutions are from threonine to an amino acid selected from alanine, arginine, asparagine, aspartic acid, cysteine, glutamine, glutamic acid, glycine, histidine, isoleucine, leucine, lysine, methionine, phenylalanine, proline, serine, tryptophan, tyrosine, and valine. In some embodiments, the one or more substitutions are at amino acid S50 (e.g., S50P), amino acid S51 (e.g., S51R, S51N, S51D, S51C, S51Q, S51E, S51G, S51H, S51I, S51L, S51K, S51M, S51F, S51P, S51W, S51Y, or S51V), amino acid T69 (e.g., T69P), amino acid T70 (e.g., T70R, T70N, T70D, T70C, T70Q, T70E, T70G, T70H, T70I, T70L, T70K, T70M, T70F, T70P, T70W, T70Y, or T70V), amino acid C192 (e.g., C192R, C192N, C192D, C192Q, C192E, C192G, C192H, C192I, C192L, C192K, C192M, C192F, C192P, C192W, C192Y, or C192V), or any combination thereof.

In some embodiments, the IL2Rα or fragment thereof comprises the amino acid sequence of SEQ ID NO: 51 or an amino acid sequence having 80%, 85%, 90%, 95%, 97%, 98% or 99% sequence identity to SEQ ID NO: 51.

The fusion protein can include one or more linkers (e.g., peptide linker or non-peptide linker) connecting the various components of the molecule. In some embodiments, two or more components of the fusion protein are connected to one another by a peptide linker. By way of example and not limitation, linkers can be used to connect (a) an IL2 moiety and an antigen-binding moiety; (b) different domains within an IL2 moiety (e.g., an IL2 domain and an IL-Rα domain); or (c) different domains within an antigen-binding moiety (e.g., different components of anti-PD-1 antibody).

A peptide linker can range from 2 amino acids to 60 or more amino acids, and in some embodiments, a peptide linker ranges from 3 amino acids to 50 amino acids, from 4 to 30 amino acids, from 5 to 25 amino acids, from 10 to 25 amino acids, 10 amino acids to 60 amino acids, from 12 amino acids to 20 amino acids, from 20 amino acids to 50 amino acids, or from 25 amino acids to 35 amino acids in length.

In some embodiments, a peptide linker is at least 5 amino acids, at least 6 amino acids or at least 7 amino acids in length and optionally is up to 30 amino acids, up to 40 amino acids, up to 50 amino acids or up to 60 amino acids in length. In some embodiments, the linker ranges from 5 amino acids to 50 amino acids in length, e.g., ranges from 5 to 50, from 5 to 45, from 5 to 40, from 5 to 35, from 5 to 30, from 5 to 25, or from 5 to 20 amino acids in length. In other embodiments of the foregoing, the linker ranges from 6 amino acids to 50 amino acids in length, e.g., ranges from 6 to 50, from 6 to 45, from 6 to 40, from 6 to 35, from 6 to 30, from 6 to 25, or from 6 to 20 amino acids in length. In yet other embodiments of the foregoing, the linker ranges from 7 amino acids to 50 amino acids in length, e.g., ranges from 7 to 50, from 7 to 45, from 7 to 40, from 7 to 35, from 7 to 30, from 7 to 25, or from 7 to 20 amino acids in length.

In some embodiments, the linker comprises polar (e.g., serine (S)) or charged (e.g., lysine (K)) residues. In some embodiments, the linker is a flexible linker, e.g., comprising one or more glycine (G) or serine (S) residues.

Examples of flexible linkers that can be used in the fusion protein of the disclosure include those disclosed by Chen et al., 2013, Adv Drug Deliv Rev. 65(10): 1357-1369 and Klein et al., 2014, Protein Engineering, Design & Selection 27(10): 325-330. Particularly useful flexible linkers are or comprise repeats of glycines and serines, e.g., a monomer or multimer of GnS or SGn, where n is an integer from 1 to 10, e.g., 1 2, 3, 4, 5, 6, 7, 8, 9 or 10. In one embodiment, the linker is or comprises a monomer or multimer of repeat of G4S (GGGGS; SEQ ID NO: 67), e.g., (GGGGS)n.

Polyglycine linkers can suitably be used in the fusion protein of the disclosure. In some embodiments, a peptide linker comprises two consecutive glycines (2Gly), three consecutive glycines (3Gly), four consecutive glycines (4Gly) (SEQ ID NO:68), five consecutive glycines (5Gly) (SEQ ID NO:69), six consecutive glycines (6Gly) (SEQ ID NO:70), seven consecutive glycines (7Gly) (SEQ ID NO:71), eight consecutive glycines (8Gly) (SEQ ID NO:72) or nine consecutive glycines (9Gly) (SEQ ID NO:73).

In some embodiments, the IL2 moiety and the antigen-binding moiety are connected via a linker. In some embodiments, the linker comprises an amino acid sequence of one or more repeats of GGGGS (SEQ ID NO: 67). In some embodiments, the linker comprises an amino acid sequence of SEQ ID NO: 50 or 52. In some embodiments, the IL2 moiety is linked to the C-terminal of the antigen-binding moiety via a peptide linker. In some embodiments, the linker comprises an amino acid sequence of SEQ ID NO: 50.

In another aspect, this disclosure provides a fusion protein comprising: (i) a first polypeptide comprising a light chain variable region (LCVR) of a human antibody that binds specifically to human PD-1; and (ii) a second polypeptide that comprises (a) a heavy chain variable region (HCVR) of the antibody that binds specifically to human PD-1; and (b) an IL2 moiety.

In some embodiments, the HCVR comprises three heavy chain complementarity determining regions (HCDRs) (HCDR1, HCDR2, and HCDR3) and the LCVR comprises three light chain CDRs (LCDR1, LCDR2, and LCDR3), wherein: HCDR1 comprises an amino acid sequence of SEQ ID NO: 4, 24, or 43; HCDR2 comprises an amino acid sequence of SEQ ID NO: 6, 26, or 45; HCDR3 comprises an amino acid sequence of SEQ ID NO: 8, 28, or 47; LCDR1 comprises an amino acid sequence of SEQ ID NO: 12 or 32; LCDR2 comprises an amino acid sequence of SEQ ID NO: 14; and LCDR3 comprises an amino acid sequence of SEQ ID NO: 16 or 35.

In some embodiments, the HCDR1, HCDR2, HCDR3, LCDR1, LCDR2, and LCDR3 comprise respective amino acid sequences of (i) SEQ ID NOs: 4, 6, 8, 12, 14, and 16; (ii) SEQ ID NOs: 24, 26, 28, 32, 14, and 35; or (iii) SEQ ID NOs: 43, 45, 47, 12, 14, and 16.

In some embodiments, the HCDR1, HCDR2, HCDR3, LCDR1, LCDR2, and LCDR3 comprise respective amino acid sequences of SEQ ID NOs: 43, 45, 47, 12, 14, and 16.

In some embodiments, the HCVR comprises an amino acid sequence of SEQ ID NO: 2, 22, or 41 or an amino acid sequence having 80%, 85%, 90%, 95%, 97%, 98% or 99% sequence identity to SEQ ID NO: 2, 22, or 41. In some embodiments, the LCVR comprises an amino acid sequence of SEQ ID NO: 10 or 30 or an amino acid sequence having 80%, 85%, 90%, 95%, 97%, 98% or 99% sequence identity to SEQ ID NO: 10 or 30.

In some embodiments, the HCVR comprises the amino acid sequence of SEQ ID NO: 2 or an amino acid sequence having 80%, 85%, 90%, 95%, 97%, 98% or 99% sequence identity to SEQ ID NO: 2 and the LCVR comprises the amino acid sequence of SEQ ID NO: 10 or an amino acid sequence having 80%, 85%, 90%, 95%, 97%, 98% or 99% sequence identity to SEQ ID NO: 10.

In some embodiments, the HCVR comprises the amino acid sequence of SEQ ID NO: 22 or an amino acid sequence having 80%, 85%, 90%, 95%, 97%, 98% or 99% sequence identity to SEQ ID NO:22 and the LCVR comprises the amino acid sequence of SEQ ID NO: 30 or an amino acid sequence having 80%, 85%, 90%, 95%, 97%, 98% or 99% sequence identity to SEQ ID NO: 30.

In some embodiments, the HCVR comprises the amino acid sequence of SEQ ID NO: 41 or an amino acid sequence having 80%, 85%, 90%, 95%, 97%, 98% or 99% sequence identity to SEQ ID NO: 41 and the LCVR comprises the amino acid sequence of SEQ ID NO: 10 or an amino acid sequence having 80%, 85%, 90%, 95%, 97%, 98% or 99% sequence identity to SEQ ID NO: 10.

In some embodiments, the HCVR and the LCVR comprise respective amino acid sequences of (i) SEQ ID NOs: 2 and 10; (ii) SEQ ID NOs: 22 and 30; or (iii) SEQ ID NOs: 41 and 10. In some embodiments, the HCVR and the LCVR comprise respective amino acid sequences of SEQ ID NOs: 41 and 10.

In some embodiments, the first polypeptide further comprises a light chain constant region linked to the LCVR. In some embodiments, the light chain constant region comprises the amino acid sequence of SEQ ID NO: 56 or an amino acid sequence having 80%, 85%, 90%, 95%, 97%, 98% or 99% sequence identity to SEQ ID NO: 56.

In some embodiments, the second polypeptide further comprises a heavy chain constant region arranged between the HCVR and the IL2 moiety. In some embodiments, the heavy chain constant region comprises the amino acid sequence of SEQ ID NO: 55 or an amino acid sequence having 80%, 85%, 90%, 95%, 97%, 98% or 99% sequence identity to SEQ ID NO: 55.

In some embodiments, the first polypeptide comprises a light chain amino acid sequence of SEQ ID NO: 58, 60, or 62 or a light chain amino acid sequence having 80%, 85%, 90%, 95%, 97%, 98% or 99% sequence identity to SEQ ID NO: 58, 60, or 62.

In some embodiments, the second polypeptide comprises a heavy chain amino acid sequence of SEQ ID NO: 57, 59, or 61 or a heavy chain amino acid sequence having 80%, 85%, 90%, 95%, 97%, 98% or 99% sequence identity to SEQ ID NO: 57, 59, or 61.

In some embodiments, the fusion protein comprises a heavy chain/light chain sequence pair of SEQ ID NOs: 57/58, 59/60, or 61/62. In some embodiments, the fusion protein comprises a heavy chain/light chain amino acid sequence pair of SEQ ID NOs: 61/62.

In some embodiments, the IL2 moiety is connected to the C-terminal of the heavy chain constant region via a linker. In some embodiments, the linker comprises an amino acid sequence of one or more repeats of GGGGS (SEQ ID NO: 67). In some embodiments, the linker comprises an amino acid sequence of SEQ ID NO: 50 or 52. In one embodiment, the linker comprises the amino acid sequence of SEQ ID NO: 50.

In some embodiments, the IL2 moiety comprises (i) IL2 or a fragment thereof; and (ii) IL2 receptor alpha (IL2Rα) or a fragment thereof.

In some embodiments, the IL2 or fragment thereof is human IL2 (hIL2) or a fragment thereof. In some embodiments, the IL2 or fragment thereof comprises the amino acid sequence of SEQ ID NO: 53 or an amino acid sequence having 80%, 85%, 90%, 95%, 97%, 98% or 99% sequence identity to SEQ ID NO: 53.

In some embodiments, the IL2Rα or fragment thereof is human IL2Rα (hIL2Rα) or a fragment thereof. In some embodiments, the IL2Rα or fragment thereof comprises the amino acid sequence of SEQ ID NO: 51 or an amino acid sequence having 80%, 85%, 90%, 95%, 97%, 98% or 99% sequence identity to SEQ ID NO: 51.

In some embodiments, the IL2 moiety comprises the amino acid sequence of SEQ ID NO: 54 or an amino acid sequence having 80%, 85%, 90%, 95%, 97%, 98% or 99% sequence identity to SEQ ID NO: 54.

In some embodiments, the IL2 or fragment thereof is linked to the C-terminal of the IL2Rα or fragment thereof via a linker. In one embodiment, the linker comprises the amino acid sequence of SEQ ID NO: 52.

In some embodiments, the first polypeptide comprises the amino acid sequence of SEQ ID NO: 58, 60, or 62 or an amino acid sequence having 80%, 85%, 90%, 95%, 97%, 98% or 99% sequence identity to SEQ ID NO: 58, 60, or 62. In some embodiments, the second polypeptide comprises the amino acid sequence of SEQ ID NO: 63, 64, or 65 or an amino acid sequence having 80%, 85%, 90%, 95%, 97%, 98% or 99% sequence identity to SEQ ID NO: 63, 64, or 65.

In some embodiments, the first polypeptide comprises the amino acid sequence of SEQ ID NO: 58 or an amino acid sequence having 80%, 85%, 90%, 95%, 97%, 98% or 99% sequence identity to SEQ ID NO: 58 and the second polypeptide comprises the amino acid sequence of SEQ ID NO: 64 or an amino acid sequence having 80%, 85%, 90%, 95%, 97%, 98% or 99% sequence identity to SEQ ID NO: 64.

In some embodiments, the first polypeptide comprises the amino acid sequence of SEQ ID NO: 60 or an amino acid sequence having 80%, 85%, 90%, 95%, 97%, 98% or 99% sequence identity to SEQ ID NO: 60 and the second polypeptide comprises the amino acid sequence of SEQ ID NO: 63 or an amino acid sequence having 80%, 85%, 90%, 95%, 97%, 98% or 99% sequence identity to SEQ ID NO: 63.

In some embodiments, the first polypeptide comprises the amino acid sequence of SEQ ID NO: 62 or an amino acid sequence having 80%, 85%, 90%, 95%, 97%, 98% or 99% sequence identity to SEQ ID NO: 62 and the second polypeptide comprises the amino acid sequence of SEQ ID NO: 65 or an amino acid sequence having 80%, 85%, 90%, 95%, 97%, 98% or 99% sequence identity to SEQ ID NO: 65.

Also provided in this disclosure is a dimeric fusion protein formed by a fusion protein described herein. In some embodiments, the dimeric fusion protein is a homodimeric fusion protein, wherein each constituent monomer comprises the fusion protein described herein. In some embodiments, each constituent monomer consists of the fusion protein described herein. In some embodiments, the monomers of the dimeric fusion protein dimerize through the heavy chain constant region of each monomer.

Biological Activity

The fusion proteins of the present disclosure exhibit attenuated binding to IL2Rα, IL2Rβ and IL2Rγ. In some embodiments, the fusion proteins do not compete with REGN2810, pembrolizumab or nivolumab. In some embodiments, the fusion proteins exhibit reduced activity in activating human IL2Rα/β/γ trimeric and IL2Rβ/γ dimeric receptor complexes as compared to IL2 and increased activity in activating human IL2Rα/β/γ trimeric and IL2Rβ/γ dimeric receptor complexes as compared to a non-targeted IL2Rα-IL2 construct. In some embodiments, the fusion proteins exhibit increased activity in stimulating antigen-activated T cells as measured by a level of IFN-γ release as compared to a wild-type human IL2. In some embodiments, the fusion proteins showed enhanced anti-tumor efficacy as compared to IL2 alone or in combination with an anti-PD-1 antibody.

Nucleic Acids and Host Cells

In another aspect, the disclosure provides isolated nucleic acid or nucleic acids comprising one or more polynucleotide sequences encoding the fusion protein of the disclosure. In some embodiments, the fusion protein is encoded by a single nucleic acid. In other embodiments, for example, in the case of a heterodimeric molecule or a molecule comprising an anti-PD-1 antibody composed of more than one polypeptide chain, the fusion protein can be encoded by a plurality (e.g., two, three, four or more) nucleic acids.

A single nucleic acid can encode a fusion protein that comprises a single polypeptide chain, a fusion protein that comprises two or more polypeptide chains, or a portion of a fusion protein that comprises more than two polypeptide chains (for example, a single nucleic acid can encode two polypeptide chains of a fusion protein comprising three, four or more polypeptide chains, or three polypeptide chains of a fusion protein comprising four or more polypeptide chains). For separate control of expression, the open reading frames encoding two or more polypeptide chains can be under the control of separate transcriptional regulatory elements (e.g., promoters and/or enhancers). The open reading frames encoding two or more polypeptides can also be controlled by the same transcriptional regulatory elements and separated by internal ribosome entry site (IRES) sequences allowing for translation into separate polypeptides.

In some embodiments, a fusion protein comprising two or more polypeptide chains is encoded by two or more nucleic acids. The number of nucleic acids encoding a fusion protein can be equal to or less than the number of polypeptide chains in the fusion protein (for example, when more than one polypeptide chains are encoded by a single nucleic acid).

The nucleic acids of the disclosure can be DNA or RNA (e.g., mRNA).

In another aspect, the disclosure provides host cells and vectors containing the nucleic acids of the disclosure. The nucleic acids may be present in a single vector or separate vectors present in the same host cell or separate host cell, as described in more detail hereinbelow.

In some embodiments, the host cell expresses a first vector comprising a polynucleotide sequence that encodes a HCVR of an antibody as set forth herein and a second vector comprising a polynucleotide sequence that encodes a LCVR of an antibody as set forth herein.

In some embodiments, the host cell expresses a first vector comprising a polynucleotide sequence that encodes the first polypeptide of the fusion protein set forth herein and a second vector comprising a polynucleotide sequence that encodes the second polypeptide of the fusion protein set forth herein.

This disclosure provides vectors comprising nucleotide sequences encoding a fusion protein or a fusion protein component described herein, for example, one or two of the polypeptide chains of a half antibody. The vectors include, but are not limited to, a virus, plasmid, cosmid, lambda phage or a yeast artificial chromosome (YAC).

Numerous vector systems can be employed. For example, one class of vectors utilizes DNA elements that are derived from animal viruses such as, for example, bovine papillomavirus, polyomavirus, adenovirus, vaccinia virus, baculovirus, retroviruses (Rous Sarcoma Virus, MMTV or MOMLV) or SV40 virus. Another class of vectors utilizes RNA elements derived from RNA viruses such as Semliki Forest virus, Eastern Equine Encephalitis virus, and Flaviviruses.

Additionally, cells that have stably integrated the DNA into their chromosomes can be selected by introducing one or more markers which allow for the selection of transfected host cells. The marker may provide, for example, prototropy to an auxotrophic host, biocide resistance (e.g., antibiotics), or resistance to heavy metals such as copper or the like. The selectable marker gene can be either directly linked to the DNA sequences to be expressed or introduced into the same cell by co-transformation. Additional elements may also be needed for optimal synthesis of mRNA. These elements may include splice signals, as well as transcriptional promoters, enhancers, and termination signals.

Once the expression vector or DNA sequence containing the constructs has been prepared for expression, the expression vectors can be transfected or introduced into an appropriate host cell. Various techniques may be employed to achieve this, such as, for example, protoplast fusion, calcium phosphate precipitation, electroporation, retroviral transduction, viral transfection, gene gun, lipid-based transfection or other conventional techniques. Methods and conditions for culturing the resulting transfected cells and for recovering the expressed polypeptides are known to those skilled in the art and may be varied or optimized depending upon the specific expression vector and mammalian host cell employed, based upon the present description.

The disclosure also provides host cells comprising a nucleic acid of the disclosure. In one embodiment, the host cells are genetically engineered to comprise one or more nucleic acids described herein. In one embodiment, the host cells are genetically engineered by using an expression cassette. The phrase "expression cassette" refers to nucleotide sequences, which are capable of affecting expression of a gene in hosts compatible with such sequences. Such cassettes may include a promoter, an open reading frame with or without introns, and a termination signal. Additional factors necessary or helpful in effecting expression may also be used, such as, for example, an inducible promoter.

The disclosure also provides host cells comprising the vectors described herein.

The cell can be, but is not limited to, a eukaryotic cell, a bacterial cell, an insect cell, or a human cell. Suitable eukaryotic cells include, but are not limited to, Vero cells, HeLa cells, COS cells, CHO cells, HEK293 cells, BHK cells, and MDCKII cells. Suitable insect cells include, but are not limited to, Sf9 cells.

Pharmaceutical Compositions

The fusion protein or the dimeric fusion protein as disclosed herein may be in the form of compositions comprising the fusion protein (e.g., dimeric fusion protein) and one or more carriers, excipients and/or diluents.

The compositions may be formulated for specific uses, such as for veterinary uses or pharmaceutical uses in humans. The form of the composition (e.g., dry powder, liquid formulation, etc.) and the excipients, diluents and/or carriers used will depend upon the intended uses of the fusion protein or the dimeric fusion protein and, for therapeutic uses, the mode of administration.

For therapeutic uses, the compositions may be supplied as part of a sterile, pharmaceutical composition that includes a pharmaceutically acceptable carrier. This composition can be in any suitable form (depending upon the desired method of administering it to a patient). The pharmaceutical composition can be administered to a patient by a variety of routes such as orally, transdermally, subcutaneously, intranasally, intravenously, intramuscularly, intratumorally, intrathecally, topically or locally. The most suitable route for administration in any given case will depend on the particular antibody, the subject, the nature and severity of the disease, and the physical condition of the subject. In some embodiments, the pharmaceutical composition will be administered intravenously or subcutaneously.

Pharmaceutical compositions can be conveniently presented in unit dosage forms containing a predetermined amount of a fusion protein of the disclosure per dose. The quantity of the fusion protein included in a unit dose will depend on the disease being treated, as well as other factors that are well known in the art. Such unit dosages may be in the form of a lyophilized dry powder containing an amount of fusion protein suitable for a single administration or in the form of a liquid. Dry powder unit dosage forms may be packaged in a kit with a syringe, a suitable quantity of diluent and/or other components useful for administration. Unit dosages in liquid form may be conveniently supplied in the form of a syringe pre-filled with a quantity of fusion protein suitable for a single administration. The pharmaceutical compositions may also be supplied in bulk from containing quantities of fusion protein suitable for multiple administrations.

Pharmaceutical compositions may be prepared for storage as lyophilized formulations or aqueous solutions by mixing a fusion protein having the desired degree of purity with optional pharmaceutically-acceptable carriers, excipients or stabilizers typically employed in the art (all of which are referred to herein as "carriers"), i.e., buffering agents, stabilizing agents, preservatives, isotonifiers, non-ionic detergents, antioxidants, and other miscellaneous additives (see, Remington's Pharmaceutical Sciences, 16th edition (Osol, ed. 1980)). Such additives should be nontoxic to the recipients at the dosages and concentrations employed.

Methods of Use

The fusion proteins of the disclosure are useful in treating disease states where stimulation of the immune system of the host is beneficial, in particular conditions where an enhanced cellular immune response is desirable. These may include disease states where the host immune response is insufficient or deficient. Disease states for which the fusion protein of the disclosure can be administered comprise, for example, a tumor or infection where a cellular immune response would be a critical mechanism for specific immunity. Specific disease states for which fusion protein of the present disclosure can be employed include cancer, for example, renal cell carcinoma or melanoma; immune deficiency, specifically in HIV-positive patients, immunosuppressed patients, chronic infection, and the like. The fusion protein of the disclosure may be administered per se or in any suitable pharmaceutical composition.

In one aspect, a fusion protein of the disclosure for use as a medicament is provided. In further aspects, a fusion protein of the disclosure for use in treating a disease is provided. In some embodiments, a fusion protein of the disclosure for use in a method of treatment is provided. In some embodiments, the disclosure provides a fusion protein as described herein for use in the treatment of a disease in a subject in need thereof. In some embodiments, the disclosure provides a fusion protein for use in a method of treating a subject having a disease comprising administering to the subject a therapeutically effective amount of the fusion protein. In some embodiments, the disease to be treated is a proliferative disorder. In some embodiments, the disease is cancer.

In some embodiments, the method further comprises administering to the subject a therapeutically effective amount of at least one additional therapeutic agent, e.g., an anti-cancer agent if the disease to be treated is cancer. In further embodiments, the disclosure provides a fusion protein for use in stimulating the immune system. In some embodiments, the disclosure provides a fusion protein for use in a method of stimulating the immune system in a subject comprising administering to the subject an effective amount of the fusion protein to stimulate the immune system.

"Stimulation of the immune system" according to any of the embodiments herein may include any one or more of a general increase in immune function, an increase in T cell function, an increase in B cell function, a restoration of lymphocyte function, an increase in the expression of IL-2 receptors, an increase in T cell responsiveness, an increase in natural killer cell activity or lymphokine-activated killer (LAK) cell activity, and the like.

In a further aspect, the disclosure provides for the use of a fusion protein of the disclosure in the manufacture or preparation of a medicament for the treatment of a disease in a subject in need thereof. In one embodiment, the medicament is for use in a method of treating a disease comprising administering to a subject having the disease a therapeutically effective amount of the medicament. In some embodiments, the disease to be treated is a proliferative disorder. In some embodiments, the disease is cancer. In one such embodiment, the method further comprises administering to the subject a therapeutically effective amount of at least one additional therapeutic agent, e.g., an anti-cancer agent if the disease to be treated is cancer. In a further embodiment, the medicament is for stimulating the immune system. In a further embodiment, the medicament is for use in a method of stimulating the immune system in a subject comprising administering to the subject an amount effective of the medicament to stimulate the immune system.

In some embodiments, the disease to be treated is a proliferative disorder, preferably cancer. Non-limiting examples of cancers include bladder cancer, brain cancer, head and neck cancer, pancreatic cancer, lung cancer, breast cancer, ovarian cancer, uterine cancer, cervical cancer, endometrial cancer, esophageal cancer, colon cancer, colorectal cancer, rectal cancer, gastric cancer, prostate cancer, blood cancer, skin cancer, squamous cell carcinoma, bone cancer, and kidney cancer. Other cell proliferation disorders that can be treated using a fusion protein of the present disclosure include, but are not limited to, neoplasms located in the: abdomen, bone, breast, digestive system, liver, pancreas, peritoneum, endocrine glands (adrenal, parathyroid, pituitary, testicles, ovary, thymus, thyroid), eye, head and neck, nervous system (central and peripheral), lymphatic system, pelvic, skin, soft tissue, spleen, thoracic region, and urogenital system. Also included are pre-cancerous conditions or lesions and cancer metastases. In some embodiments, the cancer is chosen from the group consisting of renal cell cancer, skin cancer, lung cancer, colorectal cancer, breast cancer, brain cancer, head and neck cancer. Similarly, other cell proliferation disorders can also be treated by the fusion protein of the present disclosure. Examples of such cell proliferation disorders include, but are not limited to: hypergammaglobulinemia, lymphoproliferative disorders, paraproteinemias, purpura, sarcoidosis, Sezary Syndrome, Waldenstrom's Macroglobulinemia, Gaucher's Disease, histiocytosis, and any other cell proliferation disease, besides neoplasia, located in an organ system listed above. In another embodiment, the disease is related to autoimmunity, transplantation rejection, post-traumatic immune responses, and infectious diseases (e.g., HIV). More specifically, the fusion protein may be used in eliminating cells involved in immune cell-mediated disorders, including lymphoma; autoimmunity, transplantation rejection, graft-versus-host disease, ischemia, and stroke. A skilled artisan readily recognizes that in many cases, the fusion protein may not provide a cure but may only provide partial benefit. In some embodiments, a physiological change having some benefit is also considered therapeutically beneficial. Thus, in some embodiments, an amount of fusion protein that provides a physiological change is considered an "effective amount" or a "therapeutically effective amount." The subject, or patient, in need of treatment is typically a mammal, more specifically a human.

Various dosing schedules, including but not limited to, single or multiple administrations over various time-points, bolus administration, and pulse infusion, are contemplated herein.

The fusion protein of the disclosure will generally be used in an amount effective to achieve the intended purpose. For use to treat or prevent a disease condition, the fusion protein of the disclosure, or pharmaceutical compositions thereof, are administered or applied in a therapeutically effective amount.

One typical daily dosage might range from about 1 µg/kg to 100 mg/kg or more. For repeated administrations over several days or longer, depending on the condition, the treatment would generally be sustained until a desired suppression of disease symptoms occurs. One exemplary dosage of the fusion protein would be in the range from about 0.005 mg/kg to about 10 mg/kg. In other non-limiting examples, a dose may also comprise from about 1 µg/kg/body weight, about 5 µg/kg/body weight, about 10 µg/kg/body weight, about 50 µg/kg/body weight, about 100 µg/kg body weight, about 200 µg/kg/body weight, about 350 µg/kg body weight, about 500 µg/kg body weight, about 1 mg/kg body weight, about 5 mg/kg body weight, about 10 mg/kg body weight, about 50 mg/kg body weight, or about 100 mg/kg body weight or more per administration, and any range derivable therein. In non-limiting examples of a derivable range from the numbers listed herein, a range of about 5 mg/kg body weight to about 50 mg/kg body weight, about 5 µg/kg body weight to about 100 mg/kg body weight, etc., can be administered, based on the numbers described above. Thus, one or more doses of about 0.5 mg/kg, 2.0 mg/kg, 5.0 mg/kg or 10 mg/kg (or any combination thereof) may be administered to the patient. Such doses may be administered intermittently, e.g., every week or every three weeks (e.g., such that the patient receives from about two to about twenty, or, e.g., about six doses of the fusion protein). An initial higher loading dose, followed by one or more lower doses, may be administered. However, other dosage regimens may be useful. The progress of this therapy is easily monitored by conventional techniques and assays.

A therapeutically effective dose of the fusion protein described herein will generally provide therapeutic benefit without causing substantial toxicity. Toxicity and therapeutic efficacy of a fusion protein can be determined by standard pharmaceutical procedures in cell culture or experimental animals. Cell culture assays and animal studies can be used to determine the LD50 (the dose lethal to 50% of a population) and the ED50 (the dose therapeutically effective in 50% of a population). The dose ratio between toxic and therapeutic effects is the therapeutic index, which can be expressed as the ratio LD50/ED50. A fusion protein that exhibits large therapeutic indices is preferred. In one embodiment, the fusion protein, according to the present disclosure, exhibits a high therapeutic index. The data obtained from cell culture assays and animal studies can be used in formulating a range of dosages suitable for use in humans. The dosage lies preferably within a range of circulating concentrations that include the ED50 with little or no toxicity. The dosage may vary within this range depending upon a variety of factors, e.g., the dosage form employed, the route of administration utilized, the condition of the subject, and the like. (See, e.g., Fingl et al., 1975, In: The Pharmacological Basis of Therapeutics, Ch. 1, p. 1, incorporated herein by reference in its entirety).

Due to lower toxicity, the fusion protein of the disclosure can have higher maximum therapeutic doses than wild type IL2.

The fusion protein, according to the disclosure, may be administered in combination with one or more other agents or therapies. For instance, a fusion protein of the disclosure may be co-administered with at least one additional therapeutic agent or therapy. The term "therapeutic agent" encompasses any agent administered to treat a symptom or disease in a subject in need of such treatment. Such additional therapeutic agent may comprise any active ingredients suitable for the particular indication being treated, preferably those with complementary activities that do not adversely affect each other. In some embodiments, an additional therapeutic agent is an immunomodulatory agent, a cytostatic agent, an inhibitor of cell adhesion, a cytotoxic agent, an activator of cell apoptosis, or an agent that increases the sensitivity of cells to apoptotic inducers. In a particular embodiment, the additional therapeutic agent is an anti-cancer agent, for example, a microtubule disruptor, an antimetabolite, a topoisomerase inhibitor, a DNA intercalator, an alkylating agent, a hormonal therapy, a kinase inhibitor, a receptor antagonist, an activator of tumor cell apoptosis, or an antiangiogenic agent.

In certain embodiments, the second therapeutic agent or therapy is selected from: radiation, surgery, a chemotherapeutic agent, an oncolytic virus, a cancer vaccine, a PD-1 inhibitor, a B7-H3 inhibitor, a B7-H4 inhibitor, a lymphocyte activation gene 3 (LAG3) inhibitor, a T cell membrane protein 3 (TIM3) inhibitor, a galectin 9 (GAL9) inhibitor, a V-domain immunoglobulin (Ig)-containing suppressor of T-cell activation (VISTA) inhibitor, a Killer-Cell Immunoglobulin-Like Receptor (KIR) inhibitor, a B and T lymphocyte attenuator (BTLA) inhibitor, a T cell immunoreceptor with Ig and ITIM domains (TIGIT) inhibitor, a CTLA4 inhibitor, a CD38 inhibitor, a CD47 inhibitor, a CD28 activator, a 4-1BB activator, a GITR agonist, a CD40 agonist, an OX40 modulator, an indoleamine-2,3-dioxygenase (IDO) inhibitor, a vascular endothelial growth factor (VEGF) antagonist, an angiopoietin-2 (Ang2) inhibitor, a transforming growth factor beta (TGFβ) inhibitor, an epidermal growth factor receptor (EGFR) inhibitor, an antibody to a tumor-specific antigen, Bacillus Calmette-Guerin vaccine, granulocyte-macrophage colony-stimulating factor, a cytotoxin, an interleukin 6 receptor (IL-6R) inhibitor, an interleukin 4 receptor (IL-4R) inhibitor, an IL-10 inhibitor, IL-7, IL-12, IL-21, IL-15, IL-18, type-I interferons, an antibody-drug conjugate, an anti-inflammatory drug, and combinations thereof.

In certain embodiments, a fusion protein of the present disclosure may be used in combination with an anti-PD-1 antibody wherein the antibody does not cross-compete with the fusion protein for binding to human PD-1.

Such other agents are suitably present in combination in amounts that are effective for the purpose intended. The effective amount of such other agents depends on the amount of fusion protein used, the type of disorder or treatment, and other factors discussed above. The fusion protein is generally used in the same dosages and with administration routes as described herein, or about from 1 to 99% of the dosages described herein, or in any dosage and by any route that is empirically/clinically determined to be appropriate.

Such combination therapies noted above encompass combined administration (where two or more therapeutic agents are included in the same or separate compositions) and separate administration, in which case, administration of the fusion protein of the disclosure can occur prior to, simultaneously, and/or following, administration of the additional therapeutic agent and/or adjuvant. The fusion protein of the disclosure can also be used in combination with radiation therapy and/or surgery.

Additional Definitions

To aid in understanding the detailed description of the compositions and methods according to the disclosure, a few express definitions (in addition to those disclosed elsewhere herein) are provided to facilitate an unambiguous disclosure of the various aspects of the disclosure. Unless otherwise defined, all technical and scientific terms used herein have the same meaning as commonly understood by one of ordinary skill in the art to which this disclosure belongs.

As used herein, the term "fusion protein" or "fusion polypeptide" means a protein comprising two or more polypeptide sequences which are joined together covalently or non-covalently. For example, the fusion polypeptides encompassed by the present disclosure may include translation products of a chimeric gene construct that joins the nucleic acid sequences encoding a first polypeptide with the nucleic acid sequence encoding a second polypeptide to form a single open reading frame. Alternatively, the fusion protein may be encoded by two or more gene constructs on separate vectors that may be co-expressed in a host cell. In other words, a "fusion polypeptide" or "fusion protein" is a recombinant protein of two or more proteins which are joined by a peptide bond or via several peptides. In some embodiments, the fusion protein may also comprise a peptide linker between the two domains.

As used herein, the terms "polypeptide," "peptide," and "protein" are used interchangeably herein to refer to polymers of amino acids of any length. The polymer may be linear or branched, it may comprise modified amino acids, and it may be interrupted by non-amino acids. The terms also encompass an amino acid polymer that has been modified; for example, disulfide bond formation, glycosylation, lipidation, acetylation, phosphorylation, pegylation, or any other manipulation, such as conjugation with a labeling component. As used herein, the term "amino acid" includes natural and/or unnatural or synthetic amino acids, including glycine and both the D or L optical isomers, and amino acid analogs, and peptidomimetics.

As used herein, a "wild type" form of IL-2 is a form of IL-2 that is otherwise the same as the mutant IL-2 polypeptide except that the wild-type form has a wild-type amino acid at each amino acid position of the mutant IL-2 polypeptide. For example, if the IL-2 mutant is the full-length IL-2 (i.e., IL-2 not fused or conjugated to any other molecule), the wild-type form of this mutant is full-length native IL-2. If the IL-2 mutant is a fusion between IL-2 and another polypeptide encoded downstream of IL-2 (e.g., an antibody chain), the wild-type form of this IL-2 mutant is IL-2 with a wild-type amino acid sequence fused to the same downstream polypeptide. Furthermore, if the IL-2 mutant is a truncated form of IL-2 (the mutated or modified sequence within the non-truncated portion of IL-2), then the wild-type form of this IL-2 mutant is a similarly truncated IL-2 that has a wild-type sequence.

The fusion protein as disclosed herein may include one or more conservative modifications. The fusion protein with one or more conservative modifications may retain the desired functional properties, which can be tested using the functional assays known in the art. As used herein, the term "conservative sequence modifications" refers to amino acid modifications that do not significantly affect or alter the binding characteristics of the protein containing the amino acid sequence. Such conservative modifications include amino acid substitutions, additions, and deletions. Modifications can be introduced by standard techniques known in the art, such as site-directed mutagenesis and PCR-mediated mutagenesis. Conservative amino acid substitutions are ones in which the amino acid residue is replaced with an amino acid residue having a similar side chain. Families of amino acid residues having similar side chains have been defined in the art. These families include: amino acids with basic side chains (e.g., lysine, arginine, histidine); acidic side chains (e.g., aspartic acid, glutamic acid); uncharged polar side chains (e.g., glycine, asparagine, glutamine, serine, threonine, tyrosine, cysteine, tryptophan); nonpolar side chains (e.g., alanine, valine, leucine, isoleucine, proline, phenylalanine, methionine); beta-branched side chains (e.g., threonine, valine, isoleucine); and aromatic side chains (e.g., tyrosine, phenylalanine, tryptophan, histidine). includes one or more conservative modifications. The Cas protein with one or more conservative modifications may retain the desired functional properties, which can be tested using the functional assays known in the art. As used herein, the term "conservative sequence modifications" refers to amino acid modifications that do not significantly affect or alter the binding characteristics of the protein containing the amino acid sequence. Such conservative modifications include amino acid substitutions, additions, and deletions. Modifications can be introduced by standard techniques known in the art, such as site-directed mutagenesis and PCR-mediated mutagenesis. Conservative amino acid substitutions are ones in which the amino acid residue is replaced with an amino acid residue having a similar side chain. Families of amino acid residues having similar side chains have been defined in the art. These families include: amino acids with basic side chains (e.g., lysine, arginine, histidine); acidic side chains (e.g., aspartic acid, glutamic acid); uncharged polar side chains (e.g., glycine, asparagine, glutamine, serine, threonine, tyrosine, cysteine, tryptophan); nonpolar side chains (e.g., alanine, valine, leucine, isoleucine, proline, phenylalanine, methionine); beta-branched side chains (e.g., threonine, valine, isoleucine); and aromatic side chains (e.g., tyrosine, phenylalanine, tryptophan, histidine).

As used herein, the percent homology between two amino acid sequences is equivalent to the percent identity between the two sequences. The percent identity between the two sequences is a function of the number of identical positions shared by the sequences (i.e., % homology=# of identical positions/total # of positions×100), taking into account the number of gaps, and the length of each gap, which need to be introduced for optimal alignment of the two sequences. The comparison of sequences and determination of percent identity between two sequences can be accomplished using a mathematical algorithm, as described in the non-limiting examples below.

The percent identity between two amino acid sequences can be determined using the algorithm of E. Meyers and W. Miller (Comput. Appl. Biosci., 4:11-17 (1988)) which has been incorporated into the ALIGN program (version 2.0), using a PAM120 weight residue table, a gap length penalty of 12 and a gap penalty of 4. In addition, the percent identity between two amino acid sequences can be determined using the Needleman and Wunsch (J. Mol. Biol. 48:444-453 (1970)) algorithm which has been incorporated into the GAP program in the GCG software package (available at www.gcg.com), using either a Blossum62 matrix or a PAM250 matrix, and a gap weight of 16, 14, 12, 10, 8, 6, or 4 and a length weight of 1, 2, 3, 4, 5, or 6.

Additionally or alternatively, the protein sequences of the present disclosure can further be used as a "query sequence" to perform a search against public databases to, for example, identify related sequences. Such searches can be performed using the XBLAST program (version 2.0) of Altschul, et al. (1990) J. Mol. Biol. 215:403-10. BLAST protein searches can be performed with the XBLAST program, score=50, wordlength=3 to obtain amino acid sequences homologous to the antibody molecules of the present disclosure. To obtain gapped alignments for comparison purposes, Gapped BLAST can be utilized as described in Altschul et al. (1997) Nucleic Acids Res. 25(17):3389-3402. When utilizing BLAST and Gapped BLAST programs, the default parameters of the respective programs (e.g., XBLAST and NBLAST) can be used.

As used herein, the term "substantial identity" or "substantially identical," when referring to a nucleic acid or fragment thereof, indicates that, when optimally aligned with appropriate nucleotide insertions or deletions with another nucleic acid (or its complementary strand), there is nucleotide sequence identity in at least about 90%, and more preferably at least about 95%, 96%, 97%, 98% or 99% of the nucleotide bases, as measured by any well-known algorithm of sequence identity, such as FASTA, BLAST or GAP, as discussed below. A nucleic acid molecule having substantial identity to a reference nucleic acid molecule may, in certain instances, encode a polypeptide having the same or substantially similar amino acid sequence as the polypeptide encoded by the reference nucleic acid molecule. As applied to polypeptides, the term "substantial similarity" or "substantially similar" means that two peptide sequences, when optimally aligned, such as by the programs GAP or BESTFIT using default gap weights, share at least 90% sequence identity, even more preferably at least 95%, 98% or 99% sequence identity. Preferably, residue positions, which are not identical, differ by conservative amino acid substitutions. A "conservative amino acid substitution" is one in which an amino acid residue is substituted by another amino acid residue having a side chain (R group) with similar chemical properties (e.g., charge or hydrophobicity). In general, a conservative amino acid substitution will not substantially change the functional properties of a protein. In cases where two or more amino acid sequences differ from each other by conservative substitutions, the percent or degree of similarity may be adjusted upwards to correct for the conservative nature of the substitution. Means for making this adjustment are well known to those of skill in the art. See, e.g., Pearson (1994) Methods Mol. Biol. 24: 307-331, which is herein incorporated by reference.

As used herein, the term "recombinant," as used herein, refers to proteins or fragments thereof of the present disclosure created, expressed, isolated, or obtained by technologies or methods known in the art as recombinant DNA technology, which include, e.g., DNA splicing and transgenic expression. The term refers to fusion proteins expressed in a non-human mammal (including transgenic non-human mammals, e.g., transgenic mice), or a cell (e.g., CHO cells) expression system or isolated from a recombinant combinatorial human antibody library.

As used herein, the term "associated" in the context of a fusion protein or a component thereof (e.g., a targeting moiety such as an antibody) refers to a functional relationship between two or more polypeptide chains. In particular, the term "associated" means that two or more polypeptides are associated with one another, e.g., non-covalently through molecular interactions or covalently through one or more disulfide bridges or chemical cross-linkages, so as to produce a functional Fusion protein. Examples of associations that might be present in a fusion protein of the disclosure include (but are not limited to) associations between homodimeric or heterodimeric Fc domains in an Fc region, associations between VH and VL regions in a Fab or scFv, associations between CH1 and CL in a Fab, and associations between CH3 and CH3 in a domain substituted Fab.

As used herein, the term "monovalent" as used herein in reference to an IL2 moiety and/or a targeting moiety in a fusion protein means a fusion protein that has only a single IL2 moiety and/or targeting moiety (e.g., anti-PD-1 antibody or antigen-binding portion thereof), respectively.

As used herein, the term "bivalent" as used herein in reference to an IL2 moiety and/or a targeting moiety in a fusion protein means a fusion protein that has two IL2 moieties and/or targeting moieties (e.g., anti-PD-1 antibody or antigen-binding portion thereof), respectively. Typically, a fusion protein that is bivalent for an IL2 moiety and/or a targeting moiety is dimeric (either homodimeric or heterodimeric).

As used herein, the terms "complementarity determining region" or "CDR," as used herein, refer to the sequences of amino acids within antibody variable regions which confer antigen specificity and binding affinity. In general, there are three CDRs in each heavy chain variable region (CDR-H1, CDR-H2, HCDR-H3) and three CDRs in each light chain variable region (CDR1-L1, CDR-L2, CDR-L3). Exemplary conventions that can be used to identify the boundaries of CDRs include, e.g., the Kabat definition, the Chothia definition, the ABM definition, and the IMGT definition. See, e.g., Kabat, 1991, "Sequences of Proteins of Immunological Interest," National Institutes of Health, Bethesda, Md. (Kabat numbering scheme); Al-Lazikani et al., 1997, J. Mol. Biol. 273:927-948 (Chothia numbering scheme); Martin et al., 1989, Proc. Natl. Acad. Sci. USA 86:9268-9272 (ABM numbering scheme); and Lefranc et al., 2003, Dev. Comp. Immunol. 27:55-77 (IMGT numbering scheme). Public databases are also available for identifying CDR sequences within an antibody.

As used herein, the term "Fc domain" refers to a portion of the heavy chain that pairs with the corresponding portion of another heavy chain. The term "Fc region" refers to the region of antibody-based binding molecules formed by association of two heavy chain Fc domains. The two Fc domains within the Fc region may be the same or different from one another. In a native antibody the Fc domains are typically identical, but one or both Fc domains might advantageously be modified to allow for heterodimerization, e.g., via a knob-in-hole interaction.

As used herein, the term "EC50" refers to the half maximal effective concentration of a molecule (such as a fusion protein) which induces a response halfway between the baseline and maximum after a specified exposure time. The EC50 essentially represents the concentration of an antibody or fusion protein where 50% of its maximal effect is observed. In some embodiments, the EC50 value equals the concentration of a fusion protein that gives half-maximal STAT5 activation in an assay.

An epitope, or antigenic determinant, is a portion of an antigen (e.g., target molecule) recognized by an antibody or other antigen-binding moiety as described herein. An epitope can be linear or conformational.

As used herein, the term "subject" includes human and non-human animals. Non-human animals include all vertebrates, e.g., mammals and non-mammals, such as non-human primates, sheep, dog, cow, chickens, amphibians, and reptiles. Except when noted, the terms "patient" or "subject" are used herein interchangeably.

As used herein, the term "target molecule" as used herein refers to any biological molecule (e.g., protein, carbohydrate, lipid or combination thereof) expressed on a cell surface or in the extracellular matrix that can be specifically bound by a targeting moiety in a fusion protein of the disclosure.

As used herein, the terms "treat," "treatment," and "treating" refer to the reduction or amelioration of the progression, severity and/or duration of a proliferative disorder, or the amelioration of one or more symptoms (preferably, one or more discernible symptoms) of a proliferative disorder resulting from the administration of one or more fusion protein of the disclosure. In specific embodiments, the terms "treat," "treatment," and "treating" refer to the amelioration of at least one measurable physical parameter of a proliferative disorder, such as growth of a tumor, not necessarily discernible by the patient. In other embodiments, the terms "treat," "treatment," and "treating" refer to the inhibition of the progression of a proliferative disorder, either physically by, e.g., stabilization of a discernible symptom, physiologically by, e.g., stabilization of a physical parameter, or both. In other embodiments, the terms "treat," "treatment," and "treating" refer to the reduction or stabilization of tumor size or cancerous cell count.

As used herein, the term "cancer" refers to a disease characterized by the uncontrolled (and often rapid) growth of aberrant cells. Cancer cells can spread locally or through the bloodstream and lymphatic system to other parts of the body. Examples of various cancers are described herein and include, but are not limited to, breast cancer, prostate cancer, ovarian cancer, cervical cancer, skin cancer, pancreatic cancer, colorectal cancer, renal cancer, liver cancer, brain cancer, adrenal gland cancer, autonomic ganglial cancer, biliary tract cancer, bone cancer, endometrial cancer, eye cancer, fallopian tube cancer, genital tract cancers, large intestinal cancer, cancer of the meninges, oesophageal cancer, peritoneal cancer, pituitary cancer, penile cancer, placental cancer, pleura cancer, salivary gland cancer, small intestinal cancer, stomach cancer, testicular cancer, thymus cancer, thyroid cancer, upper aerodigestive cancers, urinary tract cancer, vaginal cancer, vulva cancer, lymphoma, leukemia, lung cancer and the like.

As used herein, the term "tumor" is used interchangeably with the term "cancer" herein, e.g., both terms encompass solid and liquid, e.g., diffuse or circulating, tumors. As used herein, the term "cancer" or "tumor" includes premalignant, as well as malignant cancers and tumors.

As used herein, the term "host cell," as used herein, refers to cells into which a nucleic acid of the disclosure has been introduced. The terms "host cell" and "recombinant host cell" are used interchangeably herein. It is understood that such terms refer to the particular subject cell and to the progeny or potential progeny of such a cell. Because certain modifications may occur in succeeding generations due to either mutation or environmental influences, such progeny may not, in fact, be identical to the parent cell, but are still included within the scope of the term as used herein. Typical host cells are eukaryotic host cells, such as mammalian host cells.

As used herein, "expression" refers to the process by which a polynucleotide is transcribed from a DNA template (such as into and mRNA or other RNA transcript) and/or the process by which a transcribed mRNA is subsequently translated into peptides, polypeptides, or proteins. Transcripts and encoded polypeptides may be collectively referred to as "gene product(s)." If the polynucleotide is derived from genomic DNA, expression may include splicing of the mRNA in a eukaryotic cell.

As used herein, an "isolated" nucleic acid molecule or polynucleotide refers to a nucleic acid molecule, DNA or RNA that has been removed from its native environment. For example, a recombinant polynucleotide encoding a therapeutic polypeptide contained in a vector is considered isolated for the purposes of the present disclosure. Further examples of an isolated polynucleotide include recombinant polynucleotides maintained in heterologous host cells or purified (partially or substantially) polynucleotides in solution. An isolated polynucleotide includes a polynucleotide molecule contained in cells that ordinarily contain the polynucleotide molecule, but the polynucleotide molecule is present extrachromosomally or at a chromosomal location that is different from its natural chromosomal location. Isolated RNA molecules include in vivo or in vitro RNA transcripts of the present disclosure, as well as positive and negative strand forms, and double-stranded forms. Isolated polynucleotides or nucleic acids, according to the present disclosure, further include such molecules produced synthetically. In addition, a polynucleotide or a nucleic acid may be or may include a regulatory element such as a promoter, ribosome binding site, or a transcription terminator.

As used herein, the term "disease" as used herein is intended to be generally synonymous and is used interchangeably with, the terms "disorder" and "condition" (as in medical condition), in that all reflect an abnormal condition of the human or animal body or of one of its parts that impairs normal functioning, is typically manifested by distinguishing signs and symptoms, and causes the human or animal to have a reduced duration or quality of life.

As used herein, the term "composition" or "pharmaceutical composition" refers to a mixture of at least one component useful with the presently disclosed fusion protein in combination with other components, such as carriers, stabilizers, diluents, dispersing agents, suspending agents, thickening agents, and/or excipients. The pharmaceutical composition facilitates administration of one or more components of the disclosure to an organism.

As used herein, the term "pharmaceutically acceptable" refers to a material, such as a carrier or diluent, which does not abrogate the biological activity or properties of the composition, and is relatively non-toxic, i.e., the material may be administered to a subject without causing undesirable biological effects or interacting in a deleterious manner with any of the components of the composition in which it is contained.

As used herein, the term "pharmaceutically acceptable carrier" includes a pharmaceutically acceptable salt, pharmaceutically acceptable material, composition or carrier, such as a liquid or solid filler, diluent, excipient, solvent or encapsulating material, involved in carrying or transporting a compound(s) of the present disclosure within or to the subject such that it may perform its intended function. Typically, such compounds are carried or transported from one organ, or portion of the body, to another organ, or portion of the body. Each salt or carrier must be "acceptable" in the sense of being compatible with the other ingredients of the formulation, and not injurious to the subject. Some examples of materials that may serve as pharmaceutically acceptable carriers include: sugars, such as lactose, glucose, and sucrose; starches, such as corn starch and potato starch; cellulose, and its derivatives, such as sodium carboxymethyl cellulose, ethyl cellulose, and cellulose acetate; powdered tragacanth; malt; gelatin; talc; excipients, such as cocoa butter and suppository waxes; oils, such as peanut oil, cottonseed oil, safflower oil, sesame oil, olive oil, corn oil, and soybean oil; glycols, such as propylene glycol; polyols, such as glycerin, sorbitol, mannitol and polyethylene glycol; esters, such as ethyl oleate and ethyl laurate; agar; buffering agents, such as magnesium hydroxide and aluminum hydroxide; alginic acid; pyrogen-free water; isotonic saline; Ringer's solution; ethyl alcohol; phosphate buffer solutions; diluent; granulating agent; lubricant; binder; disintegrating agent; wetting agent; emulsifier; coloring agent; release agent; coating agent; sweetening agent; flavoring agent; perfuming agent; preservative; antioxidant; plasticizer; gelling agent; thickener; hardener; setting agent; suspending agent; surfactant; humectant; carrier; stabilizer; and other non-toxic compatible substances employed in pharmaceutical formulations, or any combination thereof. As used herein, "pharmaceutically acceptable carrier" also includes any and all coatings, antibacterial and antifungal agents, and absorption delaying agents, and the like that are compatible with the activity of one or more components of the present disclosure, and are physiologically acceptable to the subject. Supplementary active compounds may also be incorporated into the compositions.

As used herein, the term "modulate" is meant to refer to any change in biological state, i.e., increasing, decreasing, and the like.

As used herein, the terms "increased," "increase" or "enhance" or "activate" are all used herein to generally mean an increase by a statically significant amount; for the avoidance of any doubt, the terms "increased," "increase" or "enhance" or "activate" means an increase of at least 10% as compared to a reference level, for example, an increase of at least about 20%, or at least about 30%, or at least about 40%, or at least about 50%, or at least about 60%, or at least about 70%, or at least about 80%, or at least about 90% or up to and including a 100% increase or any increase between 10-100% as compared to a reference level, or at least about a 2-fold, or at least about a 3-fold, or at least about a 4-fold, or at least about a 5-fold or at least about a 10-fold increase, or any increase between 2-fold and 10-fold or greater as compared to a reference level.

As used herein, the singular forms "a," "an," and "the" include plural reference unless the context clearly dictates otherwise.

As used herein, the terms "including," "comprising," "containing," or "having" and variations thereof are meant to encompass the items listed thereafter and equivalents thereof as well as additional subject matter unless otherwise noted.

As used herein, the phrases "in one embodiment," "in various embodiments," "in some embodiments," and the like are used repeatedly. Such phrases do not necessarily refer to the same embodiment, but they may unless the context dictates otherwise.

As used herein, the terms "and/or" or "/" means any one of the items, any combination of the items, or all of the items with which this term is associated.

As used herein, the word "substantially" does not exclude "completely," e.g., a composition that is "substantially free" from Y may be completely free from Y. Where necessary, the word "substantially" may be omitted from the definition.

As used herein, the term "approximately" or "about," as applied to one or more values of interest, refers to a value that is similar to a stated reference value. In some embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value). Unless indicated otherwise herein, the term "about" is intended to include values, e.g., weight percents, proximate to the recited range that are equivalent in terms of the functionality of the individual ingredient, the composition, or the embodiment.

As disclosed herein, a number of ranges of values are provided. It is understood that each intervening value, to the tenth of the unit of the lower limit, unless the context clearly dictates otherwise, between the upper and lower limits of that range is also specifically disclosed. Each smaller range between any stated value or intervening value in a stated range and any other stated or intervening value in that stated range is encompassed by the present disclosure. The upper and lower limits of these smaller ranges may independently be included or excluded in the range, and each range where either, neither, or both limits are included in the smaller ranges is also encompassed by the present disclosure, subject to any specifically excluded limit in the stated range. Where the stated range includes one or both of the limits, ranges excluding either or both of those included limits are also encompassed by the present disclosure.

As used herein, the term "each," when used in reference to a collection of items, is intended to identify an individual item in the collection but does not necessarily refer to every item in the collection. Exceptions can occur if explicit disclosure or context clearly dictates otherwise.

The use of any and all examples, or exemplary language (e.g., "such as") provided herein, is intended merely to better illuminate the present disclosure and does not pose a limitation on the scope of the invention unless otherwise claimed. No language in the specification should be construed as indicating any non-claimed element as essential to the practice of the present disclosure.

All methods described herein are performed in any suitable order unless otherwise indicated herein or otherwise clearly contradicted by context. In regard to any of the methods provided, the steps of the method may occur simultaneously or sequentially. When the steps of the method occur sequentially, the steps may occur in any order, unless noted otherwise. In cases in which a method comprises a combination of steps, each and every combination or sub-combination of the steps is encompassed within the scope of the disclosure, unless otherwise noted herein.

Each publication, patent application, patent, and other reference cited herein is incorporated by reference in its entirety to the extent that it is not inconsistent with the present disclosure. Publications disclosed herein are provided solely for their disclosure prior to the filing date of the present disclosure. Nothing herein is to be construed as an admission that the present disclosure is not entitled to antedate such publication by virtue of prior disclosure. Further, the dates of publication provided may be different from the actual publication dates, which may need to be independently confirmed.

It is understood that the examples and embodiments described herein are for illustrative purposes only and that various modifications or changes in light thereof will be suggested to persons skilled in the art and are to be included within the spirit and purview of this application and scope of the appended claims.

EXAMPLES

The following examples are put forth so as to provide those of ordinary skill in the art with a complete disclosure and description of how to make and use the methods and compositions of the present disclosure and are not intended to limit the scope of what the inventors regard as their invention. Likewise, the disclosure is not limited to any particular preferred embodiments described herein. Indeed, modifications and variations of the embodiments may be apparent to those skilled in the art upon reading this specification and can be made without departing from its spirit and scope. Efforts have been made to ensure accuracy with respect to numbers used (e.g., amounts, temperature, etc.) but some experimental errors and deviations should be accounted for. Unless indicated otherwise, parts are parts by weight, molecular weight is average molecular weight, temperature is in degrees Centigrade, room temperature is about 25° C., and pressure is at or near atmospheric.

Example 1: Generation of Human Antibodies to Human PD-1

Human antibodies to PD-1 protein were generated in a VELOCIMMUNE® mouse comprising DNA encoding human immunoglobulin heavy and kappa light chain variable regions. The mice were immunized with a fragment of PD-1 that ranges from about amino acids 25-170 of GenBank Accession NP_005009.2 in the presence of an adjuvant. The antibody immune response was monitored by a PD-1-specific immunoassay. When a desired immune response was achieved, splenocytes were harvested and fused with mouse myeloma cells to preserve their viability and form hybridoma cell lines. The hybridoma cell lines were screened and selected to identify cell lines that produce PD-1-specific antibodies.

Anti-PD-1 antibodies were isolated directly from antigen-positive mouse B cells without fusion to myeloma cells, as described in U.S. Pat. No. 7,582,298, herein specifically incorporated by reference in its entirety.

Using this method, several fully human anti-PD-1 antibodies (i.e., antibodies possessing human variable domains and human constant domains) were obtained.

Exemplary antibodies generated as disclosed above were designated as mAb29512, mAb7798, and mAb9048, having HCVR, HCDR1, HCDR2, HCDR3, LCVR, LCDR1, LCDR2, and LCDR3 amino acid and nucleic acid sequences as identified in Tables 1 and 2.

Exemplary anti-PD-1 antibodies were used in the construction of IL2-based reagents using standard molecular biology techniques known in the art. Table 4 discloses the amino acid sequences of the reagents.

The biological properties of the exemplary proteins generated in accordance with the methods of this Example are described in detail in the Examples set forth below.

Example 2: Heavy and Light Chain Variable Region Amino Acid and Nucleotide Sequences Table 1 sets forth the amino acid sequence identifiers of the heavy and light chain variable region sequences, CDR sequences of exemplary anti-PD-1 antibodies.

TABLE 1

| Antibody | Amino Acid Identifiers | | | | | | | |
|---|---|---|---|---|---|---|---|---|
| | SEQ ID NOs: | | | | | | | |
| ID | HCVR | HCDR1 | HCDR2 | HCDR3 | LCVR | LCDR1 | LCDR2 | LCDR3 |
| mAb29512 | 2 | 4 | 6 | 8 | 10 | 12 | 14 | 16 |
| mAb7798 | 22 | 24 | 26 | 28 | 30 | 32 | 14 | 35 |
| mAb9048 | 41 | 43 | 45 | 47 | 10 | 12 | 14 | 16 |

The corresponding nucleic acid sequence identifiers of the exemplary anti-PD-1 antibodies are set forth in Table 2.

TABLE 2

Nucleic Acid Identifiers

| Antibody ID | SEQ ID NOs: | | | | | | | |
|---|---|---|---|---|---|---|---|---|
|  | HCVR | HCDR1 | HCDR2 | HCDR3 | LCVR | LCDR1 | LCDR2 | LCDR3 |
| mAb29512 | 1 | 3 | 5 | 7 | 9 | 11 | 13 | 15 |
| mAb7798 | 21 | 23 | 25 | 27 | 29 | 31 | 33 | 34 |
| mAb9048 | 40 | 42 | 44 | 46 | 9 | 11 | 13 | 15 |

The antibodies may have a human or mouse Fc isotype. As will be appreciated by a person of ordinary skill in the art, an antibody having a particular Fc isotype can be converted to an antibody with a different Fc isotype (e.g., an antibody with a mouse IgG1 Fc can be converted to an antibody with a human IgG1 or a human IgG4, etc.), but in any event, the variable domains (including the CDRs)—which are indicated by the numerical identifiers shown in Table 1—will remain the same, and the binding properties to the antigen are expected to be identical or substantially similar regardless of the nature of the Fc domain.

Exemplary antibodies of mAb29512, mAb7798, and mAb9048 comprising a human IgG4 Fc comprising a serine to proline mutation in the hinge region (S108P) were designated as H4H29512, REGN2810, and H4H9048, respectively. Table 3 sets forth the amino acid sequence identifiers of full-length heavy chain and light chain sequences of these antibodies.

TABLE 3

Heavy chain (HC) and light chain (LC) sequences of anti-PD-1 antibodies

| Antibody ID | Antibody Name | SEQ ID NOs: | | | |
|---|---|---|---|---|---|
|  |  | HC | | LC | |
|  |  | DNA | PEP | DNA | PEP |
| mAb29512 | H4H29512 | 17 | 18 | 19 | 20 |
| mAb7798 | REGN2810 | 36 | 37 | 38 | 39 |
| mAb9048 | H4H9048 | 48 | 49 | 19 | 20 |

REGN2810 (also known as cemiplimab; LIBTAYO®) was first disclosed in U.S. Pat. No. 9,987,500 and has since been approved for the treatment of cutaneous squamous cell carcinoma, basal cell carcinoma, and non-small cell lung cancer.

Table 4 sets forth the amino acid sequence identifiers of the anti-PD-1-IL2Rα-IL2 reagents.

TABLE 4

Amino acid identifiers of anti-PD-1-IL2Rα-IL2

| ID | SEQ ID NOs: | | | | | | | | | | |
|---|---|---|---|---|---|---|---|---|---|---|---|
|  | HCVR | HCDR1 | HCDR2 | HCDR3 | LCVR | LCDR1 | LCDR2 | LCDR3 | HC | LC | IL2 moiety |
| REGN10595 | 2 | 4 | 6 | 8 | 10 | 12 | 14 | 16 | 57 | 58 | 54 |
| REGN10486 | 22 | 24 | 26 | 28 | 30 | 32 | 14 | 35 | 59 | 60 | 54 |
| REGN10597 | 41 | 43 | 45 | 47 | 10 | 12 | 14 | 16 | 61 | 62 | 54 |

The IL2 moiety is connected to the C-terminal of the heavy chain constant region (SEQ ID NO: 55) via a linker comprising an amino acid sequence of SEQ ID NO: 50. For example, REGN10595 includes the heavy chain (HC) SEQ ID NO: 57 (which includes the amino acid sequences of the HCVR (SEQ ID NO: 2) and the heavy chain constant region (SEQ ID NO: 55), the linker (SEQ ID NO: 50), and the IL2 moiety (SEQ ID NO: 54). REGN10486 includes the heavy chain (HC) SEQ ID NO: 59 (which includes the amino acid sequences of the HCVR (SEQ ID NO: 22) and the heavy chain constant region (SEQ ID NO: 55), the linker (SEQ ID NO: 50), and the IL2 moiety (SEQ ID NO: 54). REGN10597 includes the heavy chain (HC) SEQ ID NO: 61 (which includes the amino acid sequences of the HCVR (SEQ ID NO: 41) and the heavy chain constant region (SEQ ID NO: 55), the linker (SEQ ID NO: 50), and the IL2 moiety (SEQ ID NO: 54).

Control Constructs Used in the Following Examples:

The following control constructs were included in the following Examples for comparative purposes: "Comp 1": a monoclonal anti-PD-1 antibody having $V_H/V_L$ sequences of antibody "MK-3475" according to WO 2008/156712 (Merck Sharp & Dohme); "Comp 2": a monoclonal anti-PD-1 antibody having $V_H/V_L$ sequences of antibody "5C4" according to WO2006/121168 (Medarex, Inc/E R Squibb); and "REGN13233": an anti-PD-1 antibody comprising VH/VL sequences of SEQ ID NOs: 41/10 and linked to an IL2 variant (IL2(3 m)) having abolished CD25 binding (Klein et al., 2017, Oncoimmunology).

Example 3: Binding Kinetics of Anti-PD1-IL2Rα-IL2 Fusion Constructs and Parental Bivalent Anti-PD1 Antibodies To evaluate binding kinetics of anti-PD1-IL2RA-IL2 fusion constructs and parental bivalent anti-PD1 antibodies, equilibrium dissociation constants ($K_D$ values) for human PD-1 expressed with a C-terminal myc-myc-hexahistidine tag (hPD-1.mmH, SEQ ID NO: 66) binding to purified anti-PD-1 parental mAbs and anti-PD1-IL2RA-IL2 fusion constructs were determined using a real-time surface plasmon resonance biosensor using a Biacore 3000 or 4000 instrument. The CM5 Biacore sensor surface was derivatized by amine coupling with a monoclonal mouse anti-human Fc antibody (GE, #BR-1008-39). All Biacore binding studies were performed in a buffer composed of 0.01M HEPES pH 7.4, 0.15M NaCl, 3 mM EDTA, 0.05% v/v Surfactant P20 (HBS-EP running buffer). Different concentrations of hPD-1.mmH prepared in HBS-EP running buffer (ranging from 100 to 3.7 nM in 3-fold dilutions or to or 90 nM to 3.33 nM in 3-fold dilutions) were injected over the anti-PD-1 antibody or anti-PD1-IL2Rα-IL2 fusion construct captured surface at a flow rate of 30 or 50 µL/minute. Antibody-reagent association was monitored for 4 or 5 minutes, while dissociation in HBS-EP running buffer was monitored for 10 minutes. At the end of each cycle, the anti-PD-1 mAb or anti-PD1-IL2Rα-IL2 fusion construct capture surface was regenerated using a 12 sec injection of 20 mM phosphoric acid. All binding kinetics experiments were performed at 25° C.

Kinetic association ($k_a$) and dissociation ($k_d$) rate constants were determined by fitting the real-time sensorgrams to a 1:1 binding model using Scrubber 2.0c curve fitting software. Binding dissociation equilibrium constants ($K_D$) and dissociative half-lives (t½) were calculated from the kinetic rate constants as:

$$K_D(M) = \frac{kd}{ka}, \text{ and } t1/2(\min) = \frac{\ln(2)}{60 * kd}$$

The binding kinetics of anti-PD1-IL2Rα-IL2 fusion constructs and parental bivalent anti-PD1 antibodies are summarized in Table 5.

TABLE 5 hPD-1.mmH binding kinetics to anti-PD-1 mAbs and anti-PD1-IL2Rα-IL2 fusion constructs at 25° C.

| REGN #/ Ab PID # | mAb Capture (RU) | 90 nM or 100 nM hPD-1.mmH Bind (RU) | ka (1/Ms) | kd (1/s) | KD (M) | t1/2 (min) |
|---|---|---|---|---|---|---|
| REGN10486 | 241.8 ± 6.4 | 46.9 | 1.07E+05 | 3.02E−04 | 2.83E−09 | 38.3 |
| REGN2810 | 337.6 ± 3.9 | 88.7 | 9.88E+04 | 2.53E−04 | 2.56E−09 | 45.7 |
| REGN10595 | 186.5 ± 1.5 | 44.7 | 1.04E+05 | 4.76E−04 | 4.59E−09 | 24.3 |
| mAb29512 | 481.1 ± 1.3 | 123.8 | 1.38E+05 | 4.27E−04 | 3.10E−09 | 27.1 |
| REGN10597 | 211.5 ± 2.6 | 41.8 | 1.48E+05 | 5.82E−04 | 3.92E−09 | 19.9 |
| mAb9048 | 229.91 | 52.7 | 1.37E+05 | 1.23E−03 | 8.95E−09 | 9.4 |

Example 4: Cross-Competition of Anti-PD-1 mAbs and Anti-PD1-IL2Rα-IL2 Fusion Constructs To evaluate cross-competition of anti-PD-1 mAbs and anti-PD1-IL2Rα-IL2 fusion constructs, binding competition between anti-PD1-IL2Rα-IL2 and commercial anti-PD-1 mAbs was determined using a real-time, label-free bio-layer interferometry (BLI) assay on an Octet HTX biosensor (ForteBio Corp., A Division of Sartorius). The entire experiment was performed at 25° C. in a buffer comprised of 0.01M HEPES pH7.4, 0.15M NaCl, 3 mM EDTA, 0.05% v/v Surfactant P20, 0.1 mg/mL BSA (Octet HBS-EP buffer) with the plate shaking at a speed of 1000 rpm. To assess whether two antibodies are able to compete with one another for binding to their respective epitopes on the hPD-1.mmH (SEQ ID NO: 66), approximately ~0.34 nm of hPD-1.mmH was first captured onto HIS1K antibody-coated Octet biosensors (Fortebio Inc, #18-5120) by submerging the biosensors for 2 minutes into wells containing a 20 µg/mL solution of hPD-1.mmH. The antigen-captured biosensors were then saturated with the first anti-PD-1 antibody or anti-PD1-IL2Rα-IL2 fusion construct (subsequently referred to as mAb-1) by immersion into wells containing a 50 µg/mL solution of mAb-1 for 5 minutes. The biosensors were then subsequently submerged into wells containing a 50 µg/mL solution of a second anti-PD-1 antibody or anti-PD1-IL2Rα-IL2 fusion construct (subsequently referred to as mAb-2) for 3 minutes. All the biosensors were washed in Octet HBS-EP buffer in between each step of the experiment. The real-time binding response was monitored during the course of the experiment, and the binding response at the end of every step was recorded—the response of mAb-2 binding to hPD-1.mmH pre-complexed with mAb-1 was compared, and competitive/non-competitive behaviors of different anti-PD-1 antibodies were determined using a 50% inhibition threshold.

Table 6 defines the relationships of antibodies competing in both directions, independent of the order of binding.

TABLE 6

Cross-competition of anti-PD-1 mAbs andanti-PD1-IL2Rα-IL2 fusion constructs for binding to hPD-1.mmh

| First mAb (mAb-1) Captured using HIS1K Octet Biosensors | mAb-2 Antibodies Shown to Compete with mAb-1 |
|---|---|
| REGN10486 | REGN2810 |
| REGN2810 | REGN10486 |

TABLE 6-continued

Cross-competition of anti-PD-1 mAbs andanti-PD1-IL2Rα-IL2 fusion constructs for binding to hPD-1.mmh

| First mAb (mAb-1) Captured using HIS1K Octet Biosensors | mAb-2 Antibodies Shown to Compete with mAb-1 |
|---|---|
| REGN10595 | REGN10597 |
| REGN10597 | REGN10595 |

Table 6 shows that REGN10486 as well as its parental antibody REGN2810 did not cross-compete with either REGN10595 or REGN10597 for binding to hPD-1.

Example 5: In Vitro Functional Characterization of Anti-PD1-IL2Rα-IL2 Constructs Cell Line Engineering Engineering of YT/reporter cells: The human T/NK cell leukemia YT cell line was electroporated with a Signal Transducer and Activator of Transcription 5 (STAT5)-luciferase reporter construct and maintained in Iscoves+20% FBS+P/S/G+200 µg/mL hygromycin. A single cell clone, having high responsiveness to IL-2, was identified and renamed YT/Stat5-Luc cl.4. IL2Rα (CD25) was knocked out in this clone using CRISPR-Cas9 technology, and the resulting cell line, YT/STAT5-Luc/IL2Rα KO, was validated by flow cytometry. Human IL2Rα was then stably reintroduced into the YT/STAT5-Luc/IL2Rα KO cell line (amino acids M1-1272 of accession number NP_000408.1), and the resulting cell line, YT/STAT5-Luc/hIL2Rα, was validated by flow cytometry and maintained in Iscoves+20% FBS+P/S/G+200 µg/mL hygromycin+15 µg/mL blasticidin. YT/Stat5-Luc cl.4, YT/Stat5-Luc/IL2Rα KO, and YT/Stat5-Luc/hIL2Rα cells were engineered to stably express human PD1 (amino acids M1-L288 of accession number NP_005009.2, with a 2Q=>E mutation) and cells selected in media supplemented with 1 mg/mL G418. Cells were validated by flow cytometry and renamed YT/STAT5-Luc/hPD1, YT/STAT5-Luc/IL2Rα KO/hPD1, and YT/STAT5-Luc/hIL2Rα/hPD1.

Engineering of PD1 reporter cells: Jurkat E6-1 cells were engineered to stably express an Activation Protein 1 (AP1) luciferase reporter construct, and antibiotic-resistant cells were selected and maintained in RPMI+10% FBS+P/S/G+1 µg/mL puromycin. The resulting pool of reporter cells was engineered to express human PD1 (amino acids M1-L288 of accession number NP_005009.2 with a 2Q=>E mutation), and a high PD-1 expressing clonal cell line was isolated by fluorescence-activated cell sorting and maintained in RPMI+10% FBS+P/S/G+1 µg/mL puromycin. The resulting clone was renamed Jurkat/AP1-Luc/hPD1 cl. 4E5.

Engineering of HEK293/anti-CD3/PD-L1 cells: HEK293 were transduced with a lentiviral vector encoding human CD79a (hIga: M1-P226 of accession number NP_001774.1), human CD79b (hIgb: M1-E229 of accession number NP_000617.1), anti-CD3 variable domains (anti-CD3 mIgE heavy chain, anti-CD3 kappa light chain; clone 2706N, IgE genbank #AAB59424.1, CemX-migis-Cyto/TM PIR #PIH1215) and human PD-L1 (amino acids M1-T290 of accession number NP_054862.1) then single cell sorted and maintained in DMEM+10% FBS+P/S/G+500 ug/mL G418+100 ug/mL hygromycin+1 ug/mL puromycin. Anti-CD3 and PD-L1 expression was confirmed by flow cytometry and the resulting clonal line was renamed 293/aCD3/hPD-L1 cl. A3.

Engineering of Raji/CD80 KO/CD86 KO and Raji/CD80 KO/CD86 KO/PD-L1 cells: CRISPR-Cas9 technology was used to eliminate CD80 and CD86 expression in Raji cells. Raji/CD80 KO/CD86 KO cells were single-cell cloned, and a resulting clone (Raji/CD80 KO/CD86 KO cl.1D6) was engineered to express human PD-L1 (amino acids M1-T290 of accession number NP_054862.1). The resulting cell line Raji/CD80 KO/CD86 KO/hPD-L1 was validated by flow cytometry and maintained in RPMI-1640+10% FBS+HEPES+NaPyr+P/S/G+0.5 ug/mL puromycin.

PD1 Antagonistic Assay

HEK293 cells expressing membrane-bound anti-hCD3 epsilon and human PD-L1 were incubated with Jurkat/AP1-Luc/hPD-1 reporter T cells. Clustering of CD3 in complex with T cell receptor on reporter cells via anti-CD3 on HEK293 cells leads to activation of the transcription factor AP1, which drives luciferase reporter gene expression. However, luciferase expression in reporter T cells can be suppressed by the interaction of the inhibitory receptor PD-1 with PD-L1 on HEK293 cells, which can be overcome by the addition of antibodies blocking the PD1/PD-L1 axis.

RPMI1640 supplemented with 10% FBS and P/S/G was used as an assay medium to prepare cell suspensions and antibody dilutions. A day prior to screening, engineered Jurkat/AP1-Luc/hPD1 reporter cells were diluted to $3 \times 10^5$ cells/mL. On the day of the assay, cells were spun down, resuspended in the assay medium, and plated at $2.5 \times 10^4$ 293/aCD3/hPD-L1 cells/well in 96 well white flat-bottom plates. Serially diluted (1:4) non-targeted IL2Rα-IL2 [anti-PSMA-IL2Rα-IL2 (IL2Rα-IL2 fused to an unrelated (PSMA) antibody), anti-PD1 (REGN2810, H4H29512 or H4H9048), anti-PD1-IL2Rα-IL2 (REGN10486, REGN10595, REGN10597) or isotype controls (isotype control 1 or isotype control 2) over an 11-point titration range (500 nM to 477 fM), with a $12^{th}$ point containing no recombinant protein, were then added to the plated cells, followed by the addition of $2.5 \times 10^4$ Jurkat/AP1-Luc/hPD1 reporter cells/well. Plates were incubated for 5 hours at 37° C./5% $CO_2$, and then 100 µL ONE-Glo™ (Promega) reagent was added to the wells to lyse the cells and detect luciferase activity. The emitted light was measured in relative light units (RLU) on a multilabel plate reader Envision (PerkinElmer). $EC_{50}$ values of the antibodies were determined using GraphPad Prism™ software from a four-parameter logistic equation over a 12-point dose-response curve. Fold induction was calculated using the following equation:

$$\text{Fold induction} = \frac{\text{Highest mean } RLU \text{ value within tested dose range}}{\text{Mean } RLU \text{ values of no protein control}}$$

IL2 Reporter Assay

In this experiment, engineered YT reporter cells are stimulated via either recombinant IL2-Fc, non-targeted IL2Rα-IL2, or anti-PD1-IL2Rα-IL2 fusion constructs. Functional IL2 receptors are formed by the differential assembly of IL2R subunits (IL2Rα, IL2Rβ, and IL2Rγ), with assembly of the IL2Rβ/IL2Rγ subunits comprising a low affinity receptor and receptors containing all three subunits (IL2Rα/IL2Rβ/IL2Rγ) forming a high affinity receptor. Binding of cytokine by IL2R leads to activation of STAT5, which drives luciferase production in the engineered cell lines. To assess the relative potency of anti-PD1-IL2Rα-IL2 in the presence of the low affinity (IL2Rβ/γ) or high affinity (IL2Rα/β/γ) IL2 receptor, YT/STAT5-Luc reporter cells that expressed endogenous IL2Rα were engineered to lack or overexpress IL2Rα. While the reporter cells express endogenous PD1, derivatives in which PD1 was over-expressed were generated to assess the impact of PD1 expression levels on anti-PD1-IL2Rα-IL2 potency.

RPMI1640 supplemented with 10% FBS and P/S/G was used as assay medium to prepare cell suspensions and antibody dilutions. A day prior to screening, engineered reporter YT/Stat5-Luc cells over-expressing or devoid of IL2Rα and endogenously expressing or over-expressing PD1 were diluted at $3 \times 10^5$ cells/mL. On the day of the assay, $2.5 \times 10^4$ reporter cells/well were plated, in fresh assay media, in 96 well white flat-bottom plates, and were incubated with IL2-Fc (SEQ ID NO: 74), non-targeted IL2Rα-IL2, REGN10486, REGN10595, REGN10597, or an isotype control, serially diluted (1:4) over an 11-point titration range (200 nM to 191 fM), and a $12^{th}$ point containing no recombinant protein. Plates were incubated for 5 hours at 37° C./5% $CO_2$, and then 100 µL ONE-Glo™ (Promega) reagent was added to the wells to lyse the cells and detect luciferase activity. The emitted light was measured in RLU on a multilabel plate reader Envision (PerkinElmer). $EC_{50}$ values of the antibodies were determined using GraphPad Prism™ software from a four-parameter logistic equation over a 12-point dose-response curve. Fold induction was calculated using the following equation:

$$\text{Fold induction} = \frac{\text{Highest mean } RLU \text{ value within tested dose range}}{\text{Mean } RLU \text{ values of no protein control}}$$

PD1 Competition Assay

Anti-PD1 bivalent antibody or an isotype control are added to engineered YT reporter cells prior to their stimulation via either a non-targeted IL2Rα-IL2 or anti-PD1-IL2Rα-IL2 fusion constructs. Competition of the bivalent anti-PD1, with anti-PD1-IL2Rα-IL2, would blunt the ability of anti-PD1-IL2Rα-IL2 to target, and therefore activate, PD-1 expressing STAT5-Luc reporter cells. PD1 over-expressing reporter cells are used to maximize targeting efficiency and allow the best detection of anti-PD1 bivalent competition with anti-PD1-IL2Rα-IL2.

RPMI1640 supplemented with 10% FBS and P/S/G was used as assay medium to prepare cell suspensions and antibody dilutions. A day prior to screening, YT/Stat5-Luc/hPD1 reporter cells, knocked out or overexpressing IL2Rα, were diluted at $3 \times 10^5$ cells/mL. On the day of the assay, $2.5 \times 10^4$ reporter cells/well, were plated in assay medium, into 96 well white flat-bottom plates, and a titration of anti-PD1 bivalent or isotype control antibodies (5 point, 1:10 dilution ranging from 500 nM to 0.05 nM with the $6^{th}$ point containing no recombinant protein) were added, followed by the addition of a titration of non-targeted IL2Rα-IL2, REGN10486, REGN10595, or REGN10597 (62.5 nM to 59.6 fM; 1:4 serial dilution over an 11-point dilution range with a $12^{th}$ point containing no recombinant protein). Plates were incubated for 4 hours at 37° C./5% $CO_2$, and then 100 µL ONE-Glo™ (Promega) reagent was added to the wells to lyse cells and detect luciferase activity. The emitted light was measured in RLU on a multilabel plate reader Envision (PerkinElmer). $EC_{50}$ values of the antibodies were determined using the GraphPad Prism™ software from a four-parameter logistic equation over a 12-point dose-response curve. Fold induction was calculated using the following equation:

$$\text{Fold induction} = \frac{\text{Highest mean } RLU \text{ value within tested dose range}}{\text{Mean } RLU \text{ values of no protein control}}$$

Primary T Cell Stimulation Assay

Primary T-cells are stimulated via a 4-day coculture with mitomycin-treated Raji/CD80 KO/CD86 KO cells. As Raji cells endogenously express CD20, a CD20×CD3 bispecific antibody was added to activate primary T-cells. A titration of an isotype control, IL2, anti-PD1, a non-targeted IL2Rα-IL2 antibody (REGN9904) or anti-PD1-IL2Rα-IL2 (REGN10486, REGN10595 or REGN10597) were added during the coculture, and their impact on T-cell activity was determined by measuring the release of IFN-γ in the cell culture supernatant using homogenous, no wash, AlphaLISA kits (Perkin Elmer).

Human peripheral blood mononuclear cells (PBMCs) were isolated from a healthy donor leukopak using an EasySep Direct Human PBMC Isolation kit (Stemcell) following the manufacturer's recommended protocol. T cells were isolated from PBMCs using an EasySep Human T cell isolation kit (Stemcell) in agreement with the manufacturer's protocol. Cells were spun down, resuspended in stimulation media (X-VIVO 15 cell culture media supplemented with 10% FBS, HEPES, NaPyr, NEAA, and 0.01 mM BME), and $1 \times 10^5$ cells/well plated out into 96-well round-bottom plates. Raji/CD80 KO/CD86 KO and Raji/CD80 KO/CD86 KO/hPD-L1 cells were treated with 20 µg/mL mitomycin C, in primary stimulation media at a concentration of $10 \times 10^6$ cells/mL for 1 hour at 37° C., in order to arrest cell growth. Cells were then washed 3 times with D-PBS containing 2% FBS, and $5 \times 10^4$ cells were added per well. Subsequently, 0.5 nM of an anti-CD3×anti-CD20 bispecific antibody was added, in conjunction with a titration of anti-PD1, IL2, a combination of REGN2810+IL2, a non-targeted IL2Rα-IL2 antibody, anti-PD1-IL2Rα-IL2 (REGN10486, REGN10595 or REGN10597) or isotype control antibody (isotype control 1 or isotype control 2) in a 9-point, 1:6 serial dilution ranging from 500 nM to 0.3 pM, with the $10^{th}$ dilution point containing only 0.5 nM constant of the bispecific antibody. The plates were incubated for 96 hours at 37° C./5% $CO_2$. IFN-γ was quantified in the cell culture supernatant using an AlphaLISA assay according to the manufacturer's protocols using samples with known IFN-γ concentrations in order to extrapolate the pg/mL of IFN-γ in each sample well. The measurements were acquired on the multilabel plate reader Envision (Perkin Elmer). The $EC_{50}$ values of the cytokines were determined using the GraphPad Prism™ software from a four-parameter logistic equation over a 10-point dose-response curve, where the $10^{th}$ dilution point contained only 0.5 nM constant of the bispecific antibody.

Results Summary and Conclusions

PD1 Antagonistic Assay:

The ability of anti-PD1-IL2Rα-IL2 fusion constructs to block PD1/PD-L1-mediated suppression of TCR signaling was assessed using an AP1-reporter cell-based bioassay. Incubation of 293/aCD3/hPD-L1 cells with Jurkat/AP1-Luc/hPD1 reporter cells leads to reduced reporter activity due to PD1 activation by PD-L1. The ability of bivalent anti-PD1 antibodies or antibody fused IL2Rα-IL2 proteins to block PD1-PD-L1 interaction and rescue reporter activity was evaluated. $EC_{50}$ and fold induction values are summarized in Table 7 for engineered reporter cells.

When reporter cells are treated with control proteins (isotype control Ab 1, isotype control Ab 2, or a non-targeted IL2Rα-IL2), no increase in luciferase activity was detected. In contrast, incubation of the reporter cells with anti-PD1 antibody, REGN2810, or the corresponding anti-PD1-IL2Rα-IL2, REGN10486, enhanced luciferase activity (19.210 and 17.740-fold, respectively) with similar potency (3.668E-09 and 5.351E-09, respectively). Bivalent PD1 antibodies, H4H29512 and H4H9048 on the other hand, did not enhance luciferase activity, and corresponding anti-PD1-IL2R-IL2 proteins, REGN10595 and REGN10597, induced low luciferase activity (2.725 and 3.038-fold, respectively) with weak potency (1.266E-08 and 1.264E-08, respectively).

IL2 Reporter Assay:

The ability of anti-PD1-IL2Rα-IL2 fusion constructs to induce PD1 targeted IL-2 receptor signaling was assessed using a STAT5-reporter assay. YT/STAT5-Luc reporter cells that expressed endogenous IL2Rα, lacked IL2Rα expression (KO cells), or overexpressed IL2Rα, as well as expressed endogenous or overexpressed PD1, were co-incubated with an isotype control, IL2-Fc, a non-targeted IL2Rα-IL2 or anti-PD1-IL2Rα-IL2 (REGN10486, REGN10595, or REGN10597) and STAT5 reporter activity was assessed. Fold induction values and $EC_{50}$ are summarized in Tables 8 and 9, respectively.

In comparison to IL2, non-targeted IL2Rα-IL2 exhibited reduced induction of STAT5 reporter activity, regardless of IL2Rα expression. PD1 targeted molecules displayed increased potency compared to non-targeted IL2Rα-IL2, irrespective of IL2Rα expression. Furthermore, when PD1 was overexpressed on reporter cells, anti-PD1-IL2Rα-IL2 potency further increased toward a potency similar to IL2.

PD-1 Competition Assay:

The ability of anti-PD1 bivalent mAbs to interfere with anti-PD1-IL2Rα-IL2 fusion constructs was assessed using a STAT5-reporter bioassay. YT/STAT5-Luc reporter cells that over-expressed IL2Rα or lacked IL2Rα expression, and overexpressed PD1, were incubated with 500 nM of either isotype control or anti-PD1 bivalent mAbs (REGN2810, Comp 1 or Comp 2) prior to incubation with a titration of non-targeted IL2Rα-IL2 or PD1 targeted anti-PD1-IL2Rα-IL2 constructs (REGN10486, REGN10595, or REGN10597). Following incubation, STAT5 reporter activity was assessed. Competition of anti-PD1 bivalent mAbs with anti-PD1-IL2Rα-IL2 would result in loss of PD1 targeting by anti-PD1-IL2Rα-IL2, leading to reduced reporter activity. $EC_{50}$ values are summarized in Table 10.

In the absence of bivalent PD1 mAbs, PD1 targeted IL2Rα-IL2 (REGN10486, REGN10595, REGN10597) had greater potency compared to non-targeted IL2Rα-IL2 (REGN9904). While REGN10486 potency was strongly reduced by incubation of reporter cells with PD1 antibody (REGN2810, Comp 1 or Comp 2), the impact on REGN10595 and REGN10597 potency was minimal, regardless of IL2Rα expression. The addition of anti-PD1 (REGN2810, Comp 1 or Comp 2) had no effect on the potency of the non-targeted IL2Rα-IL2.

Primary T Cell Stimulation Assay:

The ability of anti-PD1-IL2Rα-IL-2 to enhance T cell stimulation was assessed in a functional primary T-cell assay measuring IFN-γ cytokine production. T cells incubated with mitomycin C treated Raji/CD80 KO/CD86 KO or Raji/CD80 KO/CD86 KO/hPD-L1 cells were treated with a constant amount of 0.5 nM of an anti-CD3×anti-CD20 bispecific antibody and a titration of isotype control, IL2, an anti-PD1 bivalent antibody (REGN2810) alone or in combination with IL2, a non-targeted IL2Rα-IL2, or anti-PD1-IL2Rα-IL2 (REGN10486, REGN10595 or REGN10597). Co-incubation of the T cells with the Raji cells for 4 days led to measurable IFN-γ release. In the presence of Raji/CD80 KO/CD86 KO cells, treatment of T cells with either anti-PD1-IL2Rα-IL2, IL2, or IL2 in combination with REGN2810, leads to similar levels of IFNγ release, whereas non-targeted IL2Rα-IL2, Isotype Control antibodies, and REGN2810, lead to lower levels of IFNγ release. In the presence of Raji/CD80 KO/CD86 KO cells expressing hPD-L1, overall IFNγ release is reduced in isotype control treated samples, compared to RAJI cells not expressing PD-L1. Treatment with non-targeted IL2Ra-IL2 and REGN2810 lead to a similar increase in IFNγ release, compared to isotype controls, while treatment with IL2, REGN10597 and REGN10595 lead to an even greater response. The greatest response is observed for REGN10486 or the combination of IL2 with REGN2810. $EC_{50}$ and maximal interferon release values across the antibody dose range are summarized in Table 11.

TABLE 7

$EC_{50}$ and fold induction values for anti-PD1 and anti-PD1-IL2Rα-IL2 constructs determined by the PD1 antagonistic assay

| | Fold induction* | $EC_{50}$ (M) |
| --- | --- | --- |
| Isotype control 1 | 1.126 | ND |
| isotype control 2 | 1.202 | ND |
| Non-targeted IL2Rα-IL2 | 1.076 | ND |
| REGN2810 | 19.210 | 3.668E−09 |
| REGN10486 | 17.740 | 5.351E−09 |
| H4H29512 | 1.286 | ND |
| REGN10595 | 2.725 | 1.266E−08 |
| H4H9048 | 1.237 | ND |
| REGN10597 | 3.038 | 1.264E−08 |

ND: Not determined because a concentration-dependent response was not observed.
*Fold induction is the highest mean RLU value within the tested dose range relative to the mean RLU in the absence of antibody.

TABLE 8

Fold induction for IL2-Fc, non-targeted IL2Rα-IL2, and anti-PD1-IL2Rα-IL2 constructs determined by the IL2 reporter assay

| | Isotype control | Non-targeted IL2Rα-IL2 | IL2-FC | REGN10486 | REGN10595 | REGN10597 |
| --- | --- | --- | --- | --- | --- | --- |
| YT/Stat5-Luc | 1.072 | 3.206 | 4.955 | 3.426 | 3.254 | 3.295 |
| YT/Stat5-Luc/IL2Rα KO | 1.118 | 2.622 | 5.397 | 3.093 | 2.834 | 2.851 |
| YT/Stat5-Luc/hIL2Rα | 1.074 | 4.868 | 5.485 | 5.080 | 5.016 | 5.187 |
| YT/Stat5-Luc/hPD1 | 1.082 | 4.521 | 7.967 | 5.605 | 6.638 | 6.393 |
| YT/Stat5-Luc/IL2Rα KO/hPD1 | 1.061 | 2.586 | 3.870 | 3.347 | 3.612 | 3.538 |
| YT/Stat5-Luc/hIL2Rα/hPD1 | 1.000 | 2.770 | 3.060 | 2.714 | 3.013 | 2.879 |

*Fold induction is the highest mean RLU value within the tested dose range relative to the mean RLU in the absence of antibody.

TABLE 9

EC$_{50}$ for IL2-Fc, non-targeted IL2Rα-IL2, and anti-PD1-IL2Rα-IL2 constructs determined by the IL2 reporter assay

|  | Isotype control | Non-targeted IL2Rα-IL2 | IL2-FC | REGN10486 | REGN10595 | REGN10597 |
|---|---|---|---|---|---|---|
| YT/Stat5-Luc | ND | NC | 4.023E−10 | NC | NC | NC |
| YT/Stat5-Luc/IL2Rα KO | ND | NC | 1.327E−09 | NC | NC | NC |
| YT/Stat5-Luc/hIL2Rα | ND | 1.631E−09 | 2.415E−11 | 7.524E−10 | 8.87E−10 | 8.482E−10 |
| YT/Stat5-Luc/hPD1 | ND | NC | 3.918E−10 | 1.702E−10 | 2.193E−10 | 1.749E−10 |
| YT/Stat5-Luc/IL2Rα KO/hPD1 | ND | NC | 4.423E−10 | 1.948E−10 | 1.865E−10 | 1.913E−10 |
| YT/Stat5-Luc/hIL2Rα/hPD1 | ND | 9.714E−10 | 2.316E−11 | 1.668E−11 | 5.777E−11 | 3.533E−11 |

NC: Not calculated because the data did not fit a 4-parameter logistic equation.
ND: Not determined because a concentration-dependent response was not observed.

TABLE 10

EC$_{50}$ values for non-targeted IL2Rα-IL2 and anti-PD1-IL2Rα-IL2 constructs in presence of anti-PD1 antibody or isotype control

|  |  | — | Isotype control | REGN2810 | Comp 1 | Comp 2 |
|---|---|---|---|---|---|---|
| Non-targeted IL2Rα-IL2 | YT/STAT5-Luc/IL2Rα KO/hPD1 | NC | NC | NC | NC | NC |
|  | YT/STAT5-Luc/hIL2Rα/hPD1 | 7.033E−10 | 7.906E−10 | 6.506E−10 | 9.182E−10 | 9.376E−10 |
| REG10486 | YT/STAT5-Luc/IL2Rα KO/hPD1 | 9.388E−11 | 1.295E−10 | NC | NC | NC |
|  | YT/STAT5-Luc/hIL2Rα/hPD1 | 1.499E−11 | 2.018E−11 | 5.860E−10 | 6.927E−10 | 4.531E−10 |
| REGN10595 | YT/STAT5-Luc/IL2Rα KO/hPD1 | 2.499E−10 | 3.623E−10 | 4.550E−10 | 3.480E−10 | 2.941E−10 |
|  | YT/STAT5-Luc/hIL2Rα/hPD1 | 5.300E−11 | 6.223E−11 | 1.375E−10 | 1.335E−10 | 1.531E−10 |
| REGN10597 | YT/STAT5-Luc/IL2Rα KO/hPD1 | 1.285E−10 | 1.317E−10 | 2.216E−10 | 3.058E−10 | 2.807E−10 |
|  | YT/STAT5-Luc/hIL2Rα/hPD1 | 5.448E−11 | 7.094E−11 | 1.172E−10 | 7.649E−11 | 8.046E−11 |

NC: Not calculated because the data did not fit a 4-parameter logistic equation.

TABLE 11

EC$_{50}$ and Max IFNγ release values from primary T-cells treated with IL2, anti-PD1 or anti-PD1-IL2Rα-IL2 constructs

|  | Max IFNγ (pg/mL) | | EC$_{50}$ (M) | |
|---|---|---|---|---|
|  | Raji/CD80 KO/CD86 KO | Raji/CD80 KO/CD86 KO/hPD-L1 | Raji/CD80 KO/CD86 KO | Raji/CD80 KO/CD86 KO/hPD-L1 |
| Isotype control 1 | 1512 | 386 | ND | ND |
| Isotype control 2 | 1563 | 343 | ND | ND |
| Non-targeted IL2Rα-IL2 | 1687 | 859 | 7.325E−09 | NC |
| REGN10486 | 2306 | 1687 | NC | 1.457E−09 |
| REGN10595 | 2108 | 1157 | 1.096E−09 | 2.047E−09 |
| REGN10597 | 2484 | 1261 | 4.798E−10 | 1.839E−09 |
| IL2 | 2544 | 1081 | 4.914E−10 | 2.660E−10 |
| REGN2810 | 1172 | 858 | ND | 1.833E−09 |
| IL2 + REGN2810 | 2500 | 1868 | 3.148E−10 | 2.016E−10 |

NC: Not calculated because the data did not fit a 4-parameter logistic equation.
ND: Not determined because a concentration-dependent response was not observed.

Example 6: In Vivo Anti-Tumor Efficacy Assessment in PD1×LAG3 Humanized Mice

Study #1:

Human PD1×LAG3 knockin mice (described in Burova E. et al., Mol Cancer Ther 2019 (18) (11) 2051-2062) were inoculated s.c. with 3×10$^5$ MC38 tumor cells on day 0 and were randomized on day 7 when the average tumor size reached 95 mm$^3$. Mice were then treated intraperitoneally with isotype control Ab (0.33 mg/kg), isotype-IL2Rα-IL2 (0.5 mg/kg)+anti-hPD1 antibody (0.33 mg/kg) or anti hPD1-IL2Rα-IL2 (0.5 mg/kg)+isotype control Ab (0.33 mg/kg) semi-weekly for four total injections. Average tumor volumes (mm$^3$+SEM) in each treatment group were plotted (FIG. 1A). Tumor sizes were calculated as v=ab^2/2, where a represents the longest tumor diameter and b is the perpendicular tumor diameter. Arrows in FIG. 1A indicate the days of treatment.

Figure 1B:
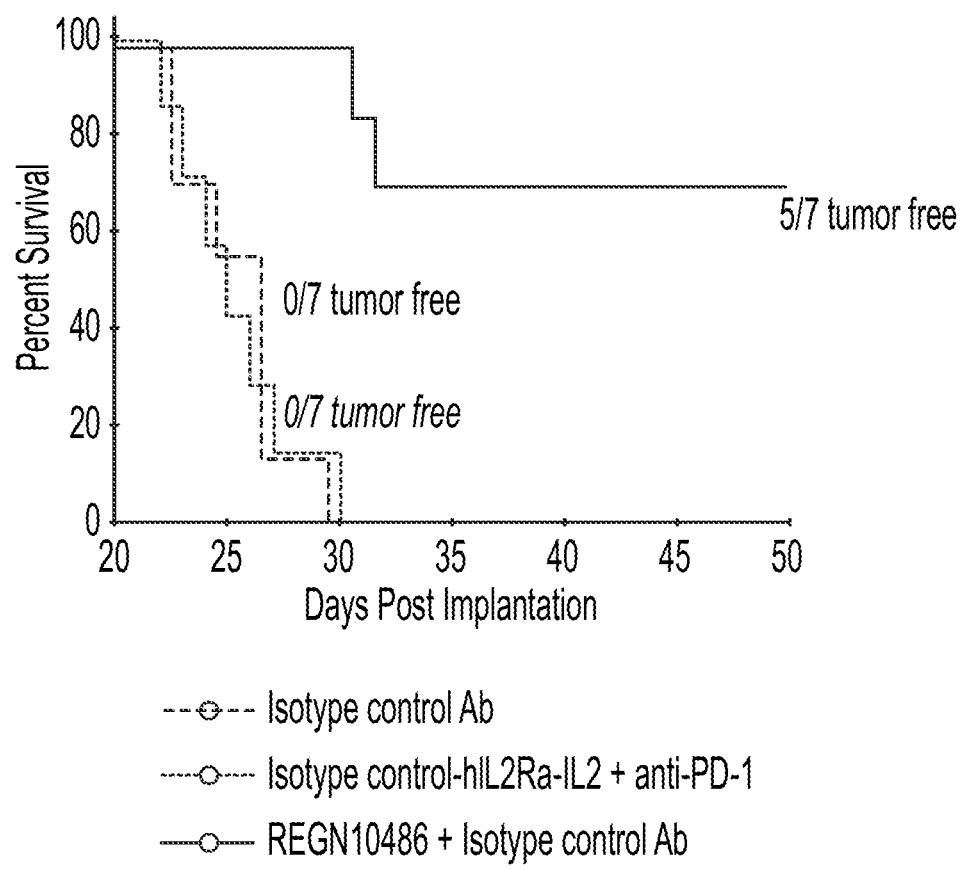

Kaplan-Meier survival curves in each treatment group were also plotted (FIG. 1B). Loss of survival was defined as euthanasia when tumors showed profound ulceration or when tumors reached 20 mm in any dimension or 2250 mm$^3$ in total volume.

Figure 1C:
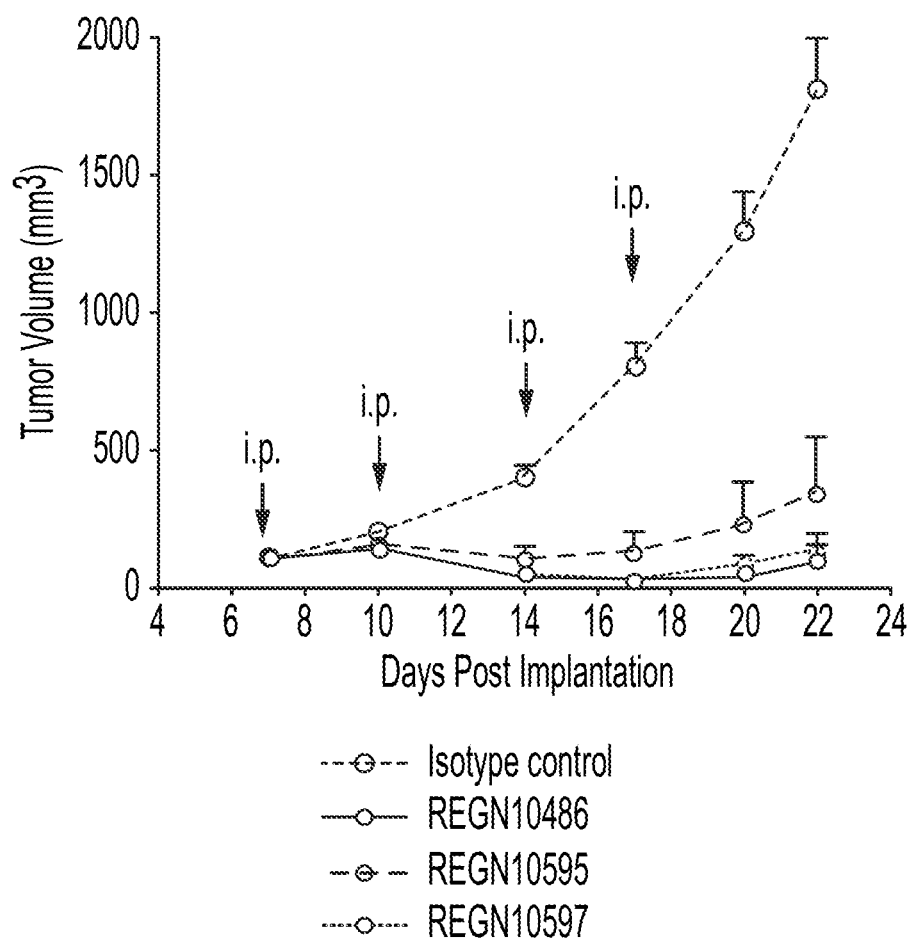

Study #2:

Human PD1×LAG3 knockin mice were inoculated s.c. with 3×10$^5$ MC38 tumor cells on day 0 and were randomized on day 7 when the average tumor size reached 105 mm$^3$. Mice were then treated intraperitoneally with isotype (0.5 mg/kg) or three different clones of anti-hPD1-IL2Rα-IL2 (0.5 mg/kg) semi-weekly for four total injections. Average tumor volumes (mm$^3$+SEM) in each treatment group were shown (FIG. 1C). Tumor sizes were calculated as v=ab^2/2, where a represents the longest tumor diameter and b is the perpendicular tumor diameter. Arrows in the figure indicate the days of treatment.

Figure 1D:
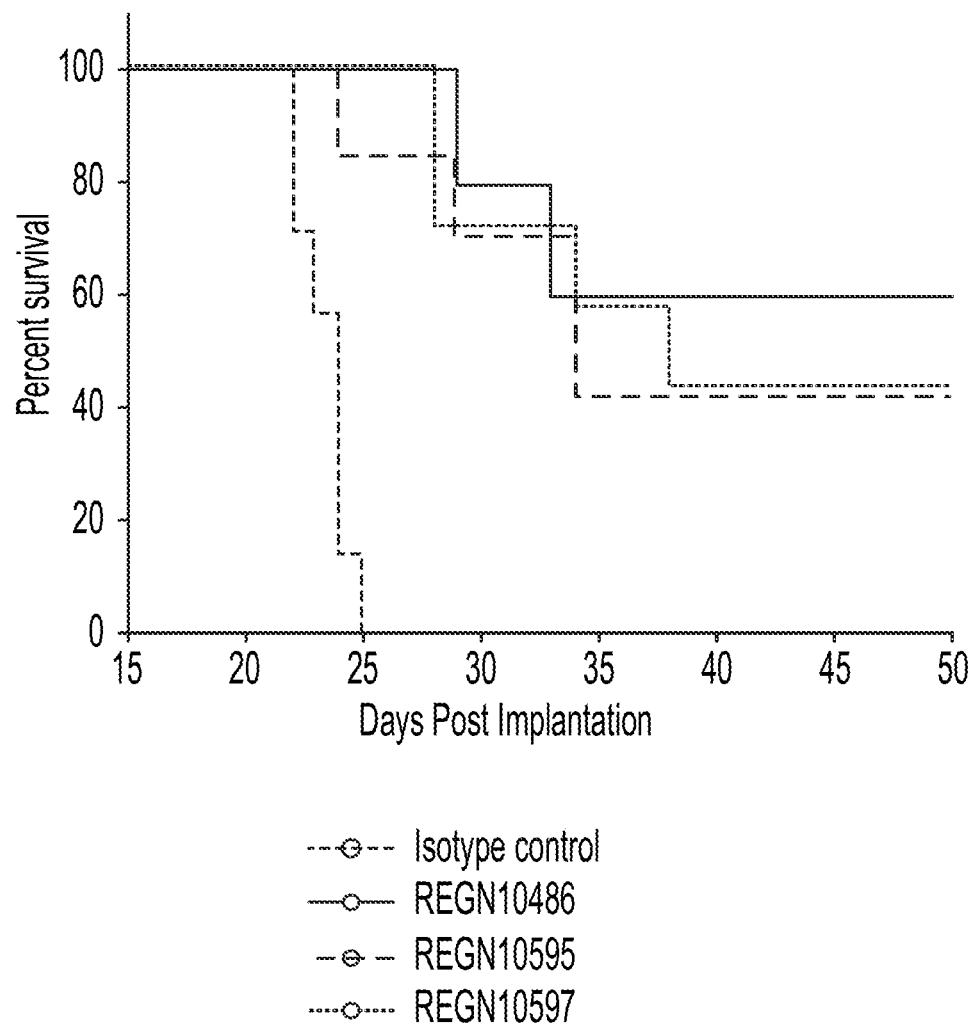

Kaplan-Meier survival curves in each treatment group were also plotted (FIG. 1D). Loss of survival was defined as euthanasia when tumors showed profound ulceration or when tumors reached 20 mm in any dimension or 2250 mm$^3$ in total volume.

Results Summary and Conclusions

In Study #1, anti-tumor efficacy of anti-hPD1-IL2Rα-IL2 was evaluated in comparison with the combination of its two individual components, Isotype-IL2Rα-IL2 and equal molar of parental anti-hPD1 blocking antibody.

While isotype-IL2Rα-IL2+anti-hPD1 was not able to confer effective tumor control at the dose tested, the same molar dose of anti-hPD1-IL2Rα-IL2+isotype treatment was able to regress established tumors, leading to long-term tumor-free survival in the majority of treated mice (FIGS. 1A-B). This result demonstrated the superior anti-tumor efficacy of anti-hPD1-targeted IL2Rα-IL2 to the combination of untargeted-IL2Rα-IL2 and parental anti hPD1 antibody.

In Study #2, antitumor activities of three different clones of anti-hPD1-IL2Rα-IL2 were compared. One of the anti-hPD1 clones is a strong blocker, whereas the other two minimally block hPD1 signaling. All three clones of the anti-hPD1-IL2Rα-IL2 molecule showed comparably potent anti-tumor efficacies and resulted in similar long-term tumor-free survival rates (FIGS. 1C-D). This result indicated anti-hPD1-targeted delivery of IL2Rα-IL2, more than its blocking activity, is primarily responsible for the robust anti-tumor effect of anti-hPD1-IL2Rα-IL2 therapy. It also indicated the potential to combine an anti-hPD1-IL2Rα-IL2 molecule with a non-competing PD1 blocking reagent to further boost its therapeutic efficacy.

Example 7: Ability of Anti-PD1-IL2Rα-IL2 Fusion Constructs to Bind Recombinant Monomeric IL2Rα, IL2Rβ, or IL2Rγ Protein in Solution Human IL-2 Receptor Alpha Binding Binding of human IL2Rα expressed with a C-terminal hexahistidine tag (hIL2Rα.6H, R&D, Catalog #10305-RL-050) to purified anti-PD1 antibodies with C-terminal IL2Rα-IL2 fusions was determined using a real-time surface plasmon resonance biosensor technology with Biacore S-200 instrument. To prepare hIgG capturing surfaces, CM5 Biacore sensor surfaces were derivatized by amine coupling with a mixture of monoclonal anti-human Fab antibodies (Cytiva, catalog #28-9583-25). All Biacore binding studies were performed at 25° C. in a buffer composed of 0.01M HEPES pH 7.4, 0.15M NaCl, 3 mM EDTA, and 0.05% v/v Surfactant P20 (HBS-EP running buffer). Anti-PD1-IL2Rα-IL2 constructs and controls were captured onto this anti-hFab surface by injecting 3 μg/mL solutions for 1 minute at 8 μL/min. The solution of hIL2Rα.6H at 1 pM prepared in the HBS-EP running buffer was then injected over the captured antibody IL2 fusion construct captured surfaces at a flow rate of 50 μL/minute. IL2 fusion antibody association was monitored for 1 minute followed by a 1 minute dissociation phase in HBS-EP running buffer. Binding responses were measured at the end of injection and are presented in Table 12. At the end of each cycle, the anti-PD1-IL2Rα-IL2 fusion construct capture surface was regenerated using a 30 sec injection of 10 mM glycine, pH 1.5.

Human IL-2 Receptor Beta/Gamma Binding

Binding of human IL2 receptor beta (hIL2Rβ) expressed with a C-terminal myc-myc-hexahistidine tag (hIL2RR.mmH, REGN9169) or human IL2 receptor gamma (hIL2Rγ) expressed with a C-terminal myc-myc-hexahistidine tag (hIL2Rγ.mmH, REGN1183) binding to anti-PD1-IL2Rα-IL2 fusion constructs were determined using a real-time surface plasmon resonance biosensor technology on a Biacore S-200 instrument. The CM5 Biacore sensor surface was derivatized by amine coupling with a mixture of monoclonal anti-human Fab antibodies (Cytiva, catalog #28-9583-25). All Biacore binding studies were performed at 25° C. in a buffer composed of 0.01M HEPES pH 7.4, 0.15M NaCl, 3 mM EDTA, 0.05% v/v Surfactant P20 (HBS-EP running buffer). All IL2 receptor components were prepared in the same buffer. Anti-PD1-IL2Rα-IL2 constructs and controls were captured onto this anti-hFab surface by injecting 3 ug/mL solutions for 1 minute at 8 μl/min.

It is reported in the literature (Liparoto, et al. *Biochemistry.* 2002) that IL2Rγ possesses an IL2Rβ or IL2Rα/P dependent affinity for IL2. Addition of IL2Rβ, therefore, allows the formation of a detectable ternary complex. A sequential binding experiment was designed to explore IL2Rγ binding in the presence of pre-bound IL2Rβ. To the anti-PD1-IL2Rα-IL2 surfaces, a 30 sec injection of 1 pM IL2Rβ.mmH at 50 μl/min was immediately followed by 1 minute injection of a mixture solution of 1 pM IL2Rβ.mmh and 1 μM IL2Rγ.mmH. Binding signals at the end of each injection were recorded. Results are presented in Table 13. At the end of each cycle, the anti-PD1-IL2Rα-IL2 fusion construct capture surface was regenerated using a 30 sec injection of 10 mM glycine, pH 1.5.

To calculate the activity of anti-PD1-IL2Rα-IL2 fusion constructs, the theoretical maximum signal (TRmax) was first calculated based on the amount of anti-PD1-IL2-IL2Rα fusion captured, the stoichiometry of IL2 receptor interaction, and the molecular weights of the interacting proteins. Then the activity of anti-PD1-IL2Rα-IL2 fusion constructs was then expressed as a percentage of the calculated TRmax. Furthermore, the percentage of TRmax results was then normalized to the control antibodies (REGN1945 and REGN8512) using the following formula:

Normalized Activity (%) =

$$\frac{(\%TRmax\ Sample - \%TRmax\ REGN1945)}{(\%TRmax\ REGN8512 - \%TRmax\ REGN1945)} \times 100$$

Results, Summary, and Conclusions

The anti-PD1-IL2-IL2Rα fusion constructs demonstrated greatly reduced binding to hIL2Rα compared to an unattenuated (IL2 only) control.

The anti-PD1-IL2Rα-IL2 fusion constructs demonstrated ability to bind hIL2R3 with partially reduced binding signals compared to the unattenuated (IL2 only) control. In the presence of bound hIL2Rβ, marginal binding of hIL2Rγ was observed compared to the unattenuated IL2 control construct.

TABLE 12

Binding of anti-PD1 anti-PD1-IL2Rα-IL2 fusion constructs to bind recombinant monomeric IL2Rα protein

| Ab reagent | mAb Capture (RU) | 1 µM hIL2Rα.6H Bind (RU) | TRmax (RU) | % TRmax | % Normalized Activity |
|---|---|---|---|---|---|
| REGN10486 | 275.7 | 0.9 | 58.5 | 1.5 | 1.3 |
| REGN10595 | 152.1 | 2.1 | 32.0 | 6.6 | 6.6 |
| REGN10597 | 206.7 | 0.6 | 43.6 | 1.4 | 1.2 |
| REGN8512 (Ab-linked to IL2) | 585.6 | 144.9 | 151.0 | 96.0 | 100.0 |
| Isotype control | 422.3 | 0.3 | 133.3 | 0.2 | 0.0 |

TABLE 13

Binding of anti-PD1-IL2Rα-IL2 fusion constructs to bind recombinant monomeric IL2Rβ or IL2Rγ binding in the presence of pre-bound IL2Rβ

| | IL2Rβ | | | | | IL2Rγ After IL2Rβ | | | |
|---|---|---|---|---|---|---|---|---|---|
| Ab reagent | mAb Capture (RU) | 1 µM hIL2Rβ.m mH Bind (RU) | TRmax (RU) | % TRmax | % Normalized Activity | 1 µM hIL2Rγ.m mH Bind (RU) | TRmax (RU) | % TRmax | % Normalized Activity |
| REGN10486 | 355.1 | 13.3 | 111.5 | 12.0 | 46.4 | 0.8 | 125.7 | 0.6 | 5.5 |
| REGN10595 | 324.1 | 15.6 | 101.7 | 15.3 | 61.6 | 2.2 | 114.7 | 1.9 | 12.6 |
| REGN10597 | 304.3 | 16.8 | 95.5 | 17.6 | 71.9 | 1.4 | 107.7 | 1.3 | 9.3 |
| REGN8512 (Ab linked to IL2) | 1474.0 | 110.3 | 462.6 | 23.8 | 100.0 | 90.0 | 521.7 | 17.3 | 100.0 |
| Isotype control | 611.8 | 3.2 | 192.0 | 1.7 | 0.0 | −0.7 | 216.5 | −0.3 | 0.0 |

Example 8: Cell Binding of Anti-PD1-IL2Rα-IL2 Fusion Constructs and Parental mAbs Characterized by a FACS Binding Assay To compare hPD1 binding of αhPD1-IL2Rα-IL2 proteins to their respective parental anti-hPD1 antibodies, YT/STAT5 luc/Cl4 cells expressing endogenous levels of hPD1 were washed twice with FACS wash (PBS+2% FBS) and resuspended at 1×10^6 cells/ml in FACS wash. Cells (100 µl/well) were then plated in 96 well U bottom plates. Cells were spun down (1200 RPM, 5 minutes) and resuspended in 100 µl/well of the various antibody dilutions listed in mAb clone IDs. The antibody titrations were prepared starting at 20 µg/ml with a 6-fold dilution using FACS wash. Cells were incubated with the antibodies for 30 minutes at 4° C. The unbound antibodies were then removed by washing the cells twice using FACS wash. The cells were then resuspended in 100 µl/well of 1:200 dilution of APC-anti-human Fcγ secondary antibody. The cells were incubated for 30 minutes at 4° C. The unbound antibodies were then removed by washing the cells twice using FACS wash. The cells were then resuspended in 160 µl/well of FACS wash and run to test binding using BD FACSCanto™ Flow Cytometer.

Figure 2A:
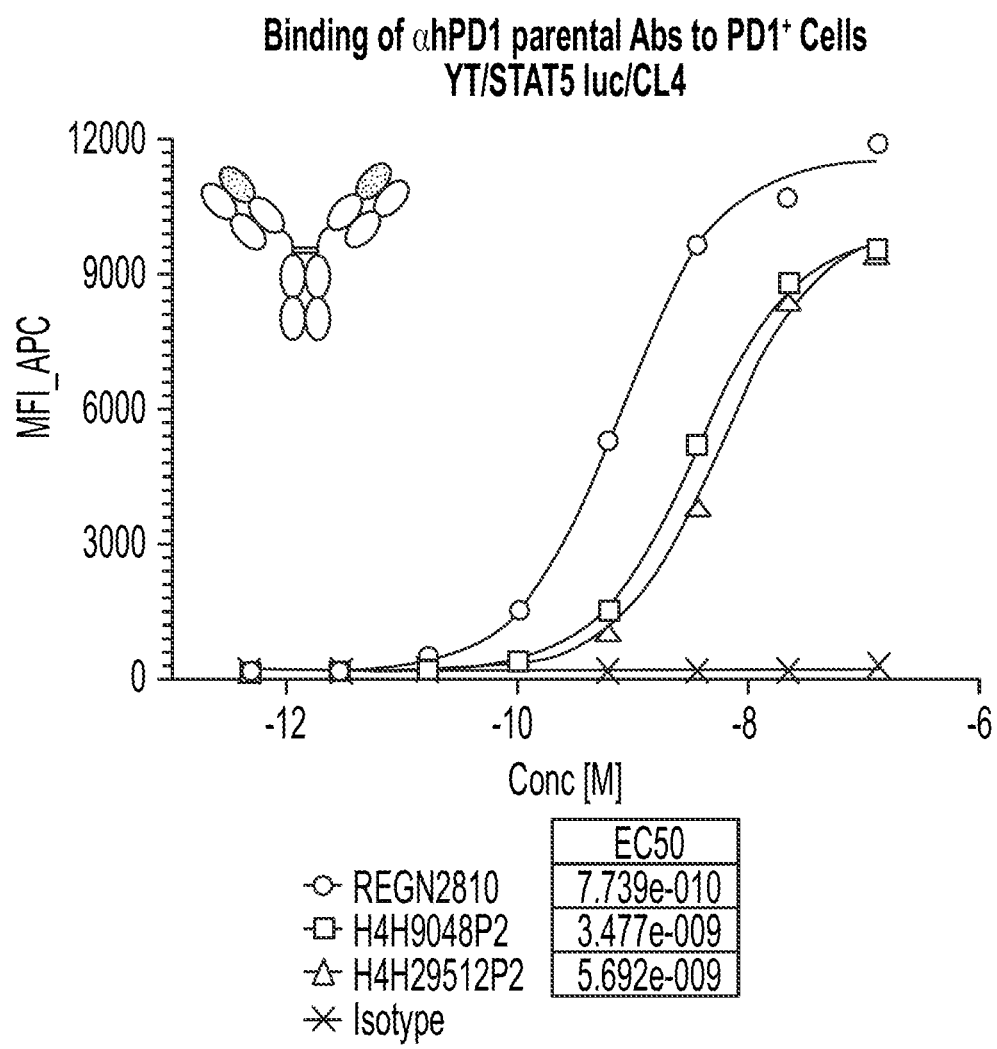
FIGS. 2A and 2B are a set of graphs showing the results of a FACS binding assay that compares binding of anti-alpha-hPD1 antibody ("αhPD1" or "ahPD1") parental antibodies to PD1+ cells (FIG. 2A) with binding of anti-αhPD1 antibody-IL2Rα-IL2 fusion constructs to PD1+ cells (FIG. 2B), as described in Example 8.
Figure 2B:
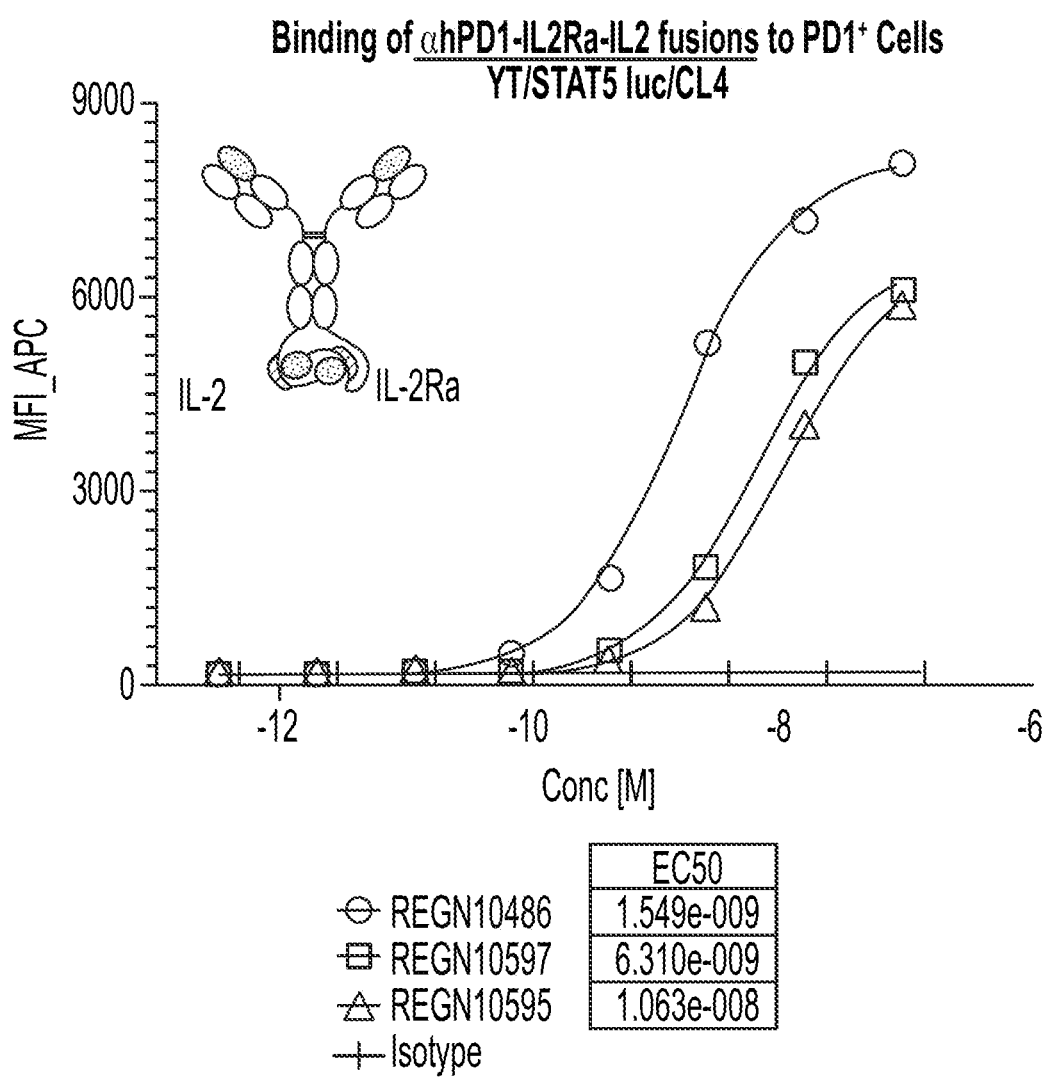

Anti-hPD1-IL2Rα-IL2 proteins and their respective anti-hPD1 parental antibodies bind comparably to PD1+ cells (FIGS. 2A, 2B). Anti-hPD1-IL2Rα-IL2 proteins binding shows slightly lower affinities (~2×) than the corresponding parental mAbs.

Figure 3A:
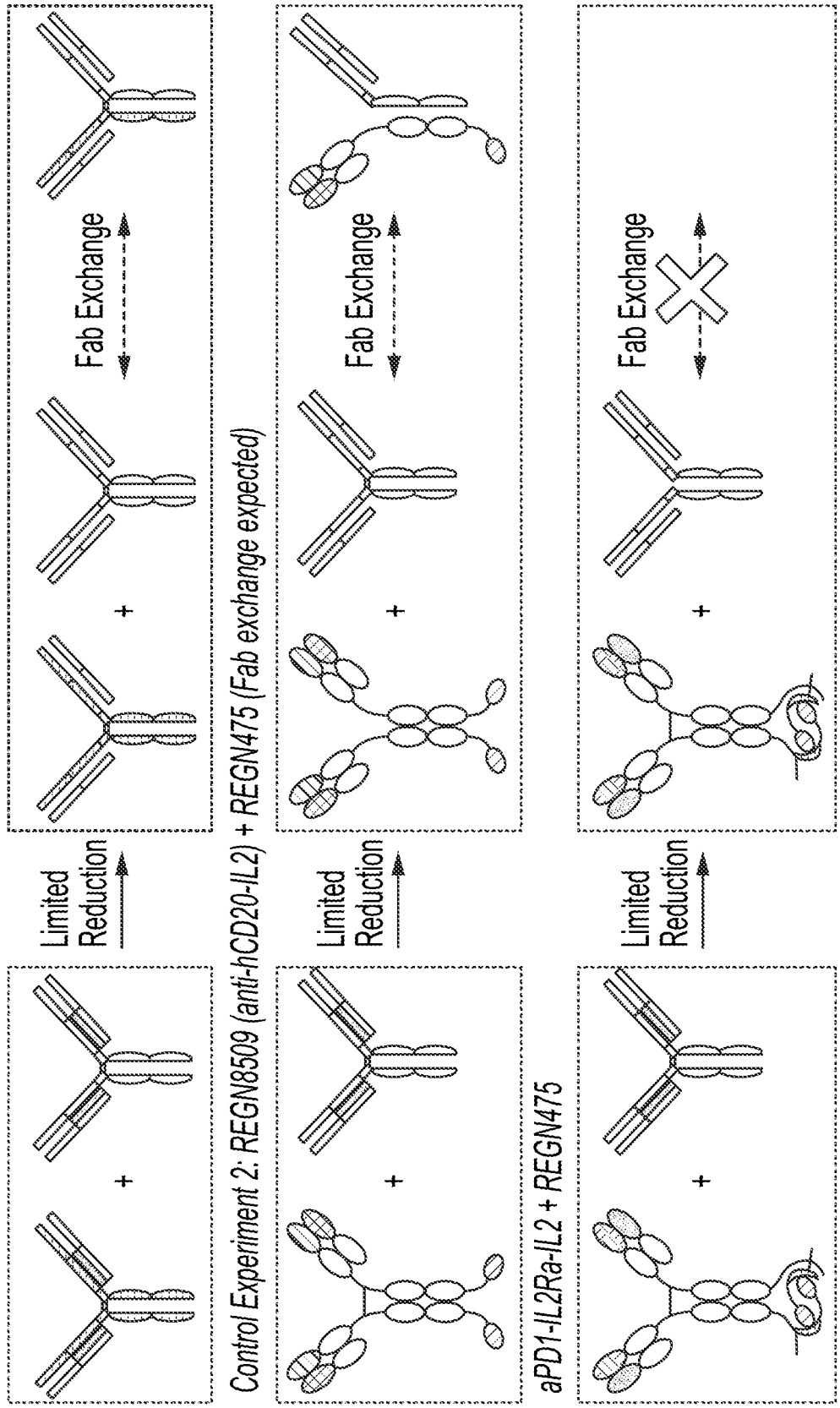
FIGS. 3A and 3B show the experimental design (FIG. 3A) and resulting native mass spectra (FIG. 3B) of a mixture of anti-PD-1-IL2Rα-IL2+an hIgG4 antibody compared to specified antibody mixtures, as described in Example 9.

Example 9: Fab-Exchange and Native Mass Spectrometry (MS) Analysis of Anti-PD1-IL2Rα-IL2 Fusion Constructs Fab-exchange and native mass spectrometry (MS) analysis were used to determine the conformation of the PD-1-IL2Rα-IL2 fusion molecules. REGN10597, REGN8509, REGN2810, and REGN475 were each treated with peptide N-glycosidase F (PNGase F; 1 IUB milliunit per 10 µg of protein) at 45° C. for 1 hour to completely remove the glycan chains from each heavy chain constant region. The deglycosylated protein samples were then mixed according to FIG. 3A and Table 14 below, and each mixture was incubated at 37° C. in the presence of 2 mM DTT for 30 min. The treated protein mixtures were then subjected to native desalting size exclusion chromatography coupled to mass spectrometry (SEC-MS) analysis on a native LC-MS platform (refer to provisional patent #10724). Desalting SEC was performed on a BEH® SEC column (4.6×30 mm, 200 Å, 1.7 µm) using an isocratic flow of 150 mM ammonium acetate (pH 6.8) at a flow rate of 0.2 mL/min. Mass measurement was performed on a Thermo Q-Exactive UHMR mass spectrometer.

TABLE 14

Mixing of REGN10597, REGN8509, REGN2810, and REGN475 for Fab-exchange and native MS analysis

| | Component | | Mixture ratio (molar ratio) | Final protein concentration |
|---|---|---|---|---|
| Mixture 1 | REGN2810 | REGN475 | 1:1 | 5 mg/mL |
| Mixture 2 | REGN8509 | REGN475 | 1:1 | 5 mg/mL |
| Mixture 3 | REGN10597 | REGN475 | 1:1 | 5 mg/mL |

Figure 3B:
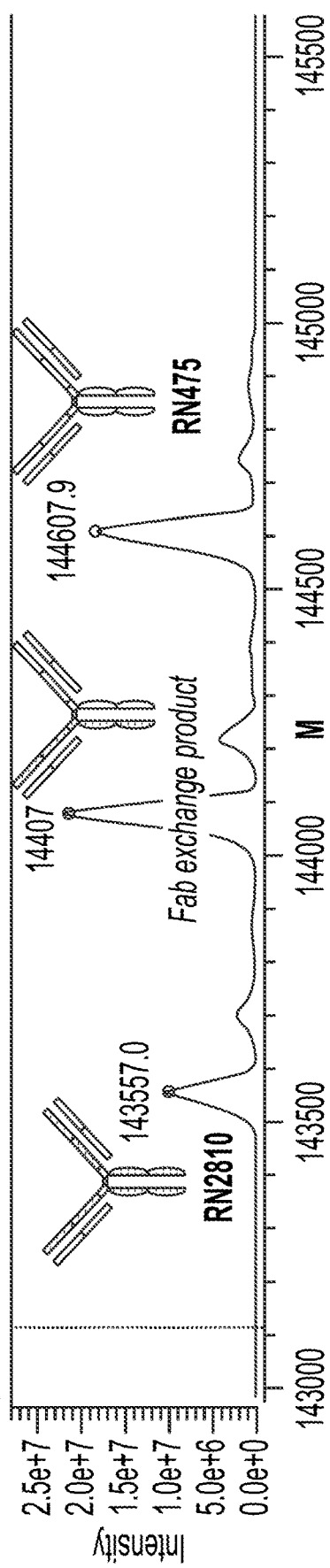
Figure 3B:
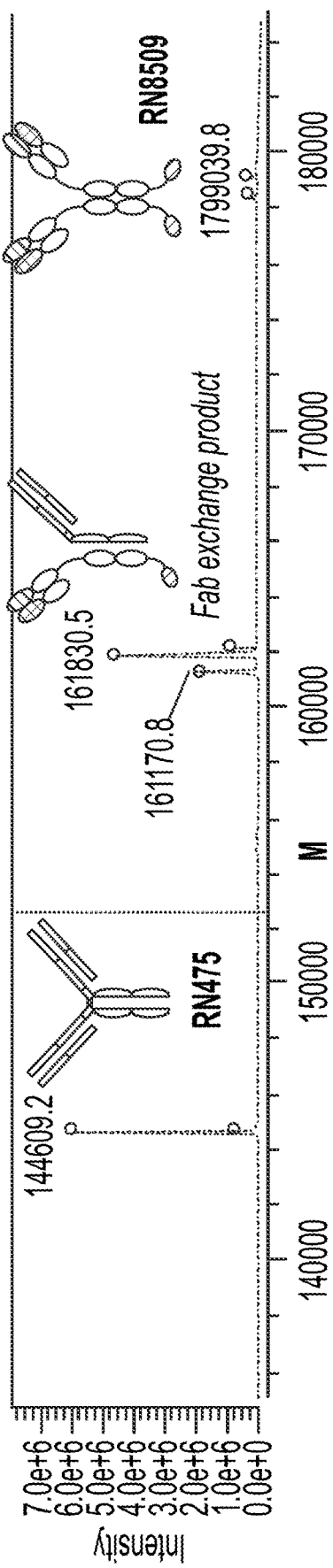
Figure 3B:
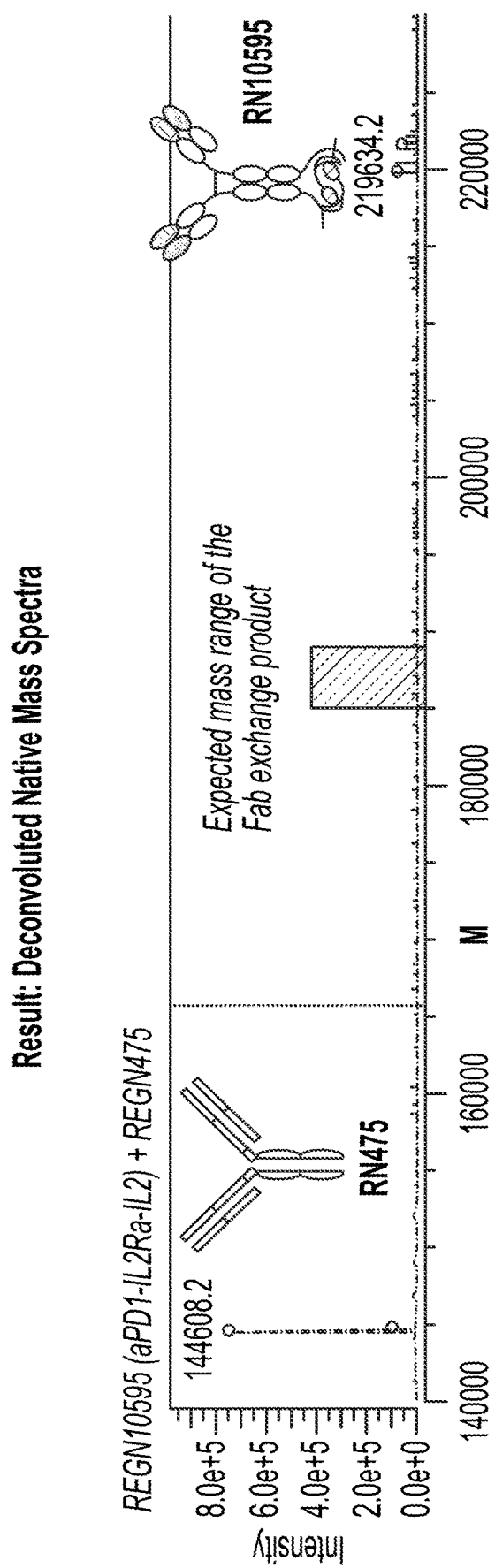

With hinge-region disulfide bond disrupted, IgG4 molecules go through fast Fab exchange, the product of which can be monitored by native MS analysis. Control experiments using a mixture of two IgG4 antibodies (Mixture 1) or a mixture of one IgG4 antibody+anti-hCD20-IL2 (Mixture 2) displayed Fab exchange under partially reduced conditions and Fc exchange under FabRICATOR digested conditions (FIG. 3B). Fab or Fc exchange products were not observed for the mixture of PD1-IL2Rα-IL2+an IgG4 molecule (Mixture 3) under partially reduced or FabRICATOR digested conditions, respectively, suggesting the PD1-IL2Rα-IL2 molecules exist primarily in the inactive form, where strong inter-chain interaction between IL2Rα and IL2 prohibits Fab (or Fc) exchange (FIG. 3B). In summary, the Fab-exchange and native MS analysis indicate that the anti-PD1-IL2Rα-IL2 molecule exists primarily in the trans-sequestered conformation.

Example 10: Ability of Anti-PD1-IL2Rα-IL2 Constructs to Enhance Human Primary T-Cell Activation as Evaluated by a Mixed Lymphocyte Reaction (MLR) Assay The ability of anti-PD1-IL2Rα-IL2 constructs to enhance human primary T-cell activation was evaluated using a mixed lymphocyte reaction (MLR) assay. Allogeneic donor PBMC will stimulate T-cells leading to their proliferation and release of cytokines. The addition of recombinant IL-2 can further support T-cell activation. Thus, this assay was used to evaluate how PD1 targeted IL2Rα-IL2 may impact T-cell proliferation and release of IFNg, which serve as indicators of T-cell activation.

Isolation of Human Primary Cells

Human PBMCs were isolated from leukopaks of peripheral blood from 2 healthy donors obtained from Precision for Medicine (donor 1) or Stem Cell Technologies (donor 2) using the EasySep™ Direct Human PBMC Isolation Kit and following the manufacturer's recommended protocol. CD3+ T-cells from Donor 2 were isolated from PBMCs using an EasySep™ Human CD3+ T Cell Isolation Kit from Stem-Cell Technologies and following the manufacturer's recommended instructions.

Assay Procedure:

Isolated, Donor 2 CD3+ T-cells were resuspended at a concentration of 1×10^6 cells/ml in primary culture media (X Vivo 15 media supplemented with 10% FBS, 10 mM HEPES, 1 mM Sodium Pyruvate, 1× non-essential amino-acids and 0.01 mM Beta-Mercaptoethanol). Donor 1 PBMCs (10×10^6 cells/ml) were treated for 1 hour at 37° C./5% CO2 with 50 ug/mL of mitomycin C diluted in primary culture media (to arrest cell growth). After washing 3 times with primary culture media, PBMC were resuspended and added to Donor 2 T-cells, such that the final ratio of T-cell to PBMC was 1:3 (1×10^6 T-cells+3×10^6 PBMC per ml). After incubating CD3+ T-cell/PBMC mixtures for 6 days, T-cells were re-isolated using Miltenyi CD3+ Microbeads following manufacturer's instructions. Subsequently, isolated cells were rested for 24 h in primary cell culture media. 100,000 T-cells were added to wells of a round bottom microtiter plate, and freshly mitomycin C treated Donor 1 PBMCs were added to wells at 300,000 cells/well. Anti-PD1-IL2Rα-IL2 (REGN10597, REGN10595 or REGN10486), isotype-IL2Rα-IL2 control (REGN9903), anti-PD1 (REGN2810), recombinant IL2, or matched IgG4 and IgG4s isotype controls (REGN1945 and REGN7540 respectively) were titrated 1:6 in a 9 point dilution, ranging from 1000 nM to 0.595 µM, with a final 10th point containing no antibody (represented by the lowest point on the curve). Each condition was performed in triplicate. After 72 hour incubation at 37° C./5% $CO_2$, microtiter plates were centrifuged to pellet the cells, and 50 µl of media supernatant was collected. From the collected supernatant, 5 µl was tested in a human IFNγ AlphaLISA (PerkinElmer) assay according to the manufacturer's protocol. The measurements were acquired on the multilabel plate reader Envision (PerkinElmer). The pelleted cells were resuspended in primary stimulation media containing 3H-thymidine (1.25 mCi/ml), and incubated for 6 hours at 37° C./5% CO2. Plates were processed using a Filtermate Cell Harvester (PerkinElmer) and measured using a MicroBeta2 Microplate counter (PerkinElmer). Values were recorded as counts per minute (CPM). The $EC_{50}$ values of the antibodies were determined from a four-parameter logistic equation over a 10-point dose-response curve using GraphPad Prism™ software.

Figure 4A:
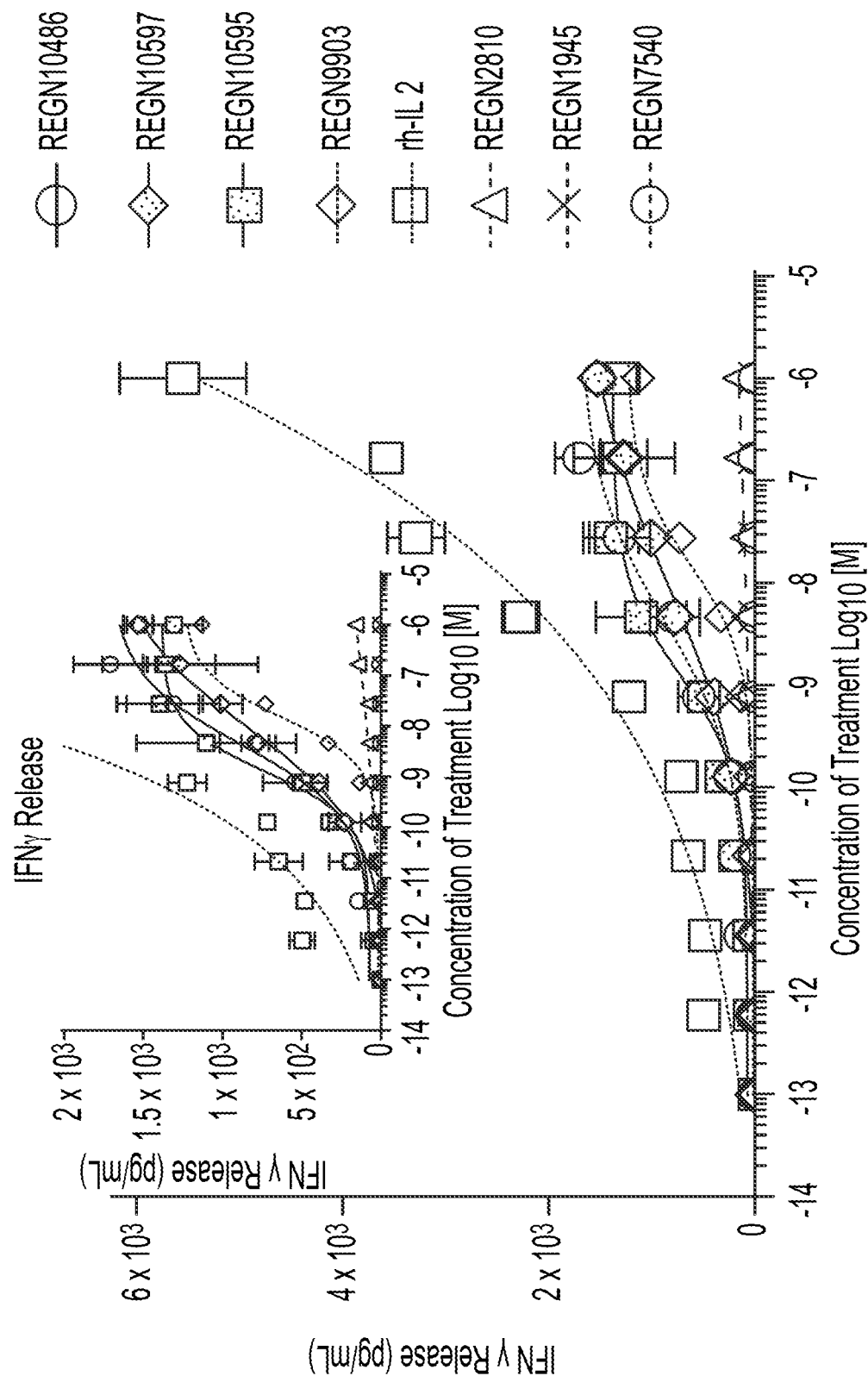
FIGS. 4A and 4B are a set of graphs showing IFNγ release and proliferation of T-cells in response to the antibody or cytokine titration as described in Example 10. Allogeneic PBMCs mixed with T-cells were treated with a dose titration of recombinant IL2, anti-PD-1-IL2Rα-IL2 (REGN10597, REGN10595, and REGN10486) or Isotype-IL2Rα-IL2 control (REGN9903) and IFNγ release (FIG. 4A) and proliferation (FIG. 4B) were evaluated.
Figure 4B:
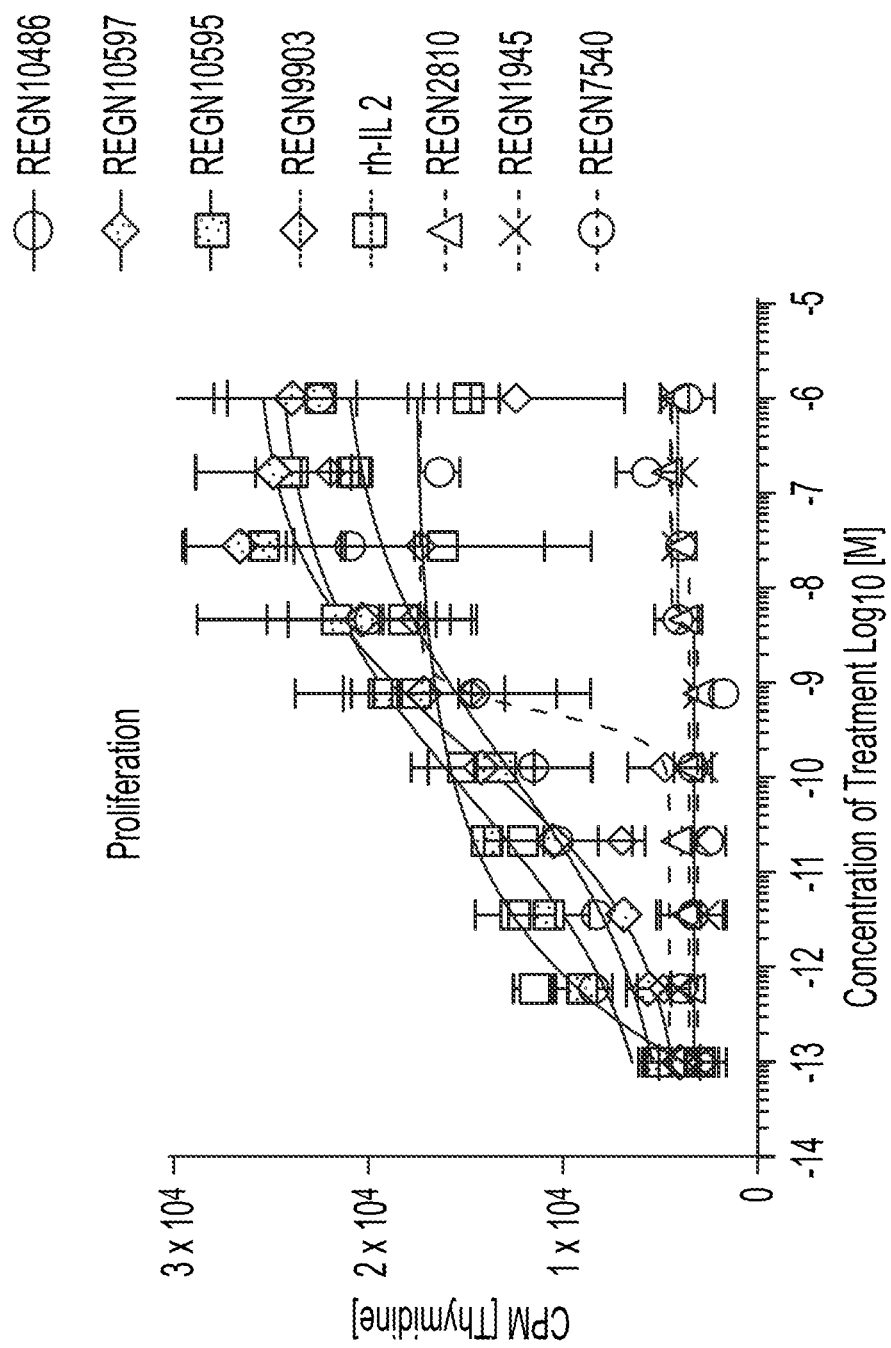

In the presence of allogeneic PBMCs, T-cells treated with a dose titration of recombinant IL-2, anti-PD-1-IL2Rα-IL2 (REGN10597, REGN10595, REGN10486) or isotype-IL2Rα-IL2 control (REGN9903) lead to dose-dependent increases in IFNγ release and proliferation (FIGS. 4A, 4B and Table 15). Recombinant IL2 led to the highest maximum cytokine release and most potent proliferation, followed by the anti-PD1-IL2Rα-IL2 molecules. Isotype-targeted IL2Rα-IL2, in comparison to PD-1 targeted, exhibited reduced potency for cytokine release and proliferation. REGN2810 led to a minor dose-dependent increase in IFNγ only, while matched IgG4 and IgG4s isotype controls (REGN1945 and REGN7540, respectively) did not impact cytokine release or proliferation.

TABLE 15

Maximum and $EC_{50}$ values for IFNγ release and proliferation

| | IFNγ Release | | Proliferation | |
|---|---|---|---|---|
| Antibodies | Max [pg/mL] | $EC_{50}$ [M] | Max [CPM] | $EC_{50}$ [M] |
| REGN10486 | 1709.7 | 4.44E-09 | 22558 | 1.3E-10 |
| REGN10595 | 1395.2 | 1.27E-09 | 25376 | 6.1E-11 |
| REGN10597 | 1534.0 | 9.53E-09 | 26602 | 1.8E-10 |
| REGN9903 | 1268.0 | 1.53E-08 | 21951 | 4.88E-10 |
| REGN2810 | 158.3 | NC | 4671 | ND |
| REGN1945 | 2.4 | ND | 4342 | ND |
| rhIL-2 | 5552.6 | NC | 20711 | NC |
| REGN7540 | 6.2 | ND | 5702 | ND |

Abbreviations:
ND: Not Determined, because a concentration-dependent increase was not observed;
NC: Not calculated because the data did not fit a 4-parameter logistic equation.

Example 11: Comparison of Anti-PD1-IL2Rα-IL2 and Isotype Control-IL2Rα-IL2+Anti-PD1 Constructs in a Raji-Based Primary T Cell Stimulation Assay The ability of anti-PD1-IL2Rα-IL2 constructs to enhance human primary T-cell activation was evaluated using a Raji-cell based primary T cell assay. T-cells were stimulated by coculture with Raji cells knocked out for CD80 and CD86 and over-expressing human PD-L1 (Raji/CD80 KO/CD86 KO/hPD-L1) in the presence of a CD3×CD20 bispecific antibody, leading to T cells release of cytokines. The addition of recombinant IL-2 can further support T-cell activation. Thus, this assay was used to evaluate how PD1 targeted IL2Rα-IL2 may impact T-cell release of IFNγ, which serve as indicators of T-cell activation.

Isolation of Human Primary Cells:

Human PBMCs were isolated from leukopaks of peripheral blood from a healthy donor obtained from Precision for Medicine using the EasySep™ Direct Human PBMC Isolation Kit and following the manufacturer's recommended protocol. CD3+ T-cells were isolated from PBMCs using an EasySep™ Human CD3+ T Cell Isolation Kit from StemCell Technologies and following the manufacturer's recommended instructions.

Raji-Based T Cell Assay Procedure:

T cells were spun down, resuspended in stimulation media (X Vivo 15 media supplemented with 10% FBS, 10 mM HEPES, 1 mM Sodium Pyruvate, 1× non-essential amino-acids and 0.01 mM Beta-Mercaptoethanol) and $1 \times 10^5$ cells/well plated out into 96-well round-bottom plates. Raji/CD80 KO/CD86 KO/hPD-L1 cells ($1 \times 10^7$ cells/ml) were treated for 1 hour at 37° C./5% CO2 with 20 mg/ml mitomycin C diluted in stimulation media in order to arrest cell growth. Cells were then washed 3 times with D-PBS containing 2% FBS, resuspended in stimulation media and $5 \times 10^4$ cells were added per well. Subsequently, 0.5 nM of anti-CD3×anti-CD20 bispecific antibody (REGN1979) was added, along with either 20 nM constant isotype control (REGN1945) or anti-PD1 (REGN2810). A titration of either isotype control (REGN7540), isotype-IL2Rα-IL2 antibody (REGN9903), anti-PD1 antibody with VRs of mAb9048 (REGN15187), anti-PD1-IL2Rα-IL2 (REGN10597), or an equimolar titration of REGN9903+REGN15187 was added to wells in a 9-point, 1:6 serial dilution ranging from 500 nM to 0.3 µM per molecule, with the $10^{th}$ dilution point containing only 0.5 nM constant of REGN1979 and 20 nM REGN2810 or REGN1945. Each condition was performed in duplicate. The plates were incubated for 96 hours at 37° C./5% CO2. IFNγ was quantified in the cell culture supernatant using an AlphaLISA assay according to the manufacturer's protocol. The measurements were acquired on the multilabel plate reader Envision (Perkin Elmer). The $EC_{50}$ values of the cytokines were determined using GraphPad Prism™ software from a four-parameter logistic equation over a 10-point dose-response curve, where the $10^{th}$ dilution point contained only 0.5 nM constant of REGN1979 and 20 nM REGN2810 or REGN1945.

Summary of Results

Figure 5A:
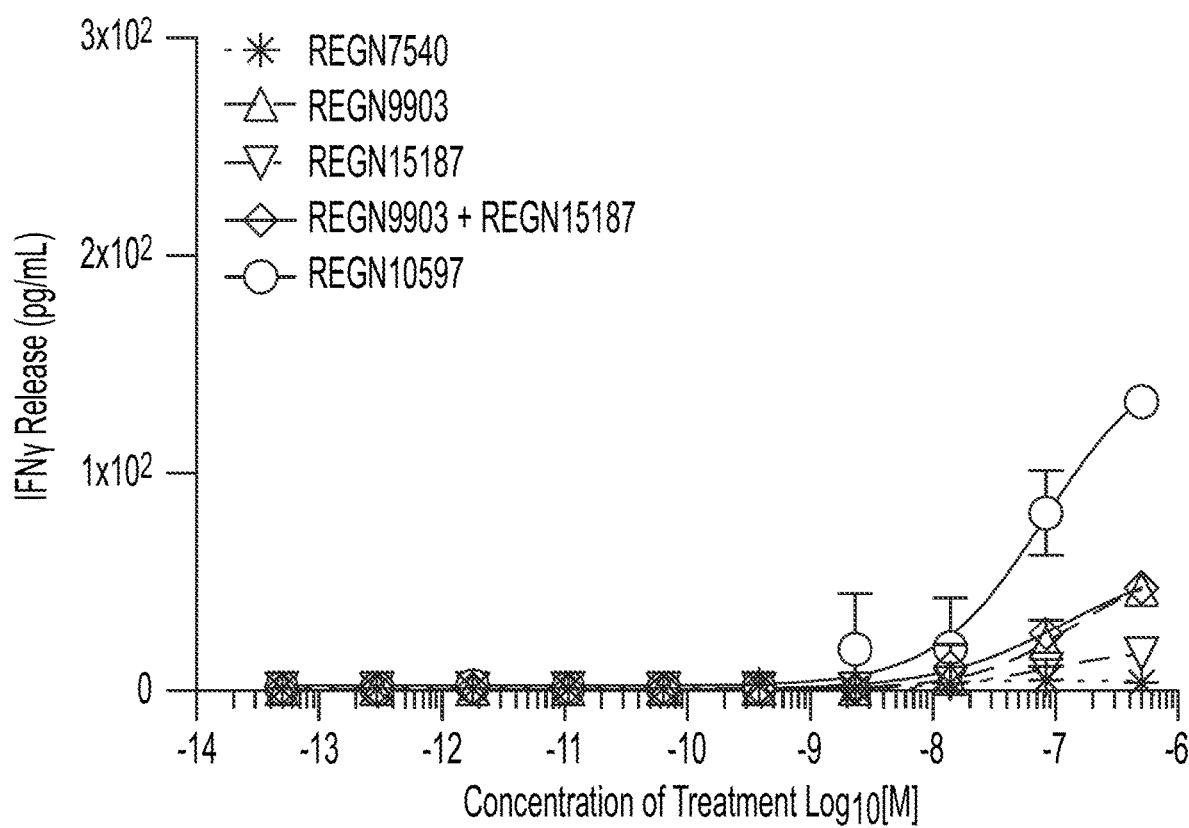
FIGS. 5A and 5B are a set of graphs showing IFNγ release of T-cells in response to antibody or cytokine titration in the absence (FIG. 5A) or presence (FIG. 5B) of REGN2810 as described in Example 11. RAJI/CD80 KO/CD86 KO/PDL1 cells were incubated with T-cells and treated with a fixed dose of anti-CD3×CD20 (REGN1979) and a dose titration of isotype control (REGN7540), isotype-IL2Rα-IL2 antibody (REGN9903), anti-PD1 antibody with variable regions of mAb9048 (REGN15187), anti-PD1-IL2Rα-IL2 (REGN10597), or a combination of REGN9903+REGN15187 in the absence (FIG. 5A) or presence (FIG. 5B) of REGN2810. IFNγ release was measured.
Figure 5B:
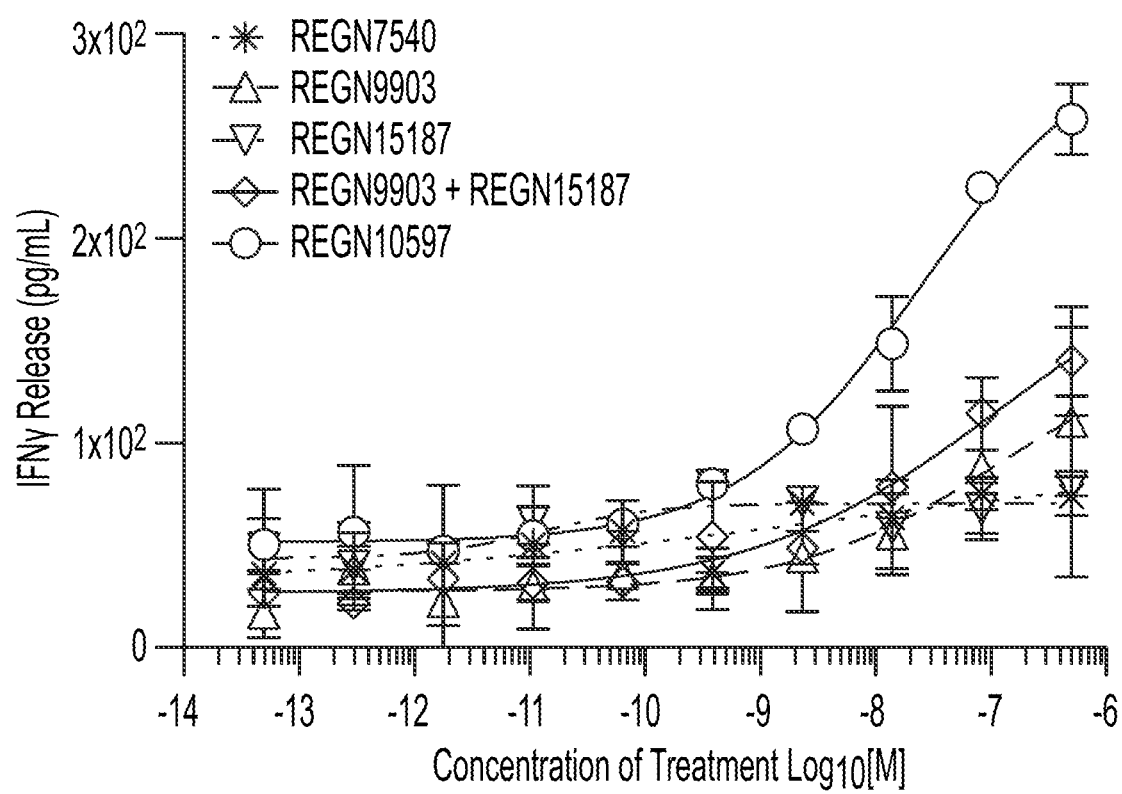

In the presence of Raji/CD80 KO/CD86 KO/hPDL1, T-cells treated with a dose titration of isotype-IL2Rα-IL2 (REGN9903) or anti-PD1-IL2Rα-IL2 (REGN10597) in the presence or absence of REGN2810 lead to surprisingly significant dose-dependent increases in IFNγ release (Table 16 and FIGS. 5A, 5B). Anti-PD1-IL2Rα-IL2 molecule led to the highest maximum cytokine release, followed by the isotype-IL2Rα-IL2 molecule alone or in combination with the anti-PD1 antibody REGN15187. Matched IgG4 and IgG4s isotype controls (REGN1945 and REGN7540, respectively) did not impact IFNγ release.

TABLE 16

Maximum values for IFNγ Release

| | Max IFNγ Release [pg/mL] | |
|---|---|---|
| | Constant - 20 nM REGN1945 | Constant - 20 nM REGN2810 |
| REGN7540 | 5.1 | 75.0 |
| REGN9903 | 46.9 | 110.6 |
| REGN15187 | 17.0 | 79.5 |
| REGN9903 + REGN15187 | 47.6 | 140.0 |
| REGN10597 | 133.0 | 258.5 |

Figure 6A:
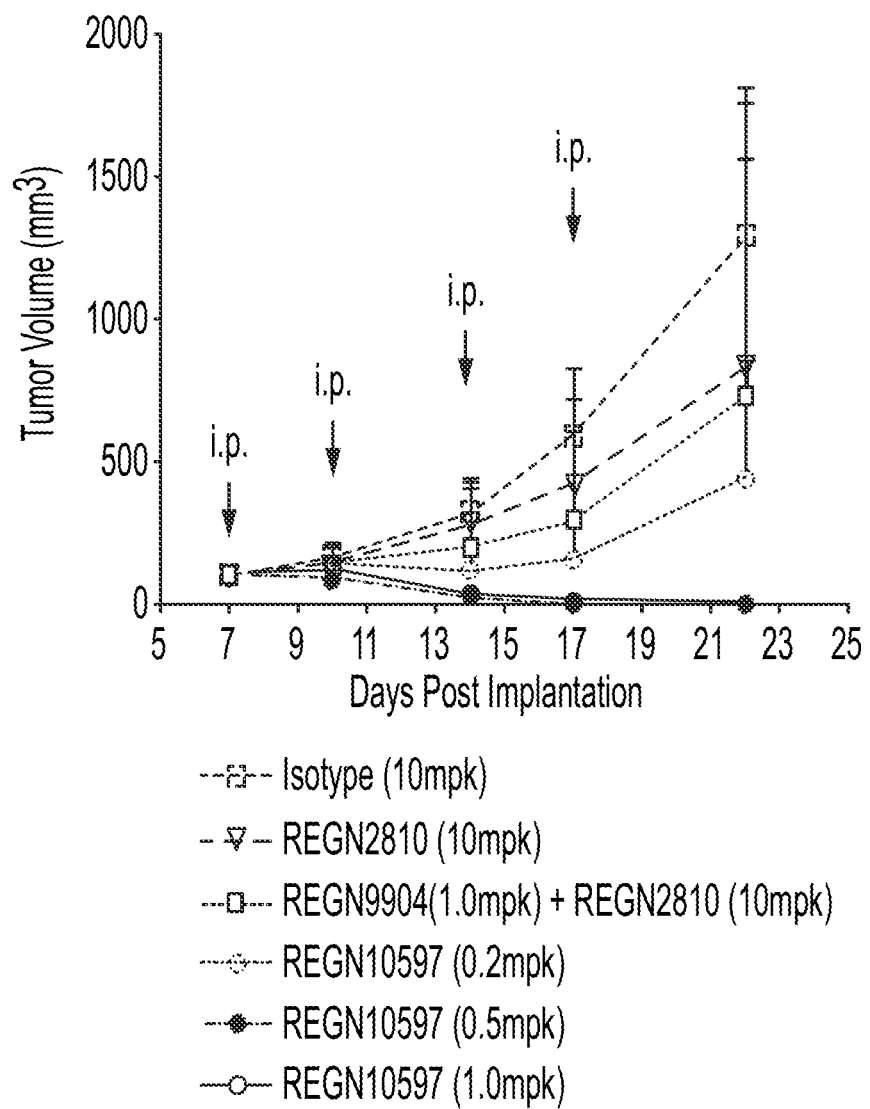
FIGS. 6A, 6B, 6C, 6D, 6E, 6F, 6G, and 6H are graphs showing in vivo activity assessment of anti-PD1-IL2Rα-IL2 fusion construct REGN10597 in PD1×LAG3 humanized mice, primarily in comparison to: the combination of a non-targeted control REGN9904 and a PD-1 blocking antibody REGN2810 (FIGS. 6A and 6B), the comparator anti-PD1-targeted "non-alpha" (3 m) molecule REGN13233 (FIGS. 6C, 6D, 6E, and 6F), and a construct containing all the same components as REGN10597 but with IL2 and IL2Rα fused to each other in the reverse order (FIGS. 6G and 6H), as described in Example 12.
Figure 6B:
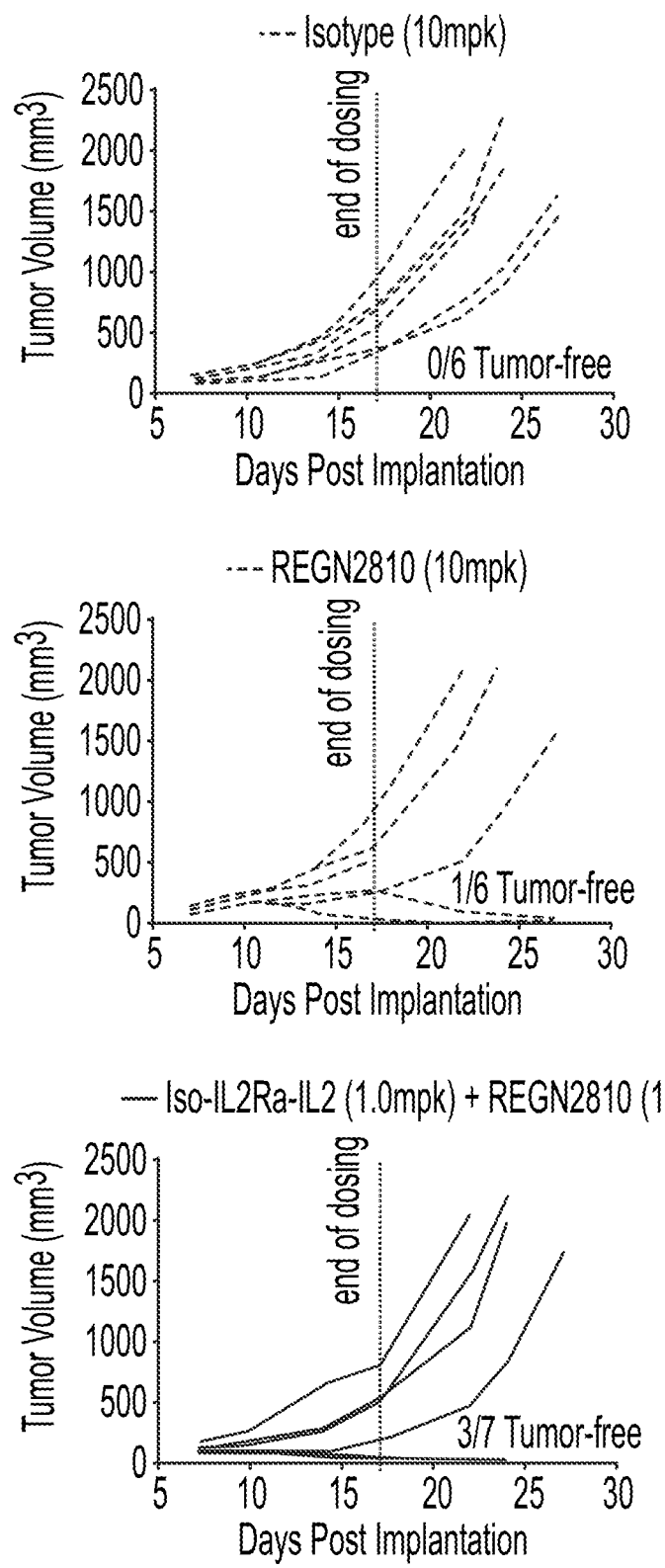
Figure 6B:
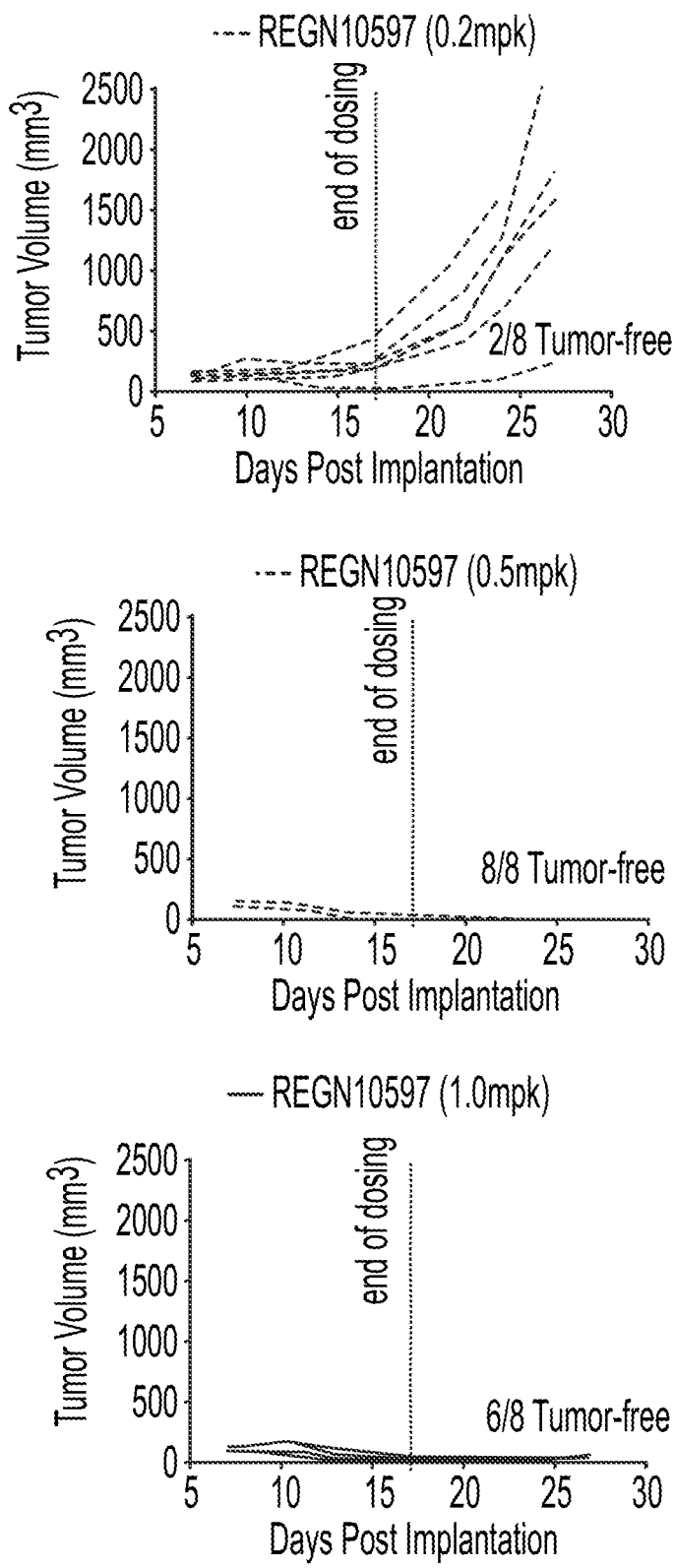

Example 12: In Vivo Anti-Tumor Efficacy and Safety Profile of Anti-PD1-IL2Rα-IL2 Fusion Constructs In a first experiment, the in vivo anti-tumor efficacy of single agent REGN10597 was assessed. Human PD1×LAG3 knock-in mice (described in Burova E. et al., 2019) were inoculated s.c. with $3 \times 10^5$ MC38 tumor cells on day 0 and were randomized on day 7 when average tumor size reached 105 mm$^3$. Mice in each randomized group received semi-weekly intraperitoneal injections of indicated molecules at specific dose levels for four total injections. Average tumor volumes (mm$^3$+SD) in each treatment group were plotted (FIG. 6A). Tumor sizes were calculated as v=a·b^2/2, where a represents the longest tumor diameter, and b is the perpendicular tumor diameter. Arrows in the figure indicate the days of treatment. Individual tumor growth curves and frequency of mice that underwent complete tumor rejection in each treatment group were shown (FIG. 6B).

REGN10597 monotherapy, at either 0.5 or 1 mg/kg dose levels, demonstrated superior anti-tumor activity over the combination of 1 mg/kg REGN9904 and 10 mg/kg REGN2810, resulted in a higher frequency of complete tumor regression in treated mice. An intermediate anti-tumor efficacy was also observed with 0.2 mg/kg REGN10597 treatment (FIGS. 6A, 6B).

In a second experiment, in vivo activity and toxicity profiles of REGN10597 were compared to those of the comparator REGN13233, an anti-PD1-targeted IL2 mutein with abrogated binding to IL2Rα. Human PD1×LAG3 knock-in mice (described in Burova E. et al., 2019) were inoculated s.c. with $3 \times 10^5$ MC38 tumor cells on day 0 and were randomized on day 7 when the average tumor size reached 70 mm$^3$. Mice in each randomized group received semi-weekly intraperitoneal injections of indicated molecules at specific dose levels for four total injections. Average tumor volumes (mm$^3$+SD) (FIG. 6C), Kaplan-Meier survival curves (FIG. 6D), and percentage of body weight changes (Mean+SD) (FIG. 6E) in each treatment group were plotted. Arrows in FIG. 6A indicate the days of treatment. Frequencies of mice that underwent complete tumor rejection were indicated for select groups in (FIG. 6D). On day 13, blood from all groups was collected and analyzed by flow cytometry. Counts of total white blood cells were shown (FIG. 6F).

Figure 6C:
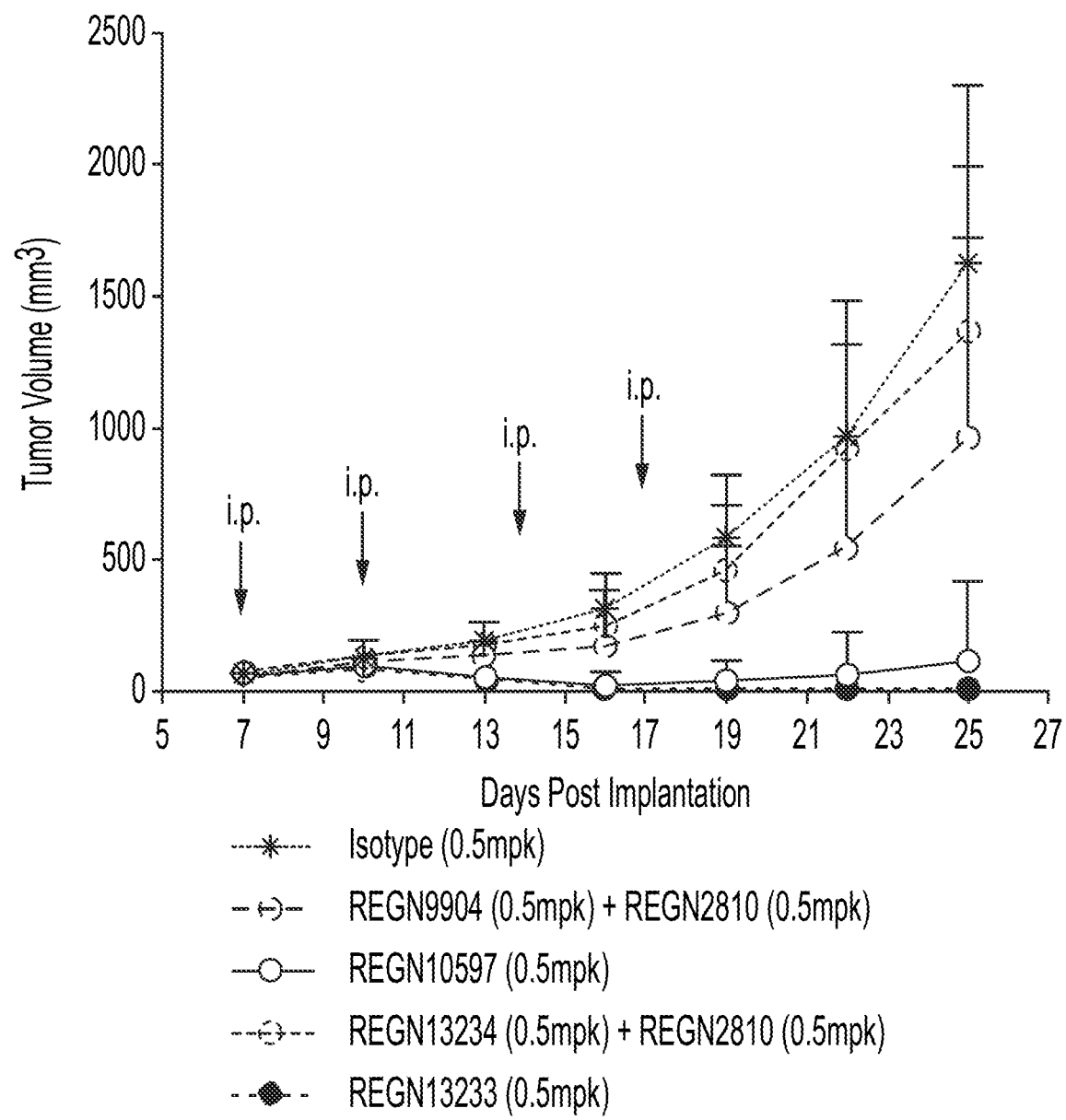
Figure 6D:
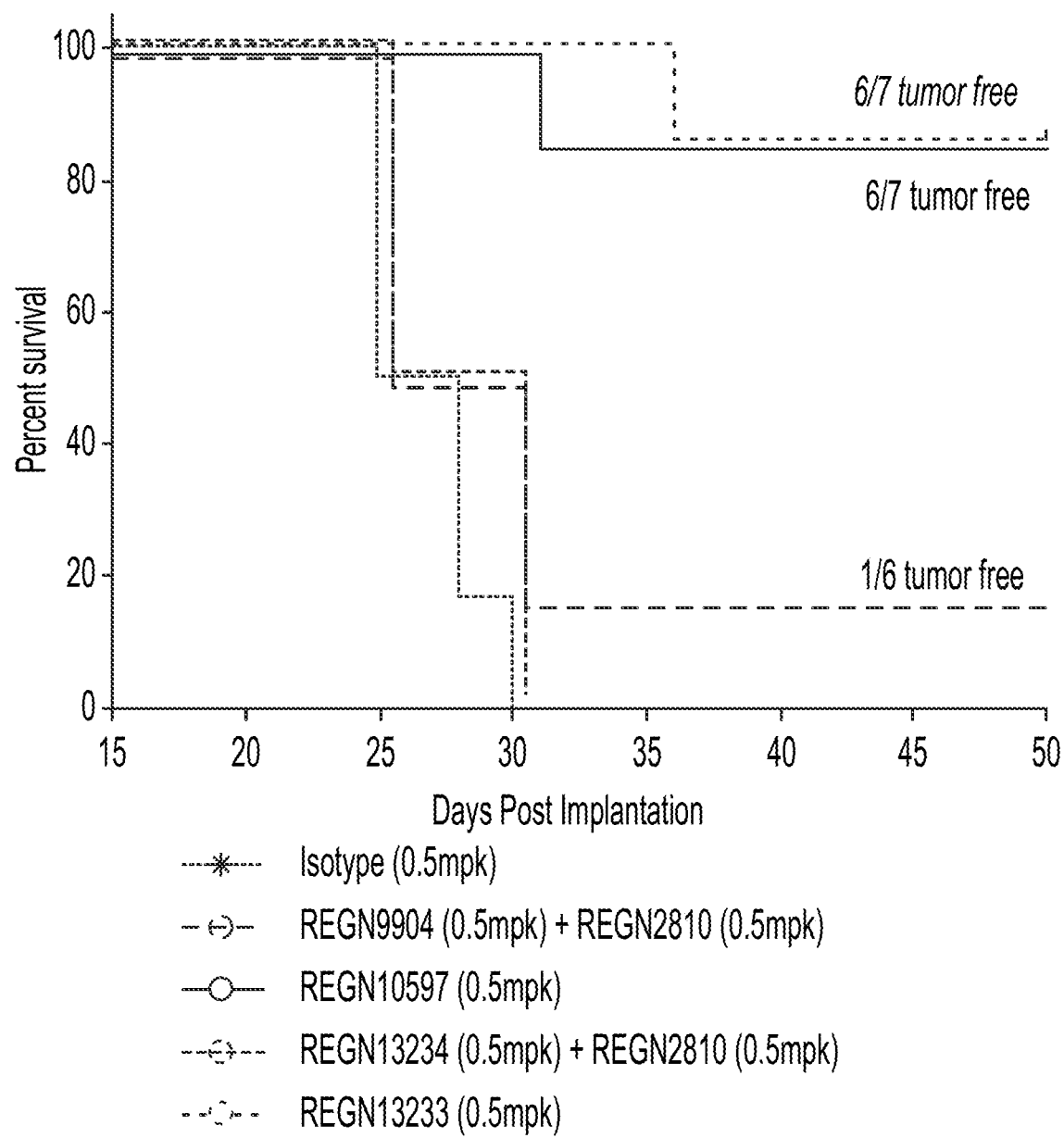

Both REGN10597 and REGN13233 monotherapies demonstrated superior anti-tumor efficacy over the combination of REGN2810 with their respective non-targeted controls (REGN9904 for REGN10597, REGN13234 for REGN13233), and showed complete tumor regression in the majority of the treated mice in both groups (FIGS. 6C, 6D).

Figure 6E:
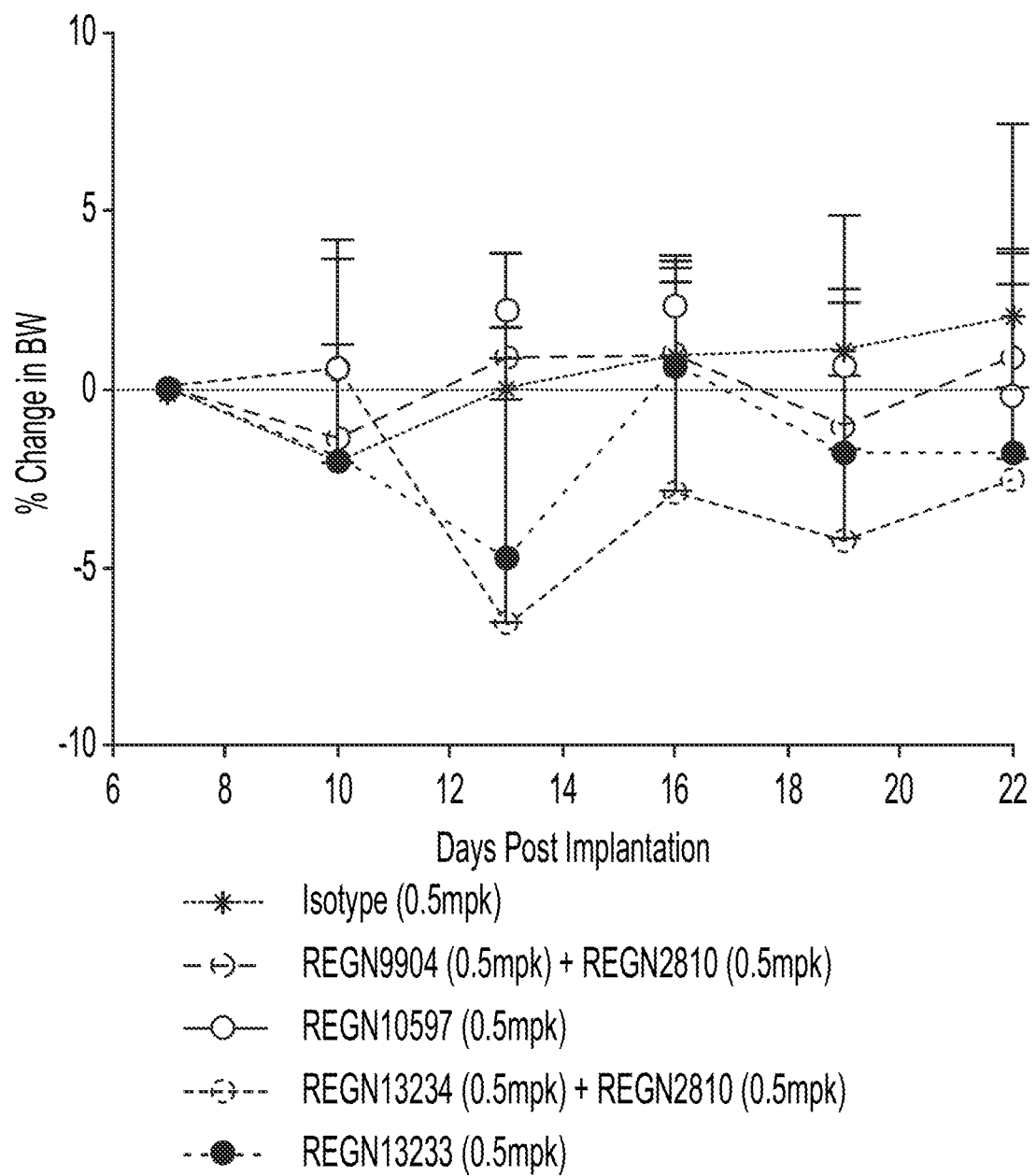
Figure 6F:
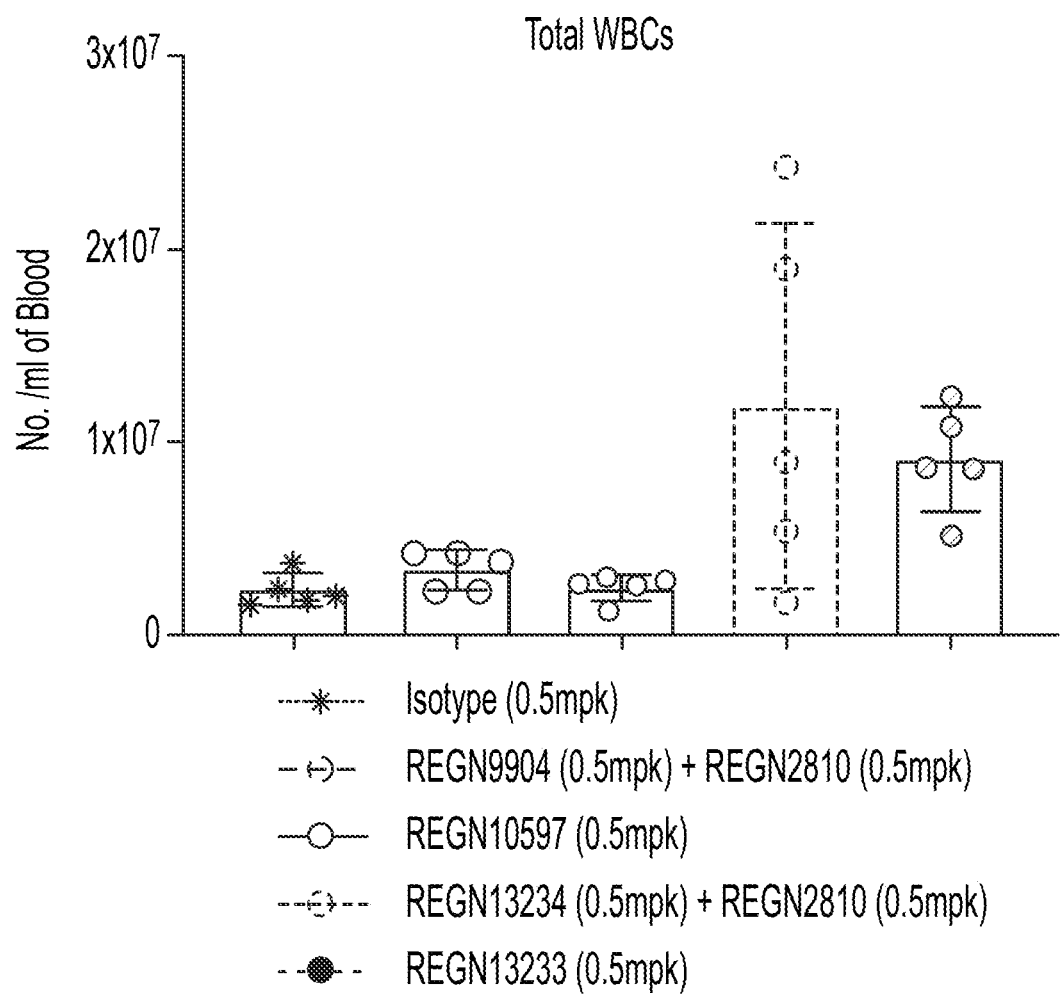

However, unlike REGN10597, which caused no obvious body weight change in treated mice, the same dose of REGN13233 treatment led to significant body weight loss that was concomitant with a marked increase of circulating lymphocytes (FIG. 6E). This difference in toxicity was likely attributable to the different IL-2 moieties in REGN10597 and REGN13233, as similar body weight loss and white blood cell count increase were observed in REGN13234 treated group (FIGS. 6E, 6F). Further immunophenotyping of white blood cells by multi-parameter flow cytometry revealed that REGN10597 more selectively expanded PD-1$^+$ CD4 and CD8 T cells, whereas REGN13233 not only expanded those cells but also massively enlarged CD44$^+$CD62L$^+$ CD8 T cell and NK cell populations.

These results indicated although REGN10597 and the comparator molecule REGN13233 both displayed robust anti-tumor efficacy, REGN10597 has a better safety profile, likely due to its ability to more selectively expand PD1$^+$ T cells in vivo compared to REGN13233 which expanded broader CD8$^+$ T and NK cell populations.

Figure 6G:
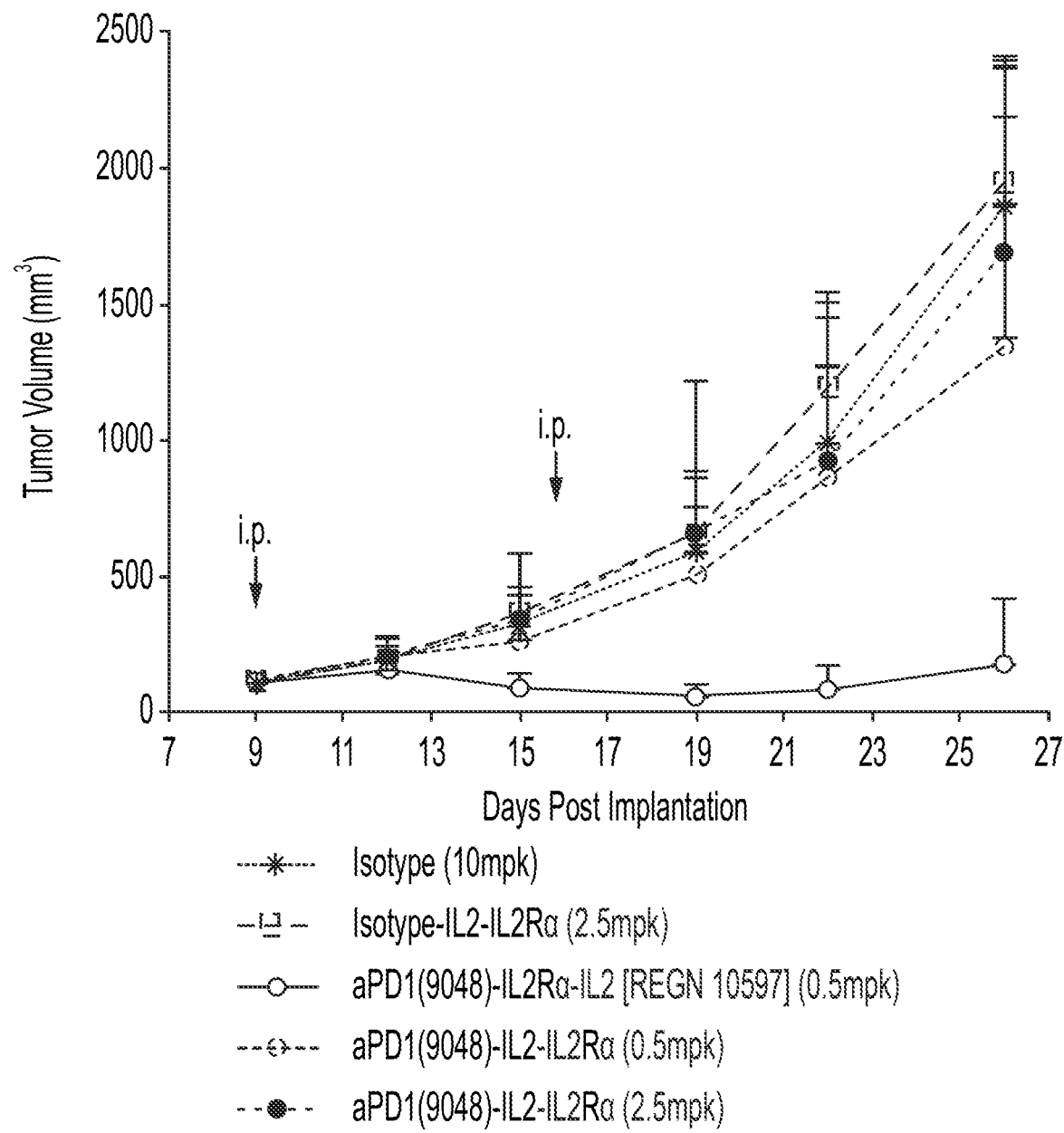
Figure 6H:
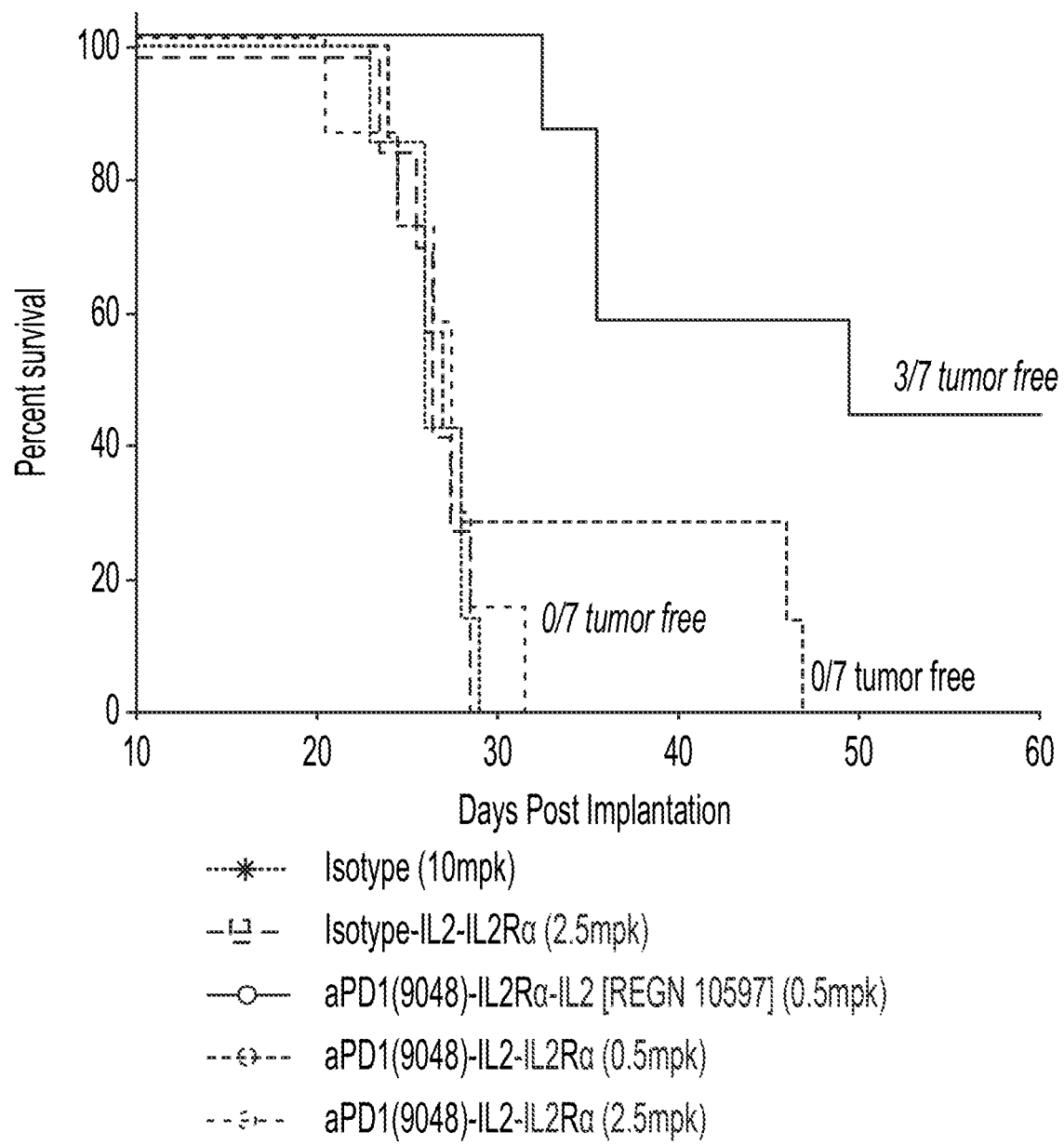

In a third experiment, in vivo anti-tumor efficacy of REGN10597 was compared to that of aPD1-IL2-IL2Rα, a molecule that contains all the same parts as REGN10597, but the IL2 and IL2Rα moieties are fused to each other in the reversed order. Human PD1×LAG3 knock-in mice (described in Burova E. et al., 2019) were inoculated s.c. with $3 \times 10^5$ MC38 tumor cells on day 0 and were randomized on day 9 when average tumor size reached 120 mm$^3$. Mice in each group then received weekly intraperitoneal injection of indicated molecules at specific dose levels for two total injections. (FIG. 6G). Average tumor volumes (mm$^3$+SD) in each treatment group were plotted. Tumor sizes were calculated as v=a·b^2/2, where a represents the longest tumor diameter, and b is the perpendicular tumor diameter. Arrows in the figure indicate the days of treatment (FIG. 6H). Kaplan-Meier survival curves in each treatment group were also shown. Loss of survival was defined as euthanasia when tumors showed profound ulceration or when tumors reached 20 mm in any dimension or 2250 mm$^3$ in total volume. Frequencies of mice that underwent complete tumor rejection were indicated for select groups.

Unlike REGN10597, which displayed robust anti-tumor activity in vivo, the same or a higher dose of aPD1-IL2-IL2Rα showed minimal tumor growth control. This result indicated the correct order of IL2Rα-IL2 fusion in REGN10597 is crucial for its potent anti-tumor activity in vivo (FIGS. 6G, 6H).

Example 13: Flow Binding of Ab-IL2Ra-IL2 Fusion Molecules to IL2 Receptors

Functional IL2 receptors are formed by the differential assembly of IL2R subunits (IL2Ra=CD25, IL2Rb=CD122 and IL2Rg=CD132) leading to medium affinity IL2 receptors (IL2Rb/IL2Rg) and high affinity IL2 receptors (IL2Ra/IL2Rb/IL2Rg) expressed on immune cells (PMID: 16293754). The ability of IL2 and IL2Ra-IL2 chimeric antibodies to bind cells expressing the medium affinity IL2 receptor (IL2Rb/g, knocked out for IL2Ra) or high affinity receptor (IL2Rb/g and IL2Rα over-expressing) was assessed using flow cytometry.

While YT cells express endogenously human PD1, Over-Expressing PD-1 cells (PD1 OE) were generated. To test the binding of human IL2 and human IL2Ra-IL2 chimeric antibodies (=primary antibody) to cells, YT/STAT5-Luc/PD1 OE reporter cells expressing endogenously all three IL2 receptors subunits, were genetically modified to display either the medium affinity IL2 receptor by Knocking Out the IL2Ra subunit (CD25 KO) or the high affinity receptor by Over-Expressing IL2Ra (CD25 OE) on the cell surface. Binding of antibodies to these cells was detected using a fluorescently-labeled secondary antibody by flow cytometry. In brief, PD1 OE YT cells that were CD25 KO or CD25 OE were resuspended in stain buffer (2% FBS in PBS), $3 \times 10^5$ cells were seeded per well into 96 well plates and incubated for 30 min on ice with 1:5 serially diluted primary antibodies [Isotype-IL2 (REGN8512) or Isotype-IL2Ra-IL2 (REGN9904)]. The final antibody concentration ranged from 768 fM to 300 nM, including a no antibody control labeled as "secondary only". After incubation, samples were washed with ice-cold stain buffer, followed by the incubation with an AF647-labeled anti-human IgG antibody on ice for 30 minutes. Unbound secondary antibodies were removed, samples washed once with ice-cold PBS, stained with a viability dye, washed once with ice-cold stain buffer, fixed for 30 minutes at room temperature, washed in stain buffer, resuspended in stain buffer, and filtered before the analysis on the iQue Plus flow cytometer to capture the geometric Mean Fluorescent Intensity (gMFI). The following equation was used to calculate the maximal fold binding over secondary only:

$$\text{Fold induction} = \frac{\text{Highest } gMFI \text{ value within tested dose range}}{\text{Mean } gMFI \text{ values of no primary antibody control}}$$

Summary of Results

Figure 7A:
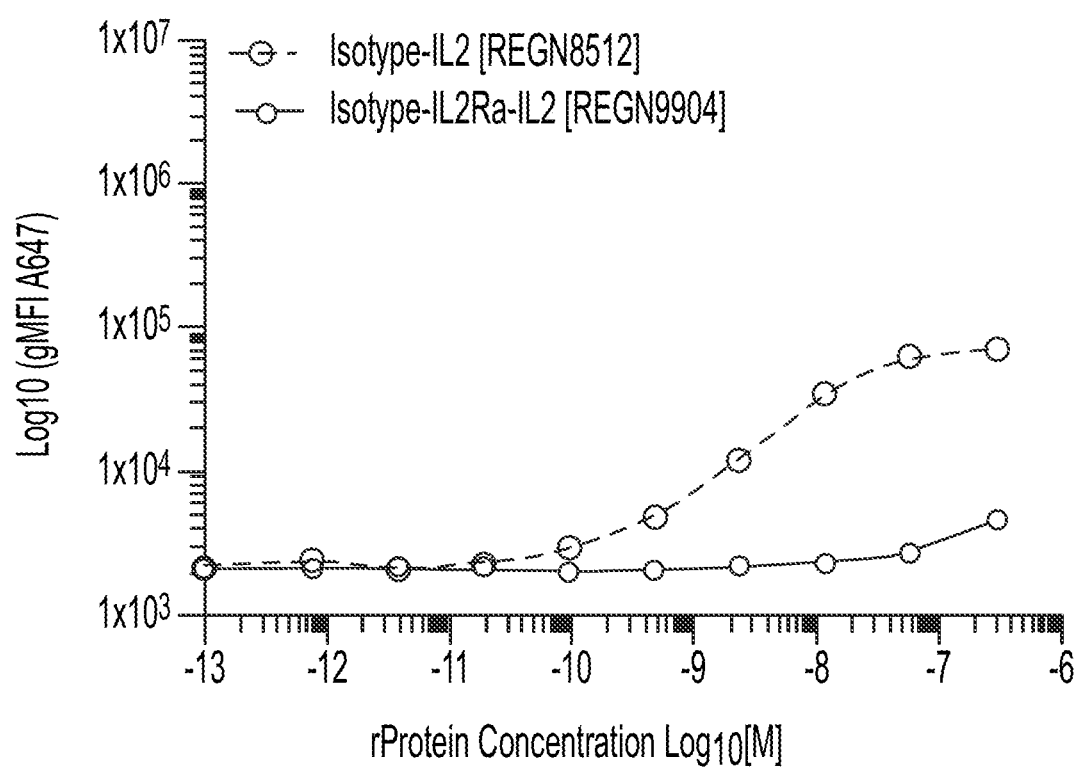
FIGS. 7A and 7B show graphs for the IL2 binding assay described in Example 13. YT/STAT5-Luc/IL2Rα KO (FIG. 7A) or YT/STAT5-Luc/IL2Rα OE (FIG. 7B) were incubated with a titration of an antibody in-line fused to IL2 (REGN8512; gray open circle with dashed line) or an antibody in-line fused to IL2Rα and IL2 (REGN9904; black filled circle with solid line). Cells were washed, stained with a secondary AF647 anti-human IgG, washed, fixed, and acquired on an iQue Plus flow cytometer.
Figure 7B:
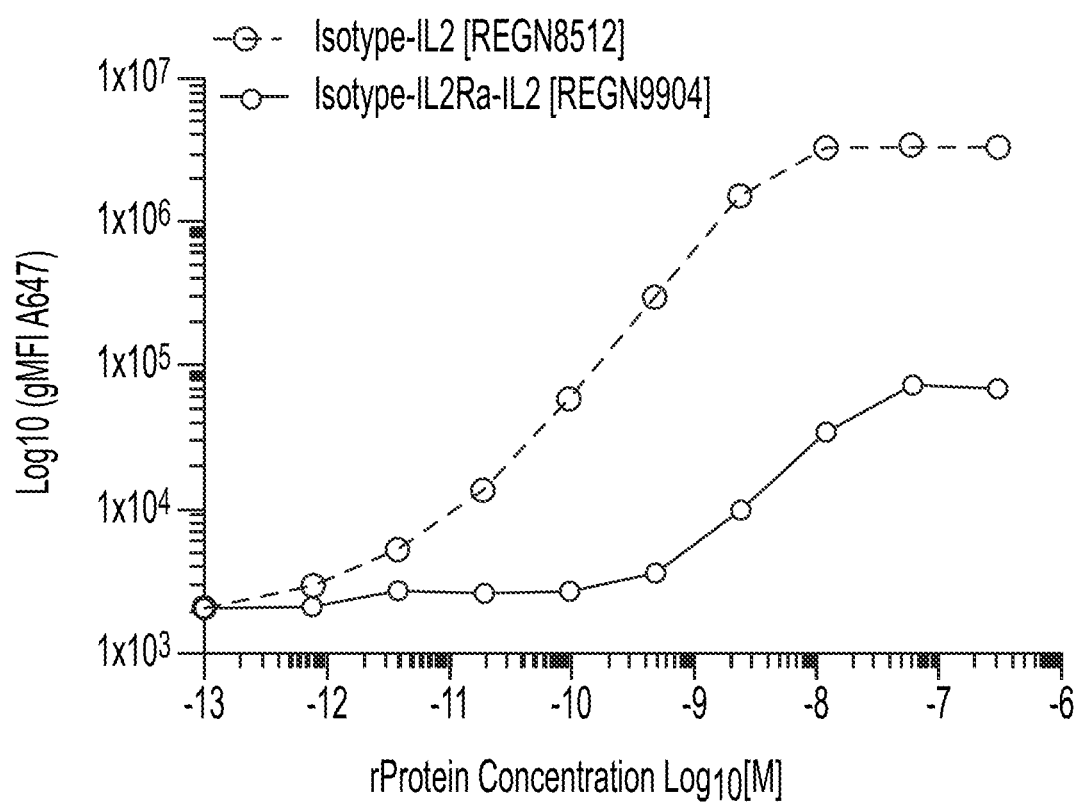

Table 17 summarizes max geometric MFI and fold induction values for antibody-IL2 or antibody-IL2Ra-IL2 chimeric constructs binding to CD25 knocked-out or over-expressing cells. A dose dependent binding of an isotype IL2 molecule (REGN8512) and an isotype IL2Ra-IL2 molecule (REGN9904) was observed on both engineered YT cells expressing either the intermediate affinity IL2Rβ/γ receptor (CD25 KO) or the high affinity IL2Rα/β/γ receptor (CD25 OE) (FIGS. 7A, 7B; Table 17). As expected max fold binding was greater for both constructs on CD25 OE cells. However, binding of Ab-IL2Ra-IL2 was greatly reduced compared to Ab-IL2 on both IL2Rα/β/γ- and IL2Rβ/γ-expressing cell lines, suggesting "masking" of IL-2 by the presence of IL2Ra in the fusion protein.

TABLE 17

IL2 flow binding assay - Summary of Max gMFI and Fold induction values

|  | Test article | Max gMFI | Fold induction* |
|---|---|---|---|
| CD25 KO/PD1 OE | Isotype-IL2 [REGN8512] | 7.18E+04 | 31.2 |
|  | Isotype-IL2Ra-IL2 [REGN9904] | 3.99E+03 | 1.704 |
| CD25 OE/PD1 OE | Isotype-IL2 [REGN8512] | 3.33E+06 | 1341 |
|  | Isotype-IL2Ra-IL2 [REG9904] | 7.76E+04 | 33.11 |

*Fold induction defined as the highest gMFI value within the tested dose-range relative to the gMFI observed in absence of antibody.

Example 14: Bioassay to Assess Potency of PD1-IL2R2-IL2 Molecules

Functional IL2 receptors are formed by the differential assembly of IL2R subunits (IL2Ra=CD25, IL2Rb=CD122 and IL2Rg=CD132) leading to medium affinity IL2 receptors (IL2Rβ/γ) and high affinity IL2 receptors (IL2Rα/β/γ) expressed on immune cells (PMID: 16293754).

To assess the bioactivity of IL2 or IL2Ra-IL2 or IL-2-IL2Ra chimeric antibodies, cell-based reporter assays were established leading to the activation of STAT5 driven luciferase expression upon binding of IL2 to medium affinity or high affinity IL2 receptors on engineered YT/STAT5-Luc. While YT cells express endogenously human PD1, Over-Expressing PD-1 cells (PD1 OE) were generated. YT/STAT5-Luc/PD1 OE reporter cells expressing endogenously all three IL2 receptors subunits were genetically modified to display either the medium affinity IL2 receptor by Knocking Out the IL2Ra subunit (CD25 KO) or the high affinity receptor by Over-Expressing IL2Ra (CD25 OE) on the cell surface.

RPMI1640 supplemented with 10% FBS and P/S/G was used as assay medium to prepare cell suspensions and antibody dilutions. A day prior to screening, engineered YT/STAT5-Luc reporter cells (CD25 KO/PD1 OE and CD25 OE/PD1 OE) were diluted at $3 \times 10^5$ cells/mL. On the day of the assay, cells were spun down, resuspended in assay medium, plated at $2.5 \times 10^4$ reporter cells/well in 96 well white flat bottom plates and incubated with Isotype-IL2Ra-IL2 [REGN9903 or REGN9904], Isotype-IL2-IL2Ra, Isotype-IL2(3 m) [REGN13234], anti-PD1(arm 9048)-targeted-IL2Rα-IL2 [REGN10597], anti-PD1(arm 9048)-targeted-IL2-IL2Ra or anti-PD1(arm 9048)-targeted-IL2(3 m) [REGN13233], serially diluted (1:5) over an 11-point titration range (200 nM to 21 fM) (FIGS. 1A, 1B, 1C, 1D), or (1:4) over an 11-point titration range (250 nM to 238 fM) (FIGS. 2A, 2B), and a $12^{th}$ point containing no recombinant protein. Plates were incubated for 4 h 30 minutes (FIGS. 1A, 1B, 1C, 1D) or 4 hours (FIGS. 2A, 2B) at 37° C./5% CO2 and then 100 mL ONE-Glo™ (Promega) reagent was added to the wells to lyse the cells and detect luciferase activity. The emitted light was measured in RLU on a multilabel plate reader Envision (PerkinElmer). $EC_{50}$ values of the antibodies were determined using GraphPad Prism™ software from a four-parameter logistic equation over a 12-point dose-response curve. Fold induction was calculated using the following equation:

$$\text{Maximum Fold Induction} = \frac{\text{Highest mean } RLU \text{ value within tested dose range}}{\text{Mean } RLU \text{ values of no protein control}}$$

Summary of Results

Figure 8A:
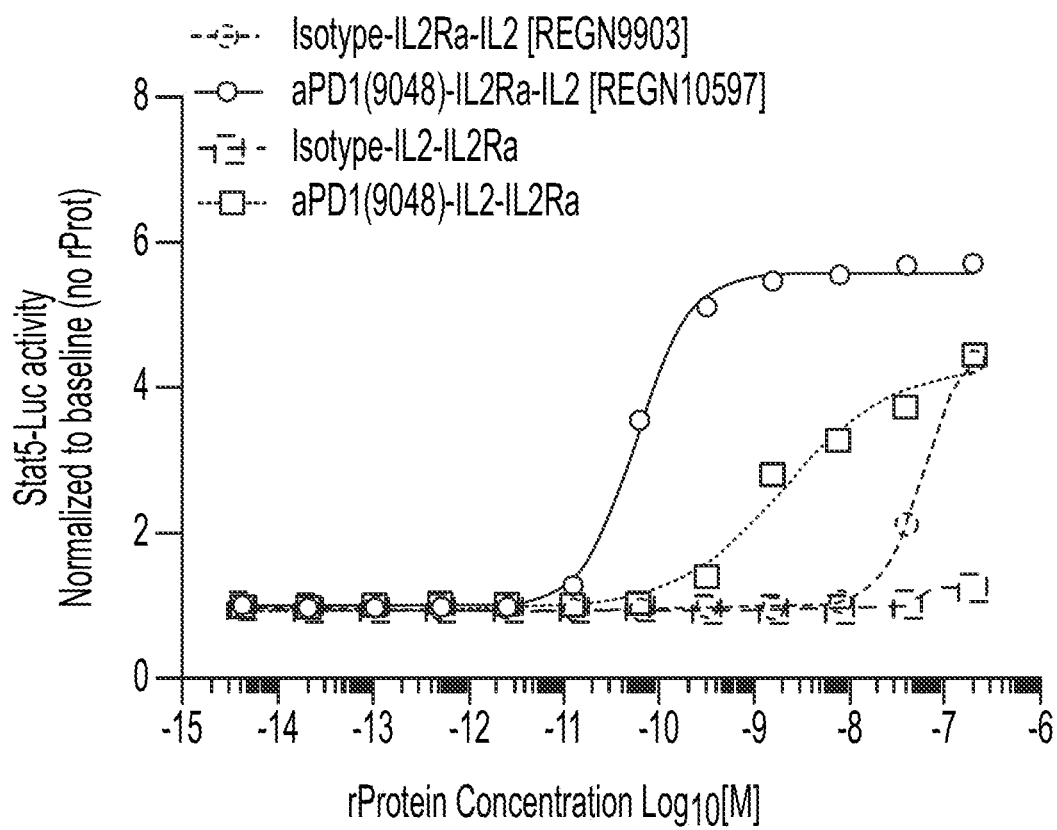
FIGS. 8A and 8B are graphs showing IL2 reporter assay comparison of Ab-IL2Rα-IL2 and Ab-IL2-IL2Rα, as described in Example 14. YT/STAT5-Luc/IL2Rα KO/hPD1 (FIG. 8A) or YT/STAT5-Luc/hIL2Rα/hPD1 (FIG. 8B) were incubated with a titration of a non-targeted IL2Rα-IL2 (black open round symbol with black dashed line, REGN9903), a non-targeted IL2-IL2Rα (gray square open symbol with gray dashed line), anti-PD1-IL2Rα-IL2 (black filled round symbol with black solid line, REGN10597), or an anti-PD1-IL2-IL2Rα (gray square filled symbol with gray solid line). 4 h and 30 minutes later, STAT5 activity was assessed by luminescent readout.
Figure 8B:
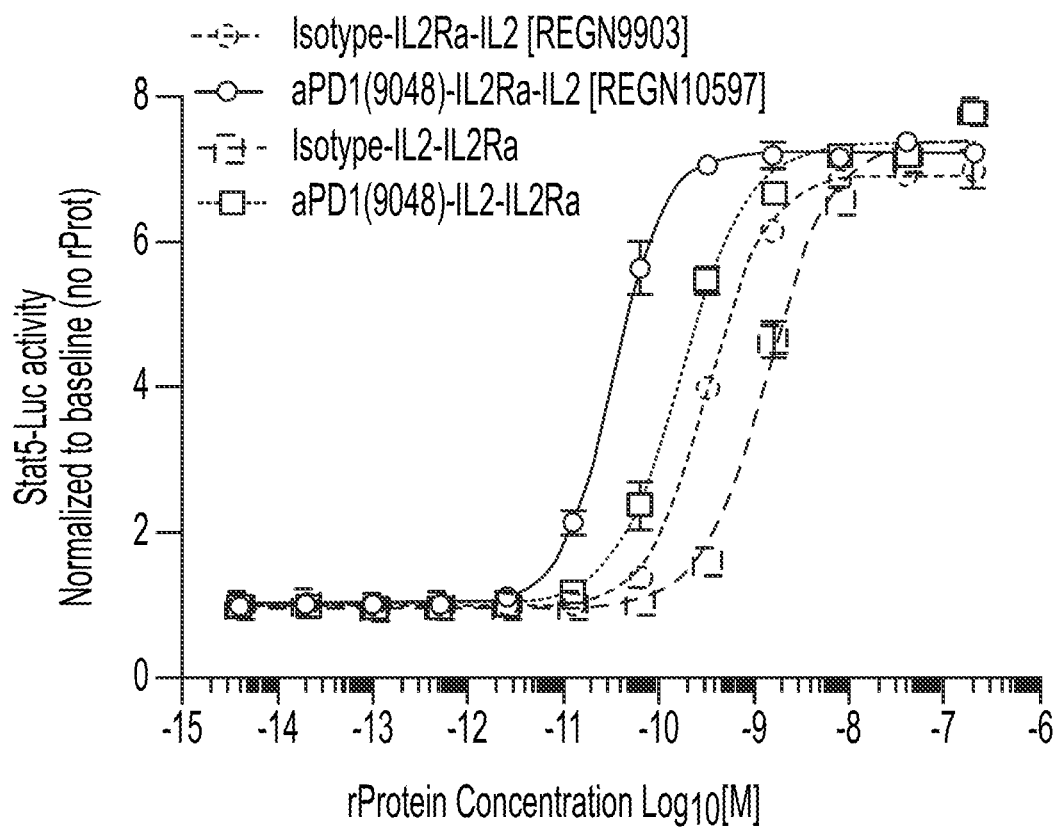

Isotype IL2Ra-IL2 (REGN9903), Isotype-IL2-IL2Ra, anti-PD1 targeted-IL2Ra-IL2 (REGN10597) and anti-PD1 targeted-IL2-IL2Ra lead to dose dependent increases in STAT5-driven reporter expression both in absence (FIG. 8A) or presence (FIG. 8B) of IL2Ra expression on reporter cells (Table 18). PD-1 targeted molecules exhibited enhanced potency compared to Isotype targeted molecules. IL2-IL2Ra chimeric molecules exhibited reduced potency compared to IL2Ra-IL2 chimeric molecules, whether in presence or absence of IL2Rα expression on reporter cells.

TABLE 18

IL2 reporter assay comparison of Ab-IL2Ra-IL2 and Ab-IL2-IL2Ra Summary of $EC_{50}$ values and Fold induction

|  | EC50 (M) | | Max Fold induction* | |
| --- | --- | --- | --- | --- |
|  | CD25 KO/ PD1 OE | CD25 OE/ PD1 OE | CD25 KO/ PD1 OE | CD25 OE/PD1 OE |
| Isotype-IL2Ra-IL2 [REGN9903] | NC | 3.313E−10 | 4.37 | 7.00 |
| aPD1(9048)-IL2Ra-IL2 [REGN10597] | 5.781E−11 | 3.297E−11 | 5.72 | 7.36 |
| Isotype-IL2-IL2Ra | NC | 1.408E−09 | 1.25 | 7.78 |
| aPD1(9048)-IL2-IL2Ra | 2.052E−09 | 1.748E−10 | 4.42 | 7.77 |

NC: Not calculated because the data did not fit a 4-parameter logistic equation.
*Fold induction is the highest mean RLU value within the tested dose-range relative to the mean RLU in absence of antibody.

Figure 9A:
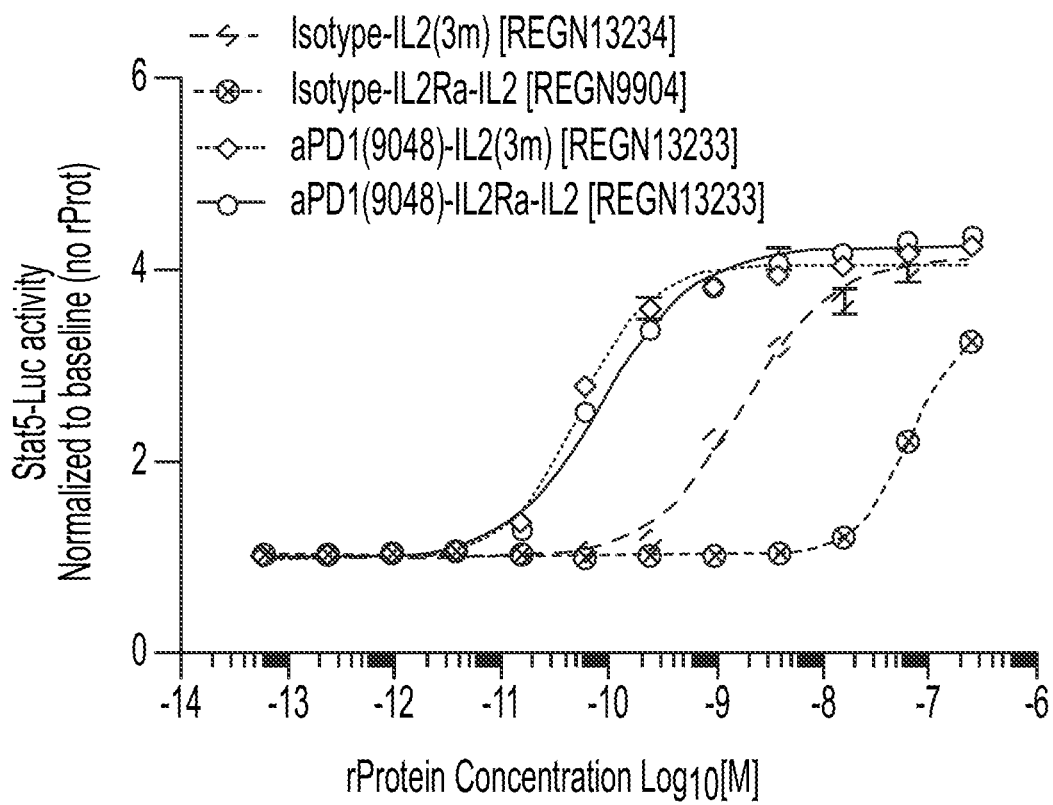
FIGS. 9A and 9B are graphs showing IL2 reporter assay comparison of Ab-IL2Rα-IL2 and Ab-IL2(3 m), as described in Example 14. YT/STAT5-Luc/IL2Rα KO/hPD1 (FIG. 9A) or YT/STAT5-Luc/hIL2Rα/hPD1 (FIG. 9B) were incubated with a titration of a non-targeted IL2Rα-IL2 (black open round symbol with black dashed line, REGN9904), a non-targeted IL2(3 m) (gray diamond open symbol with gray dashed line), anti-PD1-IL2Rα-IL2 (black filled round symbol with black solid line, REGN10597), or an anti-PD1-IL2(3 m) (gray diamond filled symbol with gray solid line. 4 h later, STAT5 activity was assessed by luminescent readout.
Figure 9B:
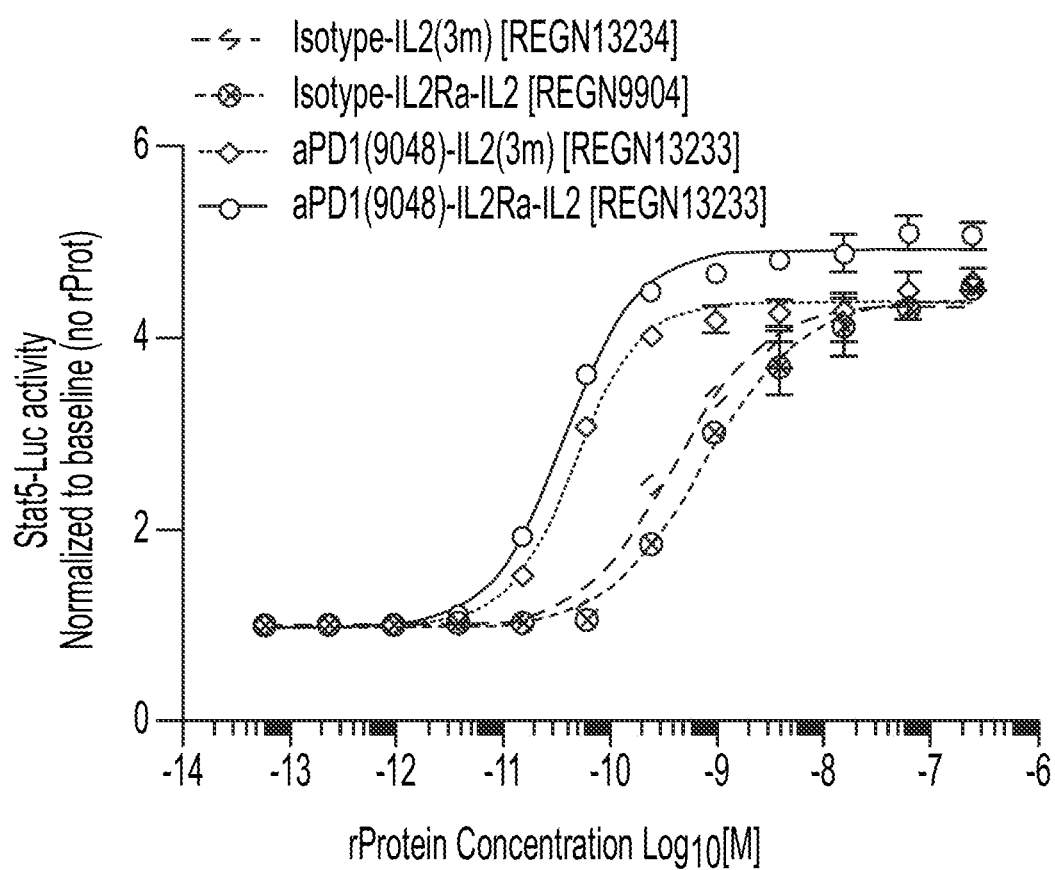

Isotype IL2Ra-IL2 (REGN9903), Isotype-IL2(3 m) (REGN13234), anti-PD1 targeted-IL2Ra-IL2 (REGN10597) and anti-PD1 targeted-IL2(3 m) (REGN13233) lead to dose dependent increases in STAT5-driven reporter expression both in absence (FIG. 9A) or presence (FIG. 9B) of IL2Ra expression on reporter cells (Table 19). PD1 targeted molecules exhibited similar potency in absence of IL2Ra expression in reporter cells (REGN13233: 53 pM, REGN10597: 84 pM) or presence of IL2Ra on reporter cells (REGN13233: 46 pM, REGN10597: 37 pM). In absence of PD1 targeting, IL2Ra-IL2 chimeric molecules exhibited reduced potency compared to IL2(3 m) chimeric molecules.

TABLE 19

IL2 reporter assay comparison of Ab-IL2Ra-IL2 and Ab-IL2(3m) Summary of $EC_{50}$ values and Fold induction

|  | EC50 (M) | | Max Fold induction* | |
| --- | --- | --- | --- | --- |
|  | CD25 KO/ PD1 OE | CD25 OE/ PD1 OE | CD25 KO/ PD1 OE | CD25 OE/PD1 OE |
| Isotype-IL2(3m) [REGN13234] | 1.743E−09 | 3.875E−10 | 4.25 | 4.49 |
| Isotype-IL2Ra-IL2 [REGN9904] | NC | 7.687E−10 | 3.24 | 4.57 |
| aPD1(9048)-IL2(3m) [REGN13233] | 5.317E−11 | 4.644E−11 | 4.24 | 4.62 |
| aPD1(9048)-IL2Ra-IL2 [REGN10597] | 8.383E−11 | 3.706E−11 | 4.36 | 5.10 |

NC: Not calculated because the data did not fit a 4-parameter logistic equation.
*Fold induction is the highest mean RLU value within the tested dose-range relative to the mean RLU in absence of antibody.

The present disclosure is not to be limited in scope by the specific embodiments described herein. Indeed, various modifications of the disclosure in addition to those described herein will become apparent to those skilled in the art from the foregoing description and accompanying figures. Such modifications are intended to fall within the scope of the appended claims.

We claim:

1. A fusion protein comprising: (i) an antigen-binding moiety that binds specifically to human programmed cell death protein 1 (PD-1) and (ii) an interleukin 2 (IL2) moiety,
wherein the antigen-binding moiety comprises an antibody or antigen-binding fragment thereof that binds specifically to human PD-1 and comprises a heavy chain variable region (HCVR) comprising three heavy chain complementarity determining regions (CDRs) (HCDR1, HCDR2, and HCDR3) and a light chain variable region (LCVR) comprising three light chain CDRs (LCDR1, LCDR2, and LCDR3), wherein the antigen-binding moiety comprises a heavy chain constant region linked to the HCVR, and wherein: HCDR1, HCDR2, HCDR3, LCDR1, LCDR2, and LCDR3 comprise the respective amino acid sequences of:
(i) SEQ ID NOs: 43, 45, 47, 12, 14, and 16;
(ii) SEQ ID NOs: 4, 6, 8, 12, 14, and 16; or
(iii) and SEQ ID NOs: 24, 26, 28, 32, 14, and 35; and
wherein the IL2 moiety comprises: (i) IL2 or a fragment thereof and (ii) IL2 receptor alpha (IL2Ra) or a fragment thereof;
wherein the IL2 or fragment thereof is connected to the C-terminal of the IL2Ra or fragment thereof via a first linker, and the IL2 moiety is connected to the C-terminal of the heavy chain constant region via a second linker.

2. The fusion protein of claim 1, wherein the antigen-binding moiety comprises HCDR1, HCDR2, HCDR3, LCDR1, LCDR2, and LCDR3 comprising respective amino acid sequences of SEQ ID NOs: 43, 45, 47, 12, 14, and 16.

3. The fusion protein of claim 1, wherein the antigen-binding moiety comprises a heavy chain variable region (HCVR) comprising an amino acid sequence of SEQ ID NO: 41, 2, or 22; and a light chain variable region (LCVR) comprising an amino acid sequence of SEQ ID NO: 10 or 30.

4. The fusion protein of claim 3, wherein the HCVR comprises the amino acid sequence of SEQ ID NO: 2 and the LCVR comprises the amino acid sequence of SEQ ID NO: 10.

5. The fusion protein of claim 3, wherein the HCVR comprises the amino acid sequence of SEQ ID NO: 22 and the LCVR comprises the amino acid sequence of SEQ ID NO: 30.

6. The fusion protein of claim 3, wherein the HCVR comprises the amino acid sequence of SEQ ID NO: 41 and the LCVR comprises the amino acid sequence of SEQ ID NO: 10.

7. The fusion protein of claim 1, wherein the antigen-binding moiety comprises a heavy chain constant region of SEQ ID NO: 55 and a light chain constant region of SEQ ID NO: 56.

8. The fusion protein of claim 1, wherein the antigen-binding moiety comprises a heavy chain/light chain sequence pair of SEQ ID NOs: 61/62, 57/58, or 59/60.

9. The fusion protein of claim 1, wherein the antigen-binding moiety comprises a heavy chain/light chain sequence pair of SEQ ID NOs: 61/62.

10. The fusion protein of claim 1, wherein the IL2 or fragment thereof is human IL2 (hIL2) or a fragment thereof.

11. The fusion protein of claim 10, wherein the IL2Ra or fragment thereof is human IL2Ra (hIL2Ra) or a fragment thereof.

12. The fusion protein of claim 1, wherein the IL2 or fragment thereof comprises the amino acid sequence of SEQ ID NO: 53.

13. The fusion protein of claim 1, wherein the IL2Ra or fragment thereof comprises the amino acid sequence of SEQ ID NO: 51.

14. The fusion protein of claim 1, wherein the first and/or second linker comprises an amino acid sequence of one or more repeats of GGGGS (SEQ ID NO: 67).

15. The fusion protein of claim 1, wherein the first linker comprises an amino acid sequence of SEQ ID NO: 52, and the second linker comprises an amino acid sequence of SEQ ID NO: 50.

16. The fusion protein of claim 1, wherein the IL2 moiety comprises the amino acid sequence of SEQ ID NO: 54.

17. A fusion protein comprising: (i) a first polypeptide comprising a light chain variable region (LCVR) of an antibody; and (ii) a second polypeptide that comprises (a) a heavy chain variable region (HCVR) of the antibody and a heavy chain constant region linked to the HCVR of the antibody and (b) an IL2 moiety;
wherein the antibody binds specifically to human programmed cell death protein 1 (PD-1), the HCVR comprises three heavy chain complementarity determining regions (CDRs) (HCDR1, HCDR2, and HCDR3), and the LCVR comprises three light chain CDRs (LCDR1, LCDR2, and LCDR3), wherein: HCDR1, HCDR2, HCDR3, LCDR1, LCDR2, and LCDR3 comprise the respective amino acid sequences of:
(i) SEQ ID NOs: 43, 45, 47, 12, 14, and 16;
(ii) SEQ ID NOs: 4, 6, 8, 12, 14, and 16; or
(iii) and SEQ ID NOs: 24, 26, 28, 32, 14, and 35; and
wherein the IL2 moiety comprises: (i) IL2 or a fragment thereof and (ii) IL2 receptor alpha (IL2Ra) or a fragment thereof;
wherein the IL2 or fragment thereof is connected to the C-terminal of the IL2Ra or fragment thereof via a first linker, and the IL2 moiety is connected to the C-terminal of the heavy chain constant region via a second linker.

18. The fusion protein of claim 17, wherein the HCDR1, HCDR2, HCDR3, LCDR1, LCDR2 and LCDR3 comprise the respective amino acid sequences of SEQ ID NOs: 43, 45, 47, 12, 14, and 16.

19. The fusion protein of claim 17, wherein the HCVR and the LCVR comprise respective amino acid sequences of (i) SEQ NOs: 41 and 10; (ii) SEQ ID NOs: 2 and 10; or (iii) SEQ ID NOs: 22 and 30.

20. The fusion protein of claim 17, wherein the first polypeptide comprises a light chain constant region linked to the LCVR.

21. The fusion protein of claim 20, wherein the light chain constant region comprises an amino acid sequence of SEQ ID NO: 56.

22. The fusion protein of claim 17, wherein the heavy chain constant region comprises an amino acid sequence of SEQ ID NO: 55.

23. The fusion protein of claim 17, wherein the first polypeptide comprises a light chain sequence of SEQ ID NO: 62, 58, or 60.

24. The fusion protein of claim 17, wherein the second polypeptide comprises a heavy chain sequence of SEQ ID NO: 61, 57, or 59.

25. The fusion protein of claim 17, comprising a heavy chain/light chain sequence pair of SEQ ID NOs: 61/62, 57/58, or 59/60.

26. The fusion protein of claim 17, comprising a heavy chain/light chain sequence pair of SEQ ID NOs: 61/62.

27. The fusion protein of claim 17, wherein the IL2 or fragment thereof is human IL2 (hIL2) or a fragment thereof.

28. The fusion protein of claim 17, wherein the IL2Ra or fragment thereof is human IL2Ra (hIL2Ra) or a fragment thereof.

29. The fusion protein of claim 17, wherein the IL2 or fragment thereof comprises the amino acid sequence of SEQ ID NO: 53.

30. The fusion protein of claim 17, wherein the IL2Ra or fragment thereof comprises the amino acid sequence of SEQ ID NO: 51.

31. The fusion protein of claim 17, wherein the first and/or second linker comprises an amino acid sequence of one or more repeats of GGGGS (SEQ ID NO: 67).

32. The fusion protein of claim 17, wherein the first linker comprises an amino acid sequence of SEQ ID NO: 52, and the second linker comprises an amino acid sequence of SEQ ID NO: 50.

33. The fusion protein of claim 17, wherein the IL2 moiety comprises the amino acid sequence of SEQ ID NO: 54.

34. The fusion protein of claim 17, wherein the first polypeptide comprises the amino acid sequence of SEQ ID NO: 58, 60, or 62.

35. The fusion protein of claim 17, wherein the second polypeptide comprises the amino acid sequence of SEQ ID NO: 64, 63, or 65.

36. The fusion protein of claim 17, wherein the first polypeptide comprises the amino acid sequence of SEQ ID NO: 58 and the second polypeptide comprises the amino acid sequence of SEQ ID NO: 64.

37. The fusion protein of claim 17, wherein the first polypeptide comprises the amino acid sequence of SEQ ID NO: 60 and the second polypeptide comprises the amino acid sequence of SEQ ID NO: 63.

38. The fusion protein of claim 17, wherein the first polypeptide comprises the amino acid sequence of SEQ ID NO: 62 and the second polypeptide comprises the amino acid sequence of SEQ ID NO: 65.

39. The fusion protein of claim 1, wherein the fusion protein forms a dimeric fusion protein.

40. The fusion protein of claim 1, wherein the fusion protein dimerizes through their respective heavy chain constant regions.

41. The fusion protein of claim 1, wherein the fusion protein does not cross-compete with cemiplimab, pembrolizumab or nivolumab for binding to PD-1.

42. The fusion protein of claim 1, wherein the fusion protein exhibits one or more of: reduced activity in activating human IL2Rα/β/γ and IL2Rβ/γ complexes as compared to IL2; increased activity in activating human IL2Ra as compared to a non-targeted-IL2Ra-IL2; increased activity in stimulating T cells as measured by a level of IFN-γ release as compared to a wild-type human IL2; and attenuated binding to IL2Ra, IL2Rβ and IL2Rγ.

43. A pharmaceutical composition comprising the fusion protein of claim 1.

44. A pharmaceutical composition comprising the fusion protein of claim 17.

* * * * *

SEQUENCE LISTING

<160> NUMBER OF SEQ ID NOS: 75

<210> SEQ ID NO 1

<211> LENGTH: 363
<212> TYPE: DNA
<213> ORGANISM: Artificial
<220> FEATURE:
<223> OTHER INFORMATION: Synthetic

<400> SEQUENCE: 1
caggtgcagc tggtacagtc tgggactgag gtgaggaagc ctgggtcctc ggtgaaggtc      60
tcctgcaaga cttctggagt caccttcaac aattatgcca tcacctgggt gcgacaggcc     120
cctggacaag gcttgagtg gatgggagga atcatcccg tctttagtcc accaaactac       180
gcacagaaat ttcagggcag agtcacgatt accgcggacg agtccacgaa cacagcctac     240
atggagctga acagcctgag atctgatgac acggccatat atttctgtgc gagagagggg    300
gaacgtggat acacgtatgg ttatgactac tggggccagg gaaccctggt caccgtctcc    360
tca                                                                  363

<210> SEQ ID NO 2
<211> LENGTH: 121
<212> TYPE: PRT
<213> ORGANISM: Artificial
<220> FEATURE:
<223> OTHER INFORMATION: Synthetic

<400> SEQUENCE: 2

Gln Val Gln Leu Val Gln Ser Gly Thr Glu Val Arg Lys Pro Gly Ser
1               5                   10                  15

Ser Val Lys Val Ser Cys Lys Thr Ser Gly Val Thr Phe Asn Asn Tyr
            20                  25                  30

Ala Ile Thr Trp Val Arg Gln Ala Pro Gly Gln Gly Leu Glu Trp Met
        35                  40                  45

Gly Gly Ile Ile Pro Val Phe Ser Pro Pro Asn Tyr Ala Gln Lys Phe
    50                  55                  60

Gln Gly Arg Val Thr Ile Thr Ala Asp Glu Ser Thr Asn Thr Ala Tyr
65                  70                  75                  80

Met Glu Leu Asn Ser Leu Arg Ser Asp Asp Thr Ala Ile Tyr Phe Cys
                85                  90                  95

Ala Arg Glu Gly Glu Arg Gly Tyr Thr Tyr Gly Tyr Asp Tyr Trp Gly
            100                 105                 110

Gln Gly Thr Leu Val Thr Val Ser Ser
        115                 120

<210> SEQ ID NO 3
<211> LENGTH: 24
<212> TYPE: DNA
<213> ORGANISM: Artificial
<220> FEATURE:
<223> OTHER INFORMATION: Synthetic

<400> SEQUENCE: 3
ggagtcacct tcaacaatta tgcc                                            24

<210> SEQ ID NO 4
<211> LENGTH: 8
<212> TYPE: PRT
<213> ORGANISM: Artificial
<220> FEATURE:
<223> OTHER INFORMATION: Synthetic

<400> SEQUENCE: 4

Gly Val Thr Phe Asn Asn Tyr Ala

<210> SEQ ID NO 5
<211> LENGTH: 24
<212> TYPE: DNA
<213> ORGANISM: Artificial
<220> FEATURE:
<223> OTHER INFORMATION: Synthetic

<400> SEQUENCE: 5
atcatccccg tctttagtcc acca                                            24

<210> SEQ ID NO 6
<211> LENGTH: 8
<212> TYPE: PRT
<213> ORGANISM: Artificial
<220> FEATURE:
<223> OTHER INFORMATION: Synthetic

<400> SEQUENCE: 6

Ile Ile Pro Val Phe Ser Pro Pro
1               5

<210> SEQ ID NO 7
<211> LENGTH: 42
<212> TYPE: DNA
<213> ORGANISM: Artificial
<220> FEATURE:
<223> OTHER INFORMATION: Synthetic

<400> SEQUENCE: 7
gcgagagagg gggaacgtgg atacacgtat ggttatgact ac                        42

<210> SEQ ID NO 8
<211> LENGTH: 14
<212> TYPE: PRT
<213> ORGANISM: Artificial
<220> FEATURE:
<223> OTHER INFORMATION: Synthetic

<400> SEQUENCE: 8

Ala Arg Glu Gly Glu Arg Gly Tyr Thr Tyr Gly Tyr Asp Tyr
1               5                   10

<210> SEQ ID NO 9
<211> LENGTH: 324
<212> TYPE: DNA
<213> ORGANISM: Artificial
<220> FEATURE:
<223> OTHER INFORMATION: Synthetic

<400> SEQUENCE: 9
gacatccaga tgacccagtc tccatcctcc ctgtctgcat ctgtaggaga cagagtcacc     60
atcacttgcc gggcaagtca gagcattagc agctatttaa attggtatca gcagaaacca   120
gggaaagccc ctaagctcct gatctatgct gcatccagtt tgcaaagtgg ggtcccgtca   180
aggttcagtg gcagtggatc tgggacagat tcactctca ccatcagcag tctgcaacct   240
gaagattttg caacttacta ctgtcaacag agttacagta cccctccgat caccttcggc   300
caagggacac gactggagat taaa                                           324

<210> SEQ ID NO 10
<211> LENGTH: 108
<212> TYPE: PRT
<213> ORGANISM: Artificial

<220> FEATURE:
<223> OTHER INFORMATION: Synthetic

<400> SEQUENCE: 10

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Ser Ile Ser Ser Tyr
            20                  25                  30

Leu Asn Trp Tyr Gln Gln Lys Pro Gly Lys Ala Pro Lys Leu Leu Ile
        35                  40                  45

Tyr Ala Ala Ser Ser Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Ser Tyr Ser Thr Pro Pro
                85                  90                  95

Ile Thr Phe Gly Gln Gly Thr Arg Leu Glu Ile Lys
            100                 105

<210> SEQ ID NO 11
<211> LENGTH: 18
<212> TYPE: DNA
<213> ORGANISM: Artificial
<220> FEATURE:
<223> OTHER INFORMATION: Synthetic

<400> SEQUENCE: 11
cagagcatta gcagctat                                                    18

<210> SEQ ID NO 12
<211> LENGTH: 6
<212> TYPE: PRT
<213> ORGANISM: Artificial
<220> FEATURE:
<223> OTHER INFORMATION: Synthetic

<400> SEQUENCE: 12

Gln Ser Ile Ser Ser Tyr
1               5

<210> SEQ ID NO 13
<211> LENGTH: 9
<212> TYPE: DNA
<213> ORGANISM: Artificial
<220> FEATURE:
<223> OTHER INFORMATION: Synthetic

<400> SEQUENCE: 13 gctgcatcc                                                              9

<210> SEQ ID NO 14
<211> LENGTH: 3
<212> TYPE: PRT
<213> ORGANISM: Artificial
<220> FEATURE:
<223> OTHER INFORMATION: Synthetic

<400> SEQUENCE: 14

Ala Ala Ser
1

<210> SEQ ID NO 15
<211> LENGTH: 30

```
<212> TYPE: DNA
<213> ORGANISM: Artificial
<220> FEATURE:
<223> OTHER INFORMATION: Synthetic

<400> SEQUENCE: 15
caacagagtt acagtacccc tccgatcacc                                    30

<210> SEQ ID NO 16
<211> LENGTH: 10
<212> TYPE: PRT
<213> ORGANISM: Artificial
<220> FEATURE:
<223> OTHER INFORMATION: Synthetic

<400> SEQUENCE: 16

Gln Gln Ser Tyr Ser Thr Pro Pro Ile Thr
1               5                   10

<210> SEQ ID NO 17
<211> LENGTH: 1347
<212> TYPE: DNA
<213> ORGANISM: Artificial
<220> FEATURE:
<223> OTHER INFORMATION: Synthetic

<400> SEQUENCE: 17
caggtgcagc tggtacagtc tgggactgag gtgaggaagc ctgggtcctc ggtgaaggtc    60
tcctgcaaga cttctggagt caccttcaac aattatgcca tcacctgggt gcgacaggcc   120
cctggacaag gcttgagtg gatgggagga atcatccccg tctttagtcc accaaactac   180
gcacagaaat tcagggcag agtcacgatt accgcggacg agtccacgaa cacagcctac   240
atggagctga cagcctgag atctgatgac acggccatat atttctgtgc gagagagggg   300
gaacgtggat acacgtatgg ttatgactac tggggccagg gaaccctggt caccgtctcc   360
tcagcctcca ccaagggccc atcggtcttc cccctggcgc cctgctccag gagcacctcc   420
gagagcacag ccgccctggg ctgcctggtc aaggactact ccccgaaccc ggtgacggtg   480
tcgtggaact caggcgccct gaccagcggc gtgcacacct tcccggctgt cctacagtcc   540
tcaggactct actccctcag cagcgtggtg accgtgccct ccagcagctt gggcacgaag   600
acctacacct gcaacgtaga tcacaagccc agcaacacca aggtggacaa gagagttgag   660
tccaaatatg gtcccccatg cccaccctgc ccagcacctg agttcctggg ggaccatca    720 gtcttcctgt tccccccaaa acccaaggac actctcatga tctcccggac ccctgaggtc   780
acgtgcgtgg tggtggacgt gagccaggaa gaccccgagg tccagttcaa ctggtacgtg   840
gatggcgtgg aggtgcataa tgccaagaca aagccgcggg aggagcagtt caacagcacg   900
taccgtgtgg tcagcgtcct caccgtcctg caccaggact ggctgaacgg caaggagtac   960
aagtgcaagg tctccaacaa aggcctcccg tcctccatcg agaaaaccat ctccaaagcc  1020
aaagggcagc cccgagagcc acaggtgtac accctgcccc catcccagga ggagatgacc  1080
aagaaccagg tcagcctgac ctgcctggtc aaaggcttct accccagcga catcgccgtg  1140
gagtgggaga gcaatgggca gccggagaac aactacaaga ccacgcctcc cgtgctggac  1200
tccgacggct ccttcttcct ctacagcagg ctcaccgtgg acaagagcag gtggcaggag  1260
gggaatgtct tctcatgctc cgtgatgcat gaggctctgc acaaccacta cacacagaag  1320
tccctctccc tgtctctggg taaatga                                     1347
```

<210> SEQ ID NO 18
<211> LENGTH: 448
<212> TYPE: PRT
<213> ORGANISM: Artificial
<220> FEATURE:
<223> OTHER INFORMATION: Synthetic

<400> SEQUENCE: 18

```
Gln Val Gln Leu Val Gln Ser Gly Thr Glu Val Arg Lys Pro Gly Ser
1               5                   10                  15

Ser Val Lys Val Ser Cys Lys Thr Ser Gly Val Thr Phe Asn Asn Tyr
            20                  25                  30

Ala Ile Thr Trp Val Arg Gln Ala Pro Gly Gln Gly Leu Glu Trp Met
        35                  40                  45

Gly Gly Ile Ile Pro Val Phe Ser Pro Pro Asn Tyr Ala Gln Lys Phe
50                  55                  60

Gln Gly Arg Val Thr Ile Thr Ala Asp Glu Ser Thr Asn Thr Ala Tyr
65                  70                  75                  80

Met Glu Leu Asn Ser Leu Arg Ser Asp Asp Thr Ala Ile Tyr Phe Cys
                85                  90                  95

Ala Arg Glu Gly Glu Arg Gly Tyr Thr Tyr Gly Tyr Asp Tyr Trp Gly
            100                 105                 110

Gln Gly Thr Leu Val Thr Val Ser Ser Ala Ser Thr Lys Gly Pro Ser
        115                 120                 125

Val Phe Pro Leu Ala Pro Cys Ser Arg Ser Thr Ser Glu Ser Thr Ala
130                 135                 140

Ala Leu Gly Cys Leu Val Lys Asp Tyr Phe Pro Glu Pro Val Thr Val
145                 150                 155                 160

Ser Trp Asn Ser Gly Ala Leu Thr Ser Gly Val His Thr Phe Pro Ala
                165                 170                 175

Val Leu Gln Ser Ser Gly Leu Tyr Ser Leu Ser Ser Val Val Thr Val
            180                 185                 190

Pro Ser Ser Ser Leu Gly Thr Lys Thr Tyr Thr Cys Asn Val Asp His
        195                 200                 205

Lys Pro Ser Asn Thr Lys Val Asp Lys Arg Val Glu Ser Lys Tyr Gly
210                 215                 220

Pro Pro Cys Pro Pro Cys Pro Ala Pro Glu Phe Leu Gly Gly Pro Ser
225                 230                 235                 240

Val Phe Leu Phe Pro Pro Lys Pro Lys Asp Thr Leu Met Ile Ser Arg
                245                 250                 255

Thr Pro Glu Val Thr Cys Val Val Val Asp Val Ser Gln Glu Asp Pro
            260                 265                 270

Glu Val Gln Phe Asn Trp Tyr Val Asp Gly Val Glu Val His Asn Ala
        275                 280                 285

Lys Thr Lys Pro Arg Glu Glu Gln Phe Asn Ser Thr Tyr Arg Val Val
290                 295                 300

Ser Val Leu Thr Val Leu His Gln Asp Trp Leu Asn Gly Lys Glu Tyr
305                 310                 315                 320

Lys Cys Lys Val Ser Asn Lys Gly Leu Pro Ser Ser Ile Glu Lys Thr
                325                 330                 335

Ile Ser Lys Ala Lys Gly Gln Pro Arg Glu Pro Gln Val Tyr Thr Leu
            340                 345                 350

Pro Pro Ser Gln Glu Glu Met Thr Lys Asn Gln Val Ser Leu Thr Cys
        355                 360                 365

Leu Val Lys Gly Phe Tyr Pro Ser Asp Ile Ala Val Glu Trp Glu Ser
```

```
                 370                 375                 380
Asn Gly Gln Pro Glu Asn Asn Tyr Lys Thr Thr Pro Pro Val Leu Asp
385                 390                 395                 400

Ser Asp Gly Ser Phe Phe Leu Tyr Ser Arg Leu Thr Val Asp Lys Ser
                405                 410                 415

Arg Trp Gln Glu Gly Asn Val Phe Ser Cys Ser Val Met His Glu Ala
            420                 425                 430

Leu His Asn His Tyr Thr Gln Lys Ser Leu Ser Leu Ser Leu Gly Lys
        435                 440                 445
```

<210> SEQ ID NO 19
<211> LENGTH: 648
<212> TYPE: DNA
<213> ORGANISM: Artificial
<220> FEATURE:
<223> OTHER INFORMATION: Synthetic

<400> SEQUENCE: 19

```
gacatccaga tgacccagtc tccatcctcc ctgtctgcat ctgtaggaga cagagtcacc    60
atcacttgcc gggcaagtca gagcattagc agctatttaa attggtatca gcagaaacca   120
gggaaagccc ctaagctcct gatctatgct gcatccagtt tgcaaagtgg ggtcccgtca   180
aggttcagtg gcagtggatc tgggacagat ttcactctca ccatcagcag tctgcaacct   240
gaagattttg caacttacta ctgtcaacag agttacagta cccctccgat cacccttcggc  300 caagggacac gactggagat aaacgaact gtggctgcac catctgtctt catcttcccg    360
ccatctgatg agcagttgaa atctggaact gcctctgttg tgtgcctgct gaataacttc    420
tatcccagag aggccaaagt acagtggaag gtggataacg ccctccaatc gggtaactcc    480
caggagagtg tcacagagca ggacagcaag gacagcacct acagcctcag cagcaccctg   540
acgctgagca aagcagacta cgagaaacac aaagtctacg cctgcgaagt cacccatcag   600
ggcctgagct cgcccgtcac aaagagcttc aacaggggag agtgttag                648
```

<210> SEQ ID NO 20
<211> LENGTH: 215
<212> TYPE: PRT
<213> ORGANISM: Artificial
<220> FEATURE:
<223> OTHER INFORMATION: Synthetic

<400> SEQUENCE: 20

```
Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Ser Ile Ser Ser Tyr
            20                  25                  30

Leu Asn Trp Tyr Gln Gln Lys Pro Gly Lys Ala Pro Lys Leu Leu Ile
        35                  40                  45

Tyr Ala Ala Ser Ser Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Ser Tyr Ser Thr Pro Pro
                85                  90                  95

Ile Thr Phe Gly Gln Gly Thr Arg Leu Glu Ile Lys Arg Thr Val Ala
            100                 105                 110

Ala Pro Ser Val Phe Ile Phe Pro Pro Ser Asp Glu Gln Leu Lys Ser
        115                 120                 125
```

Gly Thr Ala Ser Val Val Cys Leu Leu Asn Asn Phe Tyr Pro Arg Glu
    130                 135                 140

Ala Lys Val Gln Trp Lys Val Asp Asn Ala Leu Gln Ser Gly Asn Ser
145                 150                 155                 160

Gln Glu Ser Val Thr Glu Gln Asp Ser Lys Asp Ser Thr Tyr Ser Leu
                165                 170                 175

Ser Ser Thr Leu Thr Leu Ser Lys Ala Asp Tyr Glu Lys His Lys Val
            180                 185                 190

Tyr Ala Cys Glu Val Thr His Gln Gly Leu Ser Ser Pro Val Thr Lys
        195                 200                 205

Ser Phe Asn Arg Gly Glu Cys
    210                 215

<210> SEQ ID NO 21
<211> LENGTH: 351
<212> TYPE: DNA
<213> ORGANISM: Artificial
<220> FEATURE:
<223> OTHER INFORMATION: Synthetic

<400> SEQUENCE: 21
gaggtgcagc tgttggagtc tgggggagtt ttggtacagc ctgggggggtc cctgagactc      60 tcctgtgcag cctctggatt cacctttagt aattttggca tgacgtgggt ccgccaggct     120
ccagggaagg gactggagtg gtctcaggt attagtggtg gcggtcgtga cacatacttc     180
gcagactccg tgaagggccg gttcaccatc tccagagaca attccaagaa tacgttgtat     240
ctacagatga acagcctgaa aggcgaggac acggccgtat attactgtgt gaagtgggga     300
aatatttact tgactactg gggccaggga accctggtca ccgtctcctc a               351

<210> SEQ ID NO 22
<211> LENGTH: 117
<212> TYPE: PRT
<213> ORGANISM: Artificial
<220> FEATURE:
<223> OTHER INFORMATION: Synthetic

<400> SEQUENCE: 22

Glu Val Gln Leu Leu Glu Ser Gly Gly Val Leu Val Gln Pro Gly Gly
1               5                   10                  15

Ser Leu Arg Leu Ser Cys Ala Ala Ser Gly Phe Thr Phe Ser Asn Phe
            20                  25                  30

Gly Met Thr Trp Val Arg Gln Ala Pro Gly Lys Gly Leu Glu Trp Val
        35                  40                  45

Ser Gly Ile Ser Gly Gly Gly Arg Asp Thr Tyr Phe Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Lys Gly Glu Asp Thr Ala Val Tyr Tyr Cys
                85                  90                  95

Val Lys Trp Gly Asn Ile Tyr Phe Asp Tyr Trp Gly Gln Gly Thr Leu
            100                 105                 110

Val Thr Val Ser Ser
        115

<210> SEQ ID NO 23
<211> LENGTH: 24
<212> TYPE: DNA

<213> ORGANISM: Artificial
<220> FEATURE:
<223> OTHER INFORMATION: Synthetic

<400> SEQUENCE: 23
ggattcacct ttagtaattt tggc                                        24

<210> SEQ ID NO 24
<211> LENGTH: 8
<212> TYPE: PRT
<213> ORGANISM: Artificial
<220> FEATURE:
<223> OTHER INFORMATION: Synthetic

<400> SEQUENCE: 24

Gly Phe Thr Phe Ser Asn Phe Gly
1               5

<210> SEQ ID NO 25
<211> LENGTH: 24
<212> TYPE: DNA
<213> ORGANISM: Artificial
<220> FEATURE:
<223> OTHER INFORMATION: Synthetic

<400> SEQUENCE: 25
attagtggtg gcggtcgtga caca                                        24

<210> SEQ ID NO 26
<211> LENGTH: 8
<212> TYPE: PRT
<213> ORGANISM: Artificial
<220> FEATURE:
<223> OTHER INFORMATION: Synthetic

<400> SEQUENCE: 26

Ile Ser Gly Gly Gly Arg Asp Thr
1               5

<210> SEQ ID NO 27
<211> LENGTH: 30
<212> TYPE: DNA
<213> ORGANISM: Artificial
<220> FEATURE:
<223> OTHER INFORMATION: Synthetic

<400> SEQUENCE: 27
gtgaagtggg gaaatattta ctttgactac                                  30

<210> SEQ ID NO 28
<211> LENGTH: 10
<212> TYPE: PRT
<213> ORGANISM: Artificial
<220> FEATURE:
<223> OTHER INFORMATION: Synthetic

<400> SEQUENCE: 28

Val Lys Trp Gly Asn Ile Tyr Phe Asp Tyr
1               5                   10

<210> SEQ ID NO 29
<211> LENGTH: 321
<212> TYPE: DNA
<213> ORGANISM: Artificial
<220> FEATURE:
<223> OTHER INFORMATION: Synthetic

<400> SEQUENCE: 29

```
gacatccaga tgacccagtc tccatcctcc ctgtctgcat ctgtcggaga cagcatcacc    60
atcacttgcc gggcgagtct gtccattaac accttttttaa attggtatca gcagaaacca   120
gggaaagccc ctaacctcct gatctatgct gcgtccagtt tacatggtgg ggtcccatca   180
aggttcagtg gcagcggctc tgggacagat ttcactctca ccatcagaac tcttcaacct   240
gaagattttg caacttacta ctgtcaacag agttccaata ccccattcac tttcggccct   300
gggaccgtag tggatttcag a                                             321
```

<210> SEQ ID NO 30
<211> LENGTH: 107
<212> TYPE: PRT
<213> ORGANISM: Artificial
<220> FEATURE:
<223> OTHER INFORMATION: Synthetic

<400> SEQUENCE: 30

```
Asp Ile Gln Met Thr Gln Ser Pro Ser Ser Leu Ser Ala Ser Val Gly
1               5                   10                  15
Asp Ser Ile Thr Ile Thr Cys Arg Ala Ser Leu Ser Ile Asn Thr Phe
            20                  25                  30
Leu Asn Trp Tyr Gln Gln Lys Pro Gly Lys Ala Pro Asn Leu Leu Ile
        35                  40                  45
Tyr Ala Ala Ser Ser Leu His Gly Gly Val Pro Ser Arg Phe Ser Gly
    50                  55                  60
Ser Gly Ser Gly Thr Asp Phe Thr Leu Thr Ile Arg Thr Leu Gln Pro
65                  70                  75                  80
Glu Asp Phe Ala Thr Tyr Tyr Cys Gln Gln Ser Ser Asn Thr Pro Phe
                85                  90                  95
Thr Phe Gly Pro Gly Thr Val Val Asp Phe Arg
            100                 105
```

<210> SEQ ID NO 31
<211> LENGTH: 18
<212> TYPE: DNA
<213> ORGANISM: Artificial
<220> FEATURE:
<223> OTHER INFORMATION: Synthetic

<400> SEQUENCE: 31

```
ctgtccatta acaccttt                                                  18
```

<210> SEQ ID NO 32
<211> LENGTH: 6
<212> TYPE: PRT
<213> ORGANISM: Artificial
<220> FEATURE:
<223> OTHER INFORMATION: Synthetic

<400> SEQUENCE: 32

```
Leu Ser Ile Asn Thr Phe
1               5
```

<210> SEQ ID NO 33
<211> LENGTH: 9
<212> TYPE: DNA
<213> ORGANISM: Artificial
<220> FEATURE:
<223> OTHER INFORMATION: Synthetic

<400> SEQUENCE: 33

-continued gctgcgtcc                                                          9

<210> SEQ ID NO 34
<211> LENGTH: 27
<212> TYPE: DNA
<213> ORGANISM: Artificial
<220> FEATURE:
<223> OTHER INFORMATION: Synthetic

<400> SEQUENCE: 34
caacagagtt ccaatacccc attcact                                     27

<210> SEQ ID NO 35
<211> LENGTH: 9
<212> TYPE: PRT
<213> ORGANISM: Artificial
<220> FEATURE:
<223> OTHER INFORMATION: Synthetic

<400> SEQUENCE: 35

Gln Gln Ser Ser Asn Thr Pro Phe Thr
1               5

<210> SEQ ID NO 36
<211> LENGTH: 1335
<212> TYPE: DNA
<213> ORGANISM: Artificial
<220> FEATURE:
<223> OTHER INFORMATION: Synthetic

<400> SEQUENCE: 36
gaggtgcagc tgttggagtc tgggggagtt ttggtacagc ctgggggggtc cctgagactc    60 tcctgtgcag cctctggatt cacctttagt aattttggca tgacgtgggt ccgccaggct   120
ccagggaagg gactggagtg gtctcaggt attagtggtg gcggtcgtga cacatacttc    180
gcagactccg tgaagggccg gttcaccatc tccagagaca attccaagaa tacgttgtat   240
ctacagatga acagcctgaa aggcgaggac acggccgtat attactgtgt gaagtgggga   300
aatatttact ttgactactg gggccaggga accctggtca ccgtctcctc agcctccacc   360
aagggcccat cggtcttccc cctggcgccc tgctccagga gcacctccga gagcacagcc   420
gccctgggct gcctggtcaa ggactacttc cccgaaccgg tgacggtgtc gtggaactca   480
ggcgccctga ccagcggcgt gcacaccttc ccggctgtcc tacagtcctc aggactctac   540
tccctcagca gcgtggtgac cgtgccctcc agcagcttgg gcacgaagac ctacacctgc   600
aacgtagatc acaagcccag caacaccaag gtggacaaga gagttgagtc caaatatggt   660
cccccatgcc caccctgccc agcacctgag ttcctggggg gaccatcagt cttcctgttc   720
cccccaaaac ccaaggacac tctcatgatc tcccggaccc ctgaggtcac gtgcgtggtg   780
gtggacgtga gccaggaaga ccccgaggtc cagttcaact ggtacgtgga tggcgtggag   840
gtgcataatg ccaagacaaa gccgcgggag gagcagttca acagcacgta ccgtgtggtc   900
agcgtcctca ccgtcctgca ccaggactgg ctgaacggca aggagtacaa gtgcaaggtc   960
tccaacaaag gcctcccgtc ctccatcgag aaaaccatct ccaaagccaa agggcagccc  1020
cgagagccac aggtgtacac cctgccccca tcccaggagg agatgaccaa gaaccaggtc  1080
agcctgacct gcctggtcaa aggcttctac cccagcgaca tcgccgtgga gtgggagagc  1140
aatgggcagc cggagaacaa ctacaagacc acgcctcccg tgctggactc cgacggctcc  1200
ttcttcctct acagcaggct caccgtggac aagagcaggt ggcaggaggg gaatgtcttc  1260

```
tcatgctccg tgatgcatga ggctctgcac aaccactaca cacagaagtc cctctccctg    1320
tctctgggta aatga                                                      1335
```

<210> SEQ ID NO 37
<211> LENGTH: 444
<212> TYPE: PRT
<213> ORGANISM: Artificial
<220> FEATURE:
<223> OTHER INFORMATION: Synthetic

<400> SEQUENCE: 37

```
Glu Val Gln Leu Leu Glu Ser Gly Gly Val Leu Val Gln Pro Gly Gly
1               5                   10                  15

Ser Leu Arg Leu Ser Cys Ala Ala Ser Gly Phe Thr Phe Ser Asn Phe
            20                  25                  30

Gly Met Thr Trp Val Arg Gln Ala Pro Gly Lys Gly Leu Glu Trp Val
        35                  40                  45

Ser Gly Ile Ser Gly Gly Gly Arg Asp Thr Tyr Phe Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Lys Gly Glu Asp Thr Ala Val Tyr Tyr Cys
                85                  90                  95

Val Lys Trp Gly Asn Ile Tyr Phe Asp Tyr Trp Gly Gln Gly Thr Leu
            100                 105                 110

Val Thr Val Ser Ser Ala Ser Thr Lys Gly Pro Ser Val Phe Pro Leu
        115                 120                 125

Ala Pro Cys Ser Arg Ser Thr Ser Glu Ser Thr Ala Ala Leu Gly Cys
    130                 135                 140

Leu Val Lys Asp Tyr Phe Pro Glu Pro Val Thr Val Ser Trp Asn Ser
145                 150                 155                 160

Gly Ala Leu Thr Ser Gly Val His Thr Phe Pro Ala Val Leu Gln Ser
                165                 170                 175

Ser Gly Leu Tyr Ser Leu Ser Ser Val Val Thr Val Pro Ser Ser Ser
            180                 185                 190

Leu Gly Thr Lys Thr Tyr Thr Cys Asn Val Asp His Lys Pro Ser Asn
        195                 200                 205

Thr Lys Val Asp Lys Arg Val Glu Ser Lys Tyr Gly Pro Pro Cys Pro
    210                 215                 220

Pro Cys Pro Ala Pro Glu Phe Leu Gly Gly Pro Ser Val Phe Leu Phe
225                 230                 235                 240

Pro Pro Lys Pro Lys Asp Thr Leu Met Ile Ser Arg Thr Pro Glu Val
                245                 250                 255

Thr Cys Val Val Val Asp Val Ser Gln Glu Asp Pro Glu Val Gln Phe
            260                 265                 270

Asn Trp Tyr Val Asp Gly Val Glu Val His Asn Ala Lys Thr Lys Pro
        275                 280                 285

Arg Glu Glu Gln Phe Asn Ser Thr Tyr Arg Val Val Ser Val Leu Thr
    290                 295                 300

Val Leu His Gln Asp Trp Leu Asn Gly Lys Glu Tyr Lys Cys Lys Val
305                 310                 315                 320

Ser Asn Lys Gly Leu Pro Ser Ser Ile Glu Lys Thr Ile Ser Lys Ala
                325                 330                 335

Lys Gly Gln Pro Arg Glu Pro Gln Val Tyr Thr Leu Pro Pro Ser Gln
```

Glu Glu Met Thr Lys Asn Gln Val Ser Leu Thr Cys Leu Val Lys Gly
             340                 345                 350
                355                 360                 365

Phe Tyr Pro Ser Asp Ile Ala Val Glu Trp Glu Ser Asn Gly Gln Pro
        370                 375                 380

Glu Asn Asn Tyr Lys Thr Thr Pro Pro Val Leu Asp Ser Asp Gly Ser
385                 390                 395                 400

Phe Phe Leu Tyr Ser Arg Leu Thr Val Asp Lys Ser Arg Trp Gln Glu
            405                 410                 415

Gly Asn Val Phe Ser Cys Ser Val Met His Glu Ala Leu His Asn His
                420                 425                 430

Tyr Thr Gln Lys Ser Leu Ser Leu Ser Leu Gly Lys
            435                 440

<210> SEQ ID NO 38
<211> LENGTH: 645
<212> TYPE: DNA
<213> ORGANISM: Artificial
<220> FEATURE:
<223> OTHER INFORMATION: Synthetic

<400> SEQUENCE: 38
gacatccaga tgacccagtc tccatcctcc ctgtctgcat ctgtcggaga cagcatcacc    60
atcacttgcc gggcgagtct gtccattaac acctttttaa attggtatca gcagaaacca   120
gggaaagccc ctaacctcct gatctatgct gcgtccagtt tacatggtgg ggtcccatca   180
aggttcagtg gcagcggctc tgggacagat ttcactctca ccatcagaac tcttcaacct   240
gaagattttg caacttacta ctgtcaacag agttccaata ccccattcac tttcggccct   300
gggaccgtag tggatttcag acgaactgtg gctgcaccat ctgtcttcat cttcccgcca   360
tctgatgagc agttgaaatc tggaactgcc tctgttgtgt gcctgctgaa taacttctat   420
cccagagagg ccaaagtaca gtggaaggtg gataacgccc tccaatcggg taactcccag   480
gagagtgtca cagagcagga cagcaaggac agcacctaca gcctcagcag caccctgacg   540
ctgagcaaag cagactacga aaacacaaa gtctacgcct gcgaagtcac ccatcagggc    600
ctgagctcgc ccgtcacaaa gagcttcaac aggggagagt gttag                  645

<210> SEQ ID NO 39
<211> LENGTH: 214
<212> TYPE: PRT
<213> ORGANISM: Artificial
<220> FEATURE:
<223> OTHER INFORMATION: Synthetic

<400> SEQUENCE: 39

Asp Ile Gln Met Thr Gln Ser Pro Ser Ser Leu Ser Ala Ser Val Gly
1               5                   10                  15

Asp Ser Ile Thr Ile Thr Cys Arg Ala Ser Leu Ser Ile Asn Thr Phe
            20                  25                  30

Leu Asn Trp Tyr Gln Gln Lys Pro Gly Lys Ala Pro Asn Leu Leu Ile
        35                  40                  45

Tyr Ala Ala Ser Ser Leu His Gly Gly Val Pro Ser Arg Phe Ser Gly
    50                  55                  60

Ser Gly Ser Gly Thr Asp Phe Thr Leu Thr Ile Arg Thr Leu Gln Pro
65                  70                  75                  80

Glu Asp Phe Ala Thr Tyr Tyr Cys Gln Gln Ser Ser Asn Thr Pro Phe
                85                  90                  95

Thr Phe Gly Pro Gly Thr Val Val Asp Phe Arg Arg Thr Val Ala Ala
            100                 105                 110

Pro Ser Val Phe Ile Phe Pro Ser Asp Glu Gln Leu Lys Ser Gly
            115                 120                 125

Thr Ala Ser Val Val Cys Leu Leu Asn Asn Phe Tyr Pro Arg Glu Ala
            130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
                180                 185                 190

Ala Cys Glu Val Thr His Gln Gly Leu Ser Ser Pro Val Thr Lys Ser
            195                 200                 205

Phe Asn Arg Gly Glu Cys
    210

<210> SEQ ID NO 40
<211> LENGTH: 363
<212> TYPE: DNA
<213> ORGANISM: Artificial
<220> FEATURE:
<223> OTHER INFORMATION: Synthetic

<400> SEQUENCE: 40
caggtgcagc tggtgcagtc tggggctgag gtgaagaggc ctgggtcctc ggtgaaggtc      60
tcctgcaagg tatctggagt caccttcagg aattttgcta tcatctgggt gcgacaggcc     120
cctggacaag gcttgagtg gatgggagga atcatcccctt tctttagtgc agcaaattac     180
gcacagagct tccagggcag agtcacgatt accccggacg aatccacgag cacagccttc     240
atggagctgg ccagtctgag atctgaggac acggccgttt attattgtgc gagagagggg     300
gaacgtggac acacctatgg gtttgactac tggggccagg gaaccctggt caccgtctcc     360
tca                                                                   363

<210> SEQ ID NO 41
<211> LENGTH: 121
<212> TYPE: PRT
<213> ORGANISM: Artificial
<220> FEATURE:
<223> OTHER INFORMATION: Synthetic

<400> SEQUENCE: 41

Gln Val Gln Leu Val Gln Ser Gly Ala Glu Val Lys Arg Pro Gly Ser
1               5                   10                  15

Ser Val Lys Val Ser Cys Lys Val Ser Gly Val Thr Phe Arg Asn Phe
            20                  25                  30

Ala Ile Ile Trp Val Arg Gln Ala Pro Gly Gln Gly Leu Glu Trp Met
        35                  40                  45

Gly Gly Ile Ile Pro Phe Phe Ser Ala Ala Asn Tyr Ala Gln Ser Phe
    50                  55                  60

Gln Gly Arg Val Thr Ile Thr Pro Asp Glu Ser Thr Ser Thr Ala Phe
65                  70                  75                  80

Met Glu Leu Ala Ser Leu Arg Ser Glu Asp Thr Ala Val Tyr Tyr Cys
                85                  90                  95

Ala Arg Glu Gly Glu Arg Gly His Thr Tyr Gly Phe Asp Tyr Trp Gly
            100                 105                 110

Gln Gly Thr Leu Val Thr Val Ser Ser
        115                 120

<210> SEQ ID NO 42
<211> LENGTH: 24
<212> TYPE: DNA
<213> ORGANISM: Artificial
<220> FEATURE:
<223> OTHER INFORMATION: Synthetic

<400> SEQUENCE: 42
ggagtcacct tcaggaattt tgct                                          24

<210> SEQ ID NO 43
<211> LENGTH: 8
<212> TYPE: PRT
<213> ORGANISM: Artificial
<220> FEATURE:
<223> OTHER INFORMATION: Synthetic

<400> SEQUENCE: 43

Gly Val Thr Phe Arg Asn Phe Ala
1               5

<210> SEQ ID NO 44
<211> LENGTH: 24
<212> TYPE: DNA
<213> ORGANISM: Artificial
<220> FEATURE:
<223> OTHER INFORMATION: Synthetic

<400> SEQUENCE: 44
atcatcccTT tctttagtgc agca                                          24

<210> SEQ ID NO 45
<211> LENGTH: 8
<212> TYPE: PRT
<213> ORGANISM: Artificial
<220> FEATURE:
<223> OTHER INFORMATION: Synthetic

<400> SEQUENCE: 45

Ile Ile Pro Phe Phe Ser Ala Ala
1               5

<210> SEQ ID NO 46
<211> LENGTH: 42
<212> TYPE: DNA
<213> ORGANISM: Artificial
<220> FEATURE:
<223> OTHER INFORMATION: Synthetic

<400> SEQUENCE: 46
gcgagagagg gggaacgtgg acacacctat gggtttgact ac                      42

<210> SEQ ID NO 47
<211> LENGTH: 14
<212> TYPE: PRT
<213> ORGANISM: Artificial
<220> FEATURE:
<223> OTHER INFORMATION: Synthetic

<400> SEQUENCE: 47

Ala Arg Glu Gly Glu Arg Gly His Thr Tyr Gly Phe Asp Tyr
1               5                   10

<210> SEQ ID NO 48
<211> LENGTH: 1347
<212> TYPE: DNA
<213> ORGANISM: Artificial
<220> FEATURE:
<223> OTHER INFORMATION: Synthetic

<400> SEQUENCE: 48

```
caggtgcagc tggtgcagtc tggggctgag gtgaagaggc ctgggtcctc ggtgaaggtc    60
tcctgcaagg tatctggagt caccttcagg aattttgcta tcatctgggt gcgacaggcc   120
cctggacaag gcttgagtg gatgggagga atcatcccct tctttagtgc agcaaattac   180
gcacagagct tccagggcag agtcacgatt accccggacg aatccacgag cacagccttc   240
atggagctgg ccagtctgag atctgaggac acggccgttt attattgtgc gagagagggg   300
gaacgtggac acacctatgg gtttgactac tggggccagg gaaccctggt caccgtctcc   360
tcagcctcca ccaagggccc atcggtcttc ccctggcgc cctgctccag gagcacctcc   420
gagagcacag ccgccctggg ctgcctggtc aaggactact ccccgaacc ggtgacggtg   480
tcgtggaact caggcgccct gaccagcggc gtgcacacct tccggctgt cctacagtcc   540
tcaggactct actccctcag cagcgtggtg accgtgcctc cagcagctt gggcacgaag   600
acctacacct gcaacgtaga tcacaagccc agcaacacca aggtggacaa gagagttgag   660
tccaaatatg gtccccatg cccacccctgc ccagcacctg agttcctggg gggaccatca   720
gtcttcctgt tcccccaaa acccaaggac actctcatga tctcccggac ccctgaggtc   780
acgtgcgtgg tggtggacgt gagccaggaa gaccccgagg tccagttcaa ctggtacgtg   840
gatggcgtgg aggtgcataa tgccaagaca aagccgcggg aggagcagtt caacagcacg   900
taccgtgtgg tcagcgtcct caccgtcctg caccaggact ggctgaacgg caaggagtac   960
aagtgcaagg tctccaacaa aggcctcccg tcctccatcg agaaaaccat ctccaaagcc  1020
aaagggcagc cccgagagcc acaggtgtac accctgcccc catcccagga ggagatgacc  1080
aagaaccagg tcagcctgac ctgcctggtc aaaggcttct accccagcga catcgccgtg  1140
gagtgggaga gcaatgggca gccggagaac aactacaaga ccacgcctcc cgtgctggac  1200
tccgacggct ccttcttcct ctacagcagg ctcaccgtgg acaagagcag gtggcaggag  1260
gggaatgtct tctcatgctc cgtgatgcat gaggctctgc acaaccacta cacacagaag  1320
tccctctccc tgtctctggg taaatga                                      1347
```

<210> SEQ ID NO 49
<211> LENGTH: 448
<212> TYPE: PRT
<213> ORGANISM: Artificial
<220> FEATURE:
<223> OTHER INFORMATION: Synthetic

<400> SEQUENCE: 49

Gln Val Gln Leu Val Gln Ser Gly Ala Glu Val Lys Arg Pro Gly Ser
1               5                   10                  15

Ser Val Lys Val Ser Cys Lys Val Ser Gly Val Thr Phe Arg Asn Phe
            20                  25                  30

Ala Ile Ile Trp Val Arg Gln Ala Pro Gly Gln Gly Leu Glu Trp Met
        35                  40                  45

Gly Gly Ile Ile Pro Phe Phe Ser Ala Ala Asn Tyr Ala Gln Ser Phe
    50                  55                  60

Gln Gly Arg Val Thr Ile Thr Pro Asp Glu Ser Thr Ser Thr Ala Phe

```
            65                  70                  75                  80
        Met Glu Leu Ala Ser Leu Arg Ser Glu Asp Thr Ala Val Tyr Tyr Cys
                            85                  90                  95

Ala Arg Glu Gly Glu Arg Gly His Thr Tyr Gly Phe Asp Tyr Trp Gly
                           100                 105                 110

Gln Gly Thr Leu Val Thr Val Ser Ala Ser Thr Lys Gly Pro Ser
                           115                 120                 125

Val Phe Pro Leu Ala Pro Cys Ser Arg Ser Thr Ser Glu Ser Thr Ala
        130                 135                 140

Ala Leu Gly Cys Leu Val Lys Asp Tyr Phe Pro Glu Pro Val Thr Val
        145                 150                 155                 160

Ser Trp Asn Ser Gly Ala Leu Thr Ser Gly Val His Thr Phe Pro Ala
                           165                 170                 175

Val Leu Gln Ser Ser Gly Leu Tyr Ser Leu Ser Ser Val Thr Val
                           180                 185                 190

Pro Ser Ser Ser Leu Gly Thr Lys Thr Tyr Thr Cys Asn Val Asp His
                           195                 200                 205

Lys Pro Ser Asn Thr Lys Val Asp Lys Arg Val Glu Ser Lys Tyr Gly
                           210                 215                 220

Pro Pro Cys Pro Pro Cys Pro Ala Pro Glu Phe Leu Gly Gly Pro Ser
        225                 230                 235                 240

Val Phe Leu Phe Pro Pro Lys Pro Lys Asp Thr Leu Met Ile Ser Arg
                           245                 250                 255

Thr Pro Glu Val Thr Cys Val Val Val Asp Val Ser Gln Glu Asp Pro
                           260                 265                 270

Glu Val Gln Phe Asn Trp Tyr Val Asp Gly Val Glu Val His Asn Ala
                           275                 280                 285

Lys Thr Lys Pro Arg Glu Glu Gln Phe Asn Ser Thr Tyr Arg Val Val
                           290                 295                 300

Ser Val Leu Thr Val Leu His Gln Asp Trp Leu Asn Gly Lys Glu Tyr
        305                 310                 315                 320

Lys Cys Lys Val Ser Asn Lys Gly Leu Pro Ser Ser Ile Glu Lys Thr
                           325                 330                 335

Ile Ser Lys Ala Lys Gly Gln Pro Arg Glu Pro Gln Val Tyr Thr Leu
                           340                 345                 350

Pro Pro Ser Gln Glu Glu Met Thr Lys Asn Gln Val Ser Leu Thr Cys
                           355                 360                 365

Leu Val Lys Gly Phe Tyr Pro Ser Asp Ile Ala Val Glu Trp Glu Ser
        370                 375                 380

Asn Gly Gln Pro Glu Asn Asn Tyr Lys Thr Thr Pro Pro Val Leu Asp
        385                 390                 395                 400

Ser Asp Gly Ser Phe Phe Leu Tyr Ser Arg Leu Thr Val Asp Lys Ser
                           405                 410                 415

Arg Trp Gln Glu Gly Asn Val Phe Ser Cys Ser Val Met His Glu Ala
                           420                 425                 430

Leu His Asn His Tyr Thr Gln Lys Ser Leu Ser Leu Ser Leu Gly Lys
                           435                 440                 445

<210> SEQ ID NO 50
<211> LENGTH: 15
<212> TYPE: PRT
<213> ORGANISM: Artificial
<220> FEATURE:
<223> OTHER INFORMATION: Synthetic
```

```
<400> SEQUENCE: 50

Gly Gly Gly Gly Ser Gly Gly Gly Ser Gly Gly Gly Gly Ser
1               5                   10                  15

<210> SEQ ID NO 51
<211> LENGTH: 165
<212> TYPE: PRT
<213> ORGANISM: Artificial
<220> FEATURE:
<223> OTHER INFORMATION: Synthetic

<400> SEQUENCE: 51

Glu Leu Cys Asp Asp Pro Pro Glu Ile Pro His Ala Thr Phe Lys
1               5                   10                  15

Ala Met Ala Tyr Lys Glu Gly Thr Met Leu Asn Cys Glu Cys Lys Arg
                20                  25                  30

Gly Phe Arg Arg Ile Lys Ser Gly Ser Leu Tyr Met Leu Cys Thr Gly
            35                  40                  45

Asn Ser Ser His Ser Ser Trp Asp Asn Gln Cys Gln Cys Thr Ser Ser
        50                  55                  60

Ala Thr Arg Asn Thr Thr Lys Gln Val Thr Pro Gln Pro Glu Glu Gln
65                  70                  75                  80

Lys Glu Arg Lys Thr Thr Glu Met Gln Ser Pro Met Gln Pro Val Asp
                85                  90                  95

Gln Ala Ser Leu Pro Gly His Cys Arg Glu Pro Pro Trp Glu Asn
                100                 105                 110

Glu Ala Thr Glu Arg Ile Tyr His Phe Val Val Gly Gln Met Val Tyr
            115                 120                 125

Tyr Gln Cys Val Gln Gly Tyr Arg Ala Leu His Arg Gly Pro Ala Glu
        130                 135                 140

Ser Val Cys Lys Met Thr His Gly Lys Thr Arg Trp Thr Gln Pro Gln
145                 150                 155                 160

Leu Ile Cys Thr Gly
                165

<210> SEQ ID NO 52
<211> LENGTH: 25
<212> TYPE: PRT
<213> ORGANISM: Artificial
<220> FEATURE:
<223> OTHER INFORMATION: Synthetic

<400> SEQUENCE: 52

Gly Gly Gly Gly Ser Gly Gly Gly Ser Gly Gly Gly Ser Gly
1               5                   10                  15

Gly Gly Ser Gly Gly Gly Ser
            20                  25

<210> SEQ ID NO 53
<211> LENGTH: 133
<212> TYPE: PRT
<213> ORGANISM: Artificial
<220> FEATURE:
<223> OTHER INFORMATION: Synthetic

<400> SEQUENCE: 53

Ala Pro Thr Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
                20                  25                  30
```

```
Asn Pro Lys Leu Thr Arg Met Leu Thr Phe Lys Phe Tyr Met Pro Lys
         35                  40                  45

Lys Ala Thr Glu Leu Lys His Leu Gln Cys Leu Glu Glu Glu Leu Lys
 50                  55                  60

Pro Leu Glu Glu Val Leu Asn Leu Ala Gln Ser Lys Asn Phe His Leu
 65                  70                  75                  80

Arg Pro Arg Asp Leu Ile Ser Asn Ile Asn Val Ile Val Leu Glu Leu
             85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Cys Gln Ser Ile
            115                 120                 125

Ile Ser Thr Leu Thr
            130

<210> SEQ ID NO 54
<211> LENGTH: 323
<212> TYPE: PRT
<213> ORGANISM: Artificial
<220> FEATURE:
<223> OTHER INFORMATION: Synthetic

<400> SEQUENCE: 54

Glu Leu Cys Asp Asp Pro Pro Glu Ile Pro His Ala Thr Phe Lys
 1               5                  10                  15

Ala Met Ala Tyr Lys Glu Gly Thr Met Leu Asn Cys Glu Cys Lys Arg
             20                  25                  30

Gly Phe Arg Arg Ile Lys Ser Gly Ser Leu Tyr Met Leu Cys Thr Gly
             35                  40                  45

Asn Ser Ser His Ser Ser Trp Asp Asn Gln Cys Gln Cys Thr Ser Ser
 50                  55                  60

Ala Thr Arg Asn Thr Thr Lys Gln Val Thr Pro Gln Pro Glu Glu Gln
 65                  70                  75                  80

Lys Glu Arg Lys Thr Thr Glu Met Gln Ser Pro Met Gln Pro Val Asp
             85                  90                  95

Gln Ala Ser Leu Pro Gly His Cys Arg Glu Pro Pro Trp Glu Asn
            100                 105                 110

Glu Ala Thr Glu Arg Ile Tyr His Phe Val Val Gly Gln Met Val Tyr
            115                 120                 125

Tyr Gln Cys Val Gln Gly Tyr Arg Ala Leu His Arg Gly Pro Ala Glu
            130                 135                 140

Ser Val Cys Lys Met Thr His Gly Lys Thr Arg Trp Thr Gln Pro Gln
145                 150                 155                 160

Leu Ile Cys Thr Gly Gly Gly Gly Gly Ser Gly Gly Gly Gly Ser Gly
            165                 170                 175

Gly Gly Gly Ser Gly Gly Gly Gly Ser Gly Gly Gly Gly Ser Ala Pro
            180                 185                 190

Thr Ser Ser Ser Thr Lys Lys Thr Gln Leu Gln Leu Glu His Leu Leu
            195                 200                 205

Leu Asp Leu Gln Met Ile Leu Asn Gly Ile Asn Asn Tyr Lys Asn Pro
            210                 215                 220

Lys Leu Thr Arg Met Leu Thr Phe Lys Phe Tyr Met Pro Lys Lys Ala
225                 230                 235                 240

Thr Glu Leu Lys His Leu Gln Cys Leu Glu Glu Glu Leu Lys Pro Leu
            245                 250                 255
```

```
Glu Val Leu Asn Leu Ala Gln Ser Lys Asn Phe His Leu Arg Pro
    260                 265                 270

Arg Asp Leu Ile Ser Asn Ile Asn Val Ile Val Leu Glu Leu Lys Gly
        275                 280                 285

Ser Glu Thr Thr Phe Met Cys Glu Tyr Ala Asp Glu Thr Ala Thr Ile
    290                 295                 300

Val Glu Phe Leu Asn Arg Trp Ile Thr Phe Cys Gln Ser Ile Ile Ser
305                 310                 315                 320

Thr Leu Thr

<210> SEQ ID NO 55
<211> LENGTH: 326
<212> TYPE: PRT
<213> ORGANISM: Artificial
<220> FEATURE:
<223> OTHER INFORMATION: Synthetic

<400> SEQUENCE: 55

Ala Ser Thr Lys Gly Pro Ser Val Phe Pro Leu Ala Pro Cys Ser Arg
1               5                   10                  15

Ser Thr Ser Glu Ser Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Lys Thr
65                  70                  75                  80

Tyr Thr Cys Asn Val Asp His Lys Pro Ser Asn Thr Lys Val Asp Lys
                85                  90                  95

Arg Val Glu Ser Lys Tyr Gly Pro Pro Cys Pro Pro Cys Pro Ala Pro
            100                 105                 110

Pro Val Ala Gly Pro Ser Val Phe Leu Phe Pro Pro Lys Pro Lys Asp
        115                 120                 125

Thr Leu Met Ile Ser Arg Thr Pro Glu Val Thr Cys Val Val Val Asp
    130                 135                 140

Val Ser Gln Glu Asp Pro Glu Val Gln Phe Asn Trp Tyr Val Asp Gly
145                 150                 155                 160

Val Glu Val His Asn Ala Lys Thr Lys Pro Arg Glu Glu Gln Phe Asn
                165                 170                 175

Ser Thr Tyr Arg Val Val Ser Val Leu Thr Val Leu His Gln Asp Trp
            180                 185                 190

Leu Asn Gly Lys Glu Tyr Lys Cys Lys Val Ser Asn Lys Gly Leu Pro
        195                 200                 205

Ser Ser Ile Glu Lys Thr Ile Ser Lys Ala Lys Gly Gln Pro Arg Glu
    210                 215                 220

Pro Gln Val Tyr Thr Leu Pro Pro Ser Gln Glu Met Thr Lys Asn
225                 230                 235                 240

Gln Val Ser Leu Thr Cys Leu Val Lys Gly Phe Tyr Pro Ser Asp Ile
                245                 250                 255

Ala Val Glu Trp Glu Ser Asn Gly Gln Pro Glu Asn Asn Tyr Lys Thr
            260                 265                 270

Thr Pro Pro Val Leu Asp Ser Asp Gly Ser Phe Phe Leu Tyr Ser Arg
        275                 280                 285
```

```
Leu Thr Val Asp Lys Ser Arg Trp Gln Glu Gly Asn Val Phe Ser Cys
    290                 295                 300

Ser Val Met His Glu Ala Leu His Asn His Tyr Thr Gln Lys Ser Leu
305                 310                 315                 320

Ser Leu Ser Leu Gly Lys
                325

<210> SEQ ID NO 56
<211> LENGTH: 107
<212> TYPE: PRT
<213> ORGANISM: Artificial
<220> FEATURE:
<223> OTHER INFORMATION: Synthetic

<400> SEQUENCE: 56

Arg Thr Val Ala Ala Pro Ser Val Phe Ile Phe Pro Pro Ser Asp Glu
1               5                   10                  15

Gln Leu Lys Ser Gly Thr Ala Ser Val Val Cys Leu Leu Asn Asn Phe
            20                  25                  30

Tyr Pro Arg Glu Ala Lys Val Gln Trp Lys Val Asp Asn Ala Leu Gln
        35                  40                  45

Ser Gly Asn Ser Gln Glu Ser Val Thr Glu Gln Asp Ser Lys Asp Ser
    50                  55                  60

Thr Tyr Ser Leu Ser Ser Thr Leu Thr Leu Ser Lys Ala Asp Tyr Glu
65                  70                  75                  80

Lys His Lys Val Tyr Ala Cys Glu Val Thr His Gln Gly Leu Ser Ser
                85                  90                  95

Pro Val Thr Lys Ser Phe Asn Arg Gly Glu Cys
            100                 105

<210> SEQ ID NO 57
<211> LENGTH: 447
<212> TYPE: PRT
<213> ORGANISM: Artificial
<220> FEATURE:
<223> OTHER INFORMATION: Synthetic

<400> SEQUENCE: 57

Gln Val Gln Leu Val Gln Ser Gly Thr Glu Val Arg Lys Pro Gly Ser
1               5                   10                  15

Ser Val Lys Val Ser Cys Lys Thr Ser Gly Val Thr Phe Asn Asn Tyr
            20                  25                  30

Ala Ile Thr Trp Val Arg Gln Ala Pro Gly Gln Gly Leu Glu Trp Met
        35                  40                  45

Gly Gly Ile Ile Pro Val Phe Ser Pro Pro Asn Tyr Ala Gln Lys Phe
    50                  55                  60

Gln Gly Arg Val Thr Ile Thr Ala Asp Glu Ser Thr Asn Thr Ala Tyr
65                  70                  75                  80

Met Glu Leu Asn Ser Leu Arg Ser Asp Asp Thr Ala Ile Tyr Phe Cys
                85                  90                  95

Ala Arg Glu Gly Glu Arg Gly Tyr Thr Tyr Gly Tyr Asp Tyr Trp Gly
            100                 105                 110

Gln Gly Thr Leu Val Thr Val Ser Ser Ala Ser Thr Lys Gly Pro Ser
        115                 120                 125

Val Phe Pro Leu Ala Pro Cys Ser Arg Ser Thr Ser Glu Ser Thr Ala
    130                 135                 140

Ala Leu Gly Cys Leu Val Lys Asp Tyr Phe Pro Glu Pro Val Thr Val
145                 150                 155                 160
```

Ser Trp Asn Ser Gly Ala Leu Thr Ser Gly Val His Thr Phe Pro Ala
            165                 170                 175

Val Leu Gln Ser Ser Gly Leu Tyr Ser Leu Ser Ser Val Val Thr Val
            180                 185                 190

Pro Ser Ser Ser Leu Gly Thr Lys Thr Tyr Thr Cys Asn Val Asp His
            195                 200                 205

Lys Pro Ser Asn Thr Lys Val Asp Lys Arg Val Glu Ser Lys Tyr Gly
210                 215                 220

Pro Pro Cys Pro Pro Cys Pro Ala Pro Val Ala Gly Pro Ser Val
225                 230                 235                 240

Phe Leu Phe Pro Pro Lys Pro Lys Asp Thr Leu Met Ile Ser Arg Thr
            245                 250                 255

Pro Glu Val Thr Cys Val Val Val Asp Val Ser Gln Glu Asp Pro Glu
            260                 265                 270

Val Gln Phe Asn Trp Tyr Val Asp Gly Val Glu Val His Asn Ala Lys
            275                 280                 285

Thr Lys Pro Arg Glu Glu Gln Phe Asn Ser Thr Tyr Arg Val Val Ser
290                 295                 300

Val Leu Thr Val Leu His Gln Asp Trp Leu Asn Gly Lys Glu Tyr Lys
305                 310                 315                 320

Cys Lys Val Ser Asn Lys Gly Leu Pro Ser Ser Ile Glu Lys Thr Ile
            325                 330                 335

Ser Lys Ala Lys Gly Gln Pro Arg Glu Pro Gln Val Tyr Thr Leu Pro
            340                 345                 350

Pro Ser Gln Glu Glu Met Thr Lys Asn Gln Val Ser Leu Thr Cys Leu
            355                 360                 365

Val Lys Gly Phe Tyr Pro Ser Asp Ile Ala Val Glu Trp Glu Ser Asn
370                 375                 380

Gly Gln Pro Glu Asn Asn Tyr Lys Thr Thr Pro Pro Val Leu Asp Ser
385                 390                 395                 400

Asp Gly Ser Phe Phe Leu Tyr Ser Arg Leu Thr Val Asp Lys Ser Arg
            405                 410                 415

Trp Gln Glu Gly Asn Val Phe Ser Cys Ser Val Met His Glu Ala Leu
            420                 425                 430

His Asn His Tyr Thr Gln Lys Ser Leu Ser Leu Ser Leu Gly Lys
            435                 440                 445

<210> SEQ ID NO 58
<211> LENGTH: 215
<212> TYPE: PRT
<213> ORGANISM: Artificial
<220> FEATURE:
<223> OTHER INFORMATION: Synthetic

<400> SEQUENCE: 58

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Ser Ile Ser Ser Tyr
            20                  25                  30

Leu Asn Trp Tyr Gln Gln Lys Pro Gly Lys Ala Pro Lys Leu Leu Ile
            35                  40                  45

Tyr Ala Ala Ser Ser Leu Gln Ser Gly Val Pro Ser Arg Phe Ser Gly
        50                  55                  60

Ser Gly Ser Gly Thr Asp Phe Thr Leu Thr Ile Ser Ser Leu Gln Pro
65                  70                  75                  80

```
Glu Asp Phe Ala Thr Tyr Tyr Cys Gln Gln Ser Tyr Ser Thr Pro Pro
                85                  90                  95

Ile Thr Phe Gly Gln Gly Thr Arg Leu Glu Ile Lys Arg Thr Val Ala
            100                 105                 110

Ala Pro Ser Val Phe Ile Phe Pro Pro Ser Asp Glu Gln Leu Lys Ser
        115                 120                 125

Gly Thr Ala Ser Val Val Cys Leu Leu Asn Asn Phe Tyr Pro Arg Glu
    130                 135                 140

Ala Lys Val Gln Trp Lys Val Asp Asn Ala Leu Gln Ser Gly Asn Ser
145                 150                 155                 160

Gln Glu Ser Val Thr Glu Gln Asp Ser Lys Asp Ser Thr Tyr Ser Leu
                165                 170                 175

Ser Ser Thr Leu Thr Leu Ser Lys Ala Asp Tyr Glu Lys His Lys Val
            180                 185                 190

Tyr Ala Cys Glu Val Thr His Gln Gly Leu Ser Ser Pro Val Thr Lys
        195                 200                 205

Ser Phe Asn Arg Gly Glu Cys
    210                 215

<210> SEQ ID NO 59
<211> LENGTH: 443
<212> TYPE: PRT
<213> ORGANISM: Artificial
<220> FEATURE:
<223> OTHER INFORMATION: Synthetic

<400> SEQUENCE: 59

Glu Val Gln Leu Leu Glu Ser Gly Gly Val Leu Val Gln Pro Gly Gly
1               5                   10                  15

Ser Leu Arg Leu Ser Cys Ala Ala Ser Gly Phe Thr Phe Ser Asn Phe
            20                  25                  30

Gly Met Thr Trp Val Arg Gln Ala Pro Gly Lys Gly Leu Glu Trp Val
        35                  40                  45

Ser Gly Ile Ser Gly Gly Gly Arg Asp Thr Tyr Phe Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Lys Gly Glu Asp Thr Ala Val Tyr Tyr Cys
                85                  90                  95

Val Lys Trp Gly Asn Ile Tyr Phe Asp Tyr Trp Gly Gln Gly Thr Leu
            100                 105                 110

Val Thr Val Ser Ser Ala Ser Thr Lys Gly Pro Ser Val Phe Pro Leu
        115                 120                 125

Ala Pro Cys Ser Arg Ser Thr Ser Glu Ser Thr Ala Ala Leu Gly Cys
    130                 135                 140

Leu Val Lys Asp Tyr Phe Pro Glu Pro Val Thr Val Ser Trp Asn Ser
145                 150                 155                 160

Gly Ala Leu Thr Ser Gly Val His Thr Phe Pro Ala Val Leu Gln Ser
                165                 170                 175

Ser Gly Leu Tyr Ser Leu Ser Ser Val Val Thr Val Pro Ser Ser Ser
            180                 185                 190

Leu Gly Thr Lys Thr Tyr Thr Cys Asn Val Asp His Lys Pro Ser Asn
        195                 200                 205

Thr Lys Val Asp Lys Arg Val Glu Ser Lys Tyr Gly Pro Pro Cys Pro
    210                 215                 220
```

```
Pro Cys Pro Ala Pro Val Ala Gly Pro Ser Val Phe Leu Phe Pro
225                 230                 235                 240

Pro Lys Pro Lys Asp Thr Leu Met Ile Ser Arg Thr Pro Glu Val Thr
                245                 250                 255

Cys Val Val Asp Val Ser Gln Glu Asp Pro Glu Val Gln Phe Asn
                260                 265                 270

Trp Tyr Val Asp Gly Val Glu Val His Asn Ala Lys Thr Lys Pro Arg
            275                 280                 285

Glu Glu Gln Phe Asn Ser Thr Tyr Arg Val Val Ser Val Leu Thr Val
    290                 295                 300

Leu His Gln Asp Trp Leu Asn Gly Lys Glu Tyr Lys Cys Lys Val Ser
305                 310                 315                 320

Asn Lys Gly Leu Pro Ser Ser Ile Glu Lys Thr Ile Ser Lys Ala Lys
                325                 330                 335

Gly Gln Pro Arg Glu Pro Gln Val Tyr Thr Leu Pro Pro Ser Gln Glu
                340                 345                 350

Glu Met Thr Lys Asn Gln Val Ser Leu Thr Cys Leu Val Lys Gly Phe
            355                 360                 365

Tyr Pro Ser Asp Ile Ala Val Glu Trp Glu Ser Asn Gly Gln Pro Glu
            370                 375                 380

Asn Asn Tyr Lys Thr Thr Pro Pro Val Leu Asp Ser Asp Gly Ser Phe
385                 390                 395                 400

Phe Leu Tyr Ser Arg Leu Thr Val Asp Lys Ser Arg Trp Gln Glu Gly
                405                 410                 415

Asn Val Phe Ser Cys Ser Val Met His Glu Ala Leu His Asn His Tyr
                420                 425                 430

Thr Gln Lys Ser Leu Ser Leu Ser Leu Gly Lys
                435                 440

<210> SEQ ID NO 60
<211> LENGTH: 214
<212> TYPE: PRT
<213> ORGANISM: Artificial
<220> FEATURE:
<223> OTHER INFORMATION: Synthetic

<400> SEQUENCE: 60

Asp Ile Gln Met Thr Gln Ser Pro Ser Ser Leu Ser Ala Ser Val Gly
1               5                   10                  15

Asp Ser Ile Thr Ile Thr Cys Arg Ala Ser Leu Ser Ile Asn Thr Phe
                20                  25                  30

Leu Asn Trp Tyr Gln Gln Lys Pro Gly Lys Ala Pro Asn Leu Leu Ile
            35                  40                  45

Tyr Ala Ala Ser Ser Leu His Gly Gly Val Pro Ser Arg Phe Ser Gly
        50                  55                  60

Ser Gly Ser Gly Thr Asp Phe Thr Leu Thr Ile Arg Thr Leu Gln Pro
65                  70                  75                  80

Glu Asp Phe Ala Thr Tyr Tyr Cys Gln Gln Ser Ser Asn Thr Pro Phe
                85                  90                  95

Thr Phe Gly Pro Gly Thr Val Val Asp Phe Arg Arg Thr Val Ala Ala
                100                 105                 110

Pro Ser Val Phe Ile Phe Pro Pro Ser Asp Glu Gln Leu Lys Ser Gly
            115                 120                 125

Thr Ala Ser Val Val Cys Leu Leu Asn Asn Phe Tyr Pro Arg Glu Ala
        130                 135                 140
```

```
Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210
```

<210> SEQ ID NO 61
<211> LENGTH: 447
<212> TYPE: PRT
<213> ORGANISM: Artificial
<220> FEATURE:
<223> OTHER INFORMATION: Synthetic

<400> SEQUENCE: 61

```
Gln Val Gln Leu Val Gln Ser Gly Ala Glu Val Lys Arg Pro Gly Ser
1               5                   10                  15

Ser Val Lys Val Ser Cys Lys Val Ser Gly Val Thr Phe Arg Asn Phe
                20                  25                  30

Ala Ile Ile Trp Val Arg Gln Ala Pro Gly Gln Gly Leu Glu Trp Met
            35                  40                  45

Gly Gly Ile Ile Pro Phe Phe Ser Ala Ala Asn Tyr Ala Gln Ser Phe
        50                  55                  60

Gln Gly Arg Val Thr Ile Thr Pro Asp Glu Ser Thr Ser Thr Ala Phe
65                  70                  75                  80

Met Glu Leu Ala Ser Leu Arg Ser Glu Asp Thr Ala Val Tyr Tyr Cys
                85                  90                  95

Ala Arg Glu Gly Glu Arg Gly His Thr Tyr Gly Phe Asp Tyr Trp Gly
                100                 105                 110

Gln Gly Thr Leu Val Thr Val Ser Ser Ala Ser Thr Lys Gly Pro Ser
            115                 120                 125

Val Phe Pro Leu Ala Pro Cys Ser Arg Ser Thr Ser Glu Ser Thr Ala
        130                 135                 140

Ala Leu Gly Cys Leu Val Lys Asp Tyr Phe Pro Glu Pro Val Thr Val
145                 150                 155                 160

Ser Trp Asn Ser Gly Ala Leu Thr Ser Gly Val His Thr Phe Pro Ala
                165                 170                 175

Val Leu Gln Ser Ser Gly Leu Tyr Ser Leu Ser Ser Val Val Thr Val
            180                 185                 190

Pro Ser Ser Ser Leu Gly Thr Lys Thr Tyr Thr Cys Asn Val Asp His
        195                 200                 205

Lys Pro Ser Asn Thr Lys Val Asp Lys Arg Val Glu Ser Lys Tyr Gly
        210                 215                 220

Pro Pro Cys Pro Pro Cys Pro Ala Pro Val Ala Gly Pro Ser Val
225                 230                 235                 240

Phe Leu Phe Pro Pro Lys Pro Lys Asp Thr Leu Met Ile Ser Arg Thr
                245                 250                 255

Pro Glu Val Thr Cys Val Val Val Asp Val Ser Gln Glu Asp Pro Glu
            260                 265                 270

Val Gln Phe Asn Trp Tyr Val Asp Gly Val Glu Val His Asn Ala Lys
        275                 280                 285
```

Thr Lys Pro Arg Glu Glu Gln Phe Asn Ser Thr Tyr Arg Val Ser
    290                 295                 300

Val Leu Thr Val Leu His Gln Asp Trp Leu Asn Gly Lys Glu Tyr Lys
305                 310                 315                 320

Cys Lys Val Ser Asn Lys Gly Leu Pro Ser Ser Ile Glu Lys Thr Ile
                325                 330                 335

Ser Lys Ala Lys Gly Gln Pro Arg Glu Pro Gln Val Tyr Thr Leu Pro
            340                 345                 350

Pro Ser Gln Glu Glu Met Thr Lys Asn Gln Val Ser Leu Thr Cys Leu
            355                 360                 365

Val Lys Gly Phe Tyr Pro Ser Asp Ile Ala Val Glu Trp Glu Ser Asn
370                 375                 380

Gly Gln Pro Glu Asn Asn Tyr Lys Thr Thr Pro Pro Val Leu Asp Ser
385                 390                 395                 400

Asp Gly Ser Phe Phe Leu Tyr Ser Arg Leu Thr Val Asp Lys Ser Arg
                405                 410                 415

Trp Gln Glu Gly Asn Val Phe Ser Cys Ser Val Met His Glu Ala Leu
                420                 425                 430

His Asn His Tyr Thr Gln Lys Ser Leu Ser Leu Ser Leu Gly Lys
            435                 440                 445

<210> SEQ ID NO 62
<211> LENGTH: 215
<212> TYPE: PRT
<213> ORGANISM: Artificial
<220> FEATURE:
<223> OTHER INFORMATION: Synthetic

<400> SEQUENCE: 62

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Ser Ile Ser Ser Tyr
            20                  25                  30

Leu Asn Trp Tyr Gln Gln Lys Pro Gly Lys Ala Pro Lys Leu Leu Ile
        35                  40                  45

Tyr Ala Ala Ser Ser Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Ser Tyr Ser Thr Pro Pro
                85                  90                  95

Ile Thr Phe Gly Gln Gly Thr Arg Leu Glu Ile Lys Arg Thr Val Ala
            100                 105                 110

Ala Pro Ser Val Phe Ile Phe Pro Pro Ser Asp Glu Gln Leu Lys Ser
        115                 120                 125

Gly Thr Ala Ser Val Val Cys Leu Leu Asn Asn Phe Tyr Pro Arg Glu
    130                 135                 140

Ala Lys Val Gln Trp Lys Val Asp Asn Ala Leu Gln Ser Gly Asn Ser
145                 150                 155                 160

Gln Glu Ser Val Thr Glu Gln Asp Ser Lys Asp Ser Thr Tyr Ser Leu
                165                 170                 175

Ser Ser Thr Leu Thr Leu Ser Lys Ala Asp Tyr Glu Lys His Lys Val
            180                 185                 190

Tyr Ala Cys Glu Val Thr His Gln Gly Leu Ser Ser Pro Val Thr Lys
        195                 200                 205

```
Ser Phe Asn Arg Gly Glu Cys
    210                 215

<210> SEQ ID NO 63
<211> LENGTH: 781
<212> TYPE: PRT
<213> ORGANISM: Artificial
<220> FEATURE:
<223> OTHER INFORMATION: Synthetic

<400> SEQUENCE: 63

Glu Val Gln Leu Leu Glu Ser Gly Gly Val Leu Val Gln Pro Gly Gly
1               5                   10                  15

Ser Leu Arg Leu Ser Cys Ala Ala Ser Gly Phe Thr Phe Ser Asn Phe
            20                  25                  30

Gly Met Thr Trp Val Arg Gln Ala Pro Gly Lys Gly Leu Glu Trp Val
        35                  40                  45

Ser Gly Ile Ser Gly Gly Gly Arg Asp Thr Tyr Phe Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Lys Gly Glu Asp Thr Ala Val Tyr Tyr Cys
                85                  90                  95

Val Lys Trp Gly Asn Ile Tyr Phe Asp Tyr Trp Gly Gln Gly Thr Leu
            100                 105                 110

Val Thr Val Ser Ser Ala Ser Thr Lys Gly Pro Ser Val Phe Pro Leu
        115                 120                 125

Ala Pro Cys Ser Arg Ser Thr Ser Glu Ser Thr Ala Ala Leu Gly Cys
    130                 135                 140

Leu Val Lys Asp Tyr Phe Pro Glu Pro Val Thr Val Ser Trp Asn Ser
145                 150                 155                 160

Gly Ala Leu Thr Ser Gly Val His Thr Phe Pro Ala Val Leu Gln Ser
                165                 170                 175

Ser Gly Leu Tyr Ser Leu Ser Ser Val Val Thr Val Pro Ser Ser Ser
            180                 185                 190

Leu Gly Thr Lys Thr Tyr Thr Cys Asn Val Asp His Lys Pro Ser Asn
        195                 200                 205

Thr Lys Val Asp Lys Arg Val Glu Ser Lys Tyr Gly Pro Pro Cys Pro
    210                 215                 220

Pro Cys Pro Ala Pro Pro Val Ala Gly Pro Ser Val Phe Leu Phe Pro
225                 230                 235                 240

Pro Lys Pro Lys Asp Thr Leu Met Ile Ser Arg Thr Pro Glu Val Thr
                245                 250                 255

Cys Val Val Val Asp Val Ser Gln Glu Asp Pro Glu Val Gln Phe Asn
            260                 265                 270

Trp Tyr Val Asp Gly Val Glu Val His Asn Ala Lys Thr Lys Pro Arg
        275                 280                 285

Glu Glu Gln Phe Asn Ser Thr Tyr Arg Val Val Ser Val Leu Thr Val
    290                 295                 300

Leu His Gln Asp Trp Leu Asn Gly Lys Glu Tyr Lys Cys Lys Val Ser
305                 310                 315                 320

Asn Lys Gly Leu Pro Ser Ser Ile Glu Lys Thr Ile Ser Lys Ala Lys
                325                 330                 335

Gly Gln Pro Arg Glu Pro Gln Val Tyr Thr Leu Pro Pro Ser Gln Glu
            340                 345                 350
```

-continued

```
Glu Met Thr Lys Asn Gln Val Ser Leu Thr Cys Leu Val Lys Gly Phe
        355                 360                 365
Tyr Pro Ser Asp Ile Ala Val Glu Trp Glu Ser Asn Gly Gln Pro Glu
    370                 375                 380
Asn Asn Tyr Lys Thr Thr Pro Pro Val Leu Asp Ser Asp Gly Ser Phe
385                 390                 395                 400
Phe Leu Tyr Ser Arg Leu Thr Val Asp Lys Ser Arg Trp Gln Glu Gly
                405                 410                 415
Asn Val Phe Ser Cys Ser Val Met His Glu Ala Leu His Asn His Tyr
            420                 425                 430
Thr Gln Lys Ser Leu Ser Leu Ser Leu Gly Lys Gly Gly Gly Gly Ser
        435                 440                 445
Gly Gly Gly Gly Ser Gly Gly Gly Ser Glu Leu Cys Asp Asp Asp
450                 455                 460
Pro Pro Glu Ile Pro His Ala Thr Phe Lys Ala Met Ala Tyr Lys Glu
465                 470                 475                 480
Gly Thr Met Leu Asn Cys Glu Cys Lys Arg Gly Phe Arg Arg Ile Lys
                485                 490                 495
Ser Gly Ser Leu Tyr Met Leu Cys Thr Gly Asn Ser Ser His Ser Ser
            500                 505                 510
Trp Asp Asn Gln Cys Gln Cys Thr Ser Ser Ala Thr Arg Asn Thr Thr
        515                 520                 525
Lys Gln Val Thr Pro Gln Pro Glu Glu Gln Lys Glu Arg Lys Thr Thr
    530                 535                 540
Glu Met Gln Ser Pro Met Gln Pro Val Asp Gln Ala Ser Leu Pro Gly
545                 550                 555                 560
His Cys Arg Glu Pro Pro Pro Trp Glu Asn Glu Ala Thr Glu Arg Ile
                565                 570                 575
Tyr His Phe Val Val Gly Gln Met Val Tyr Tyr Gln Cys Val Gln Gly
            580                 585                 590
Tyr Arg Ala Leu His Arg Gly Pro Ala Glu Ser Val Cys Lys Met Thr
        595                 600                 605
His Gly Lys Thr Arg Trp Thr Gln Pro Gln Leu Ile Cys Thr Gly Gly
    610                 615                 620
Gly Gly Gly Ser Gly Gly Gly Ser Gly Gly Gly Ser Gly Gly
625                 630                 635                 640
Gly Gly Ser Gly Gly Gly Ser Ala Pro Thr Ser Ser Ser Thr Lys
            645                 650                 655
Lys Thr Gln Leu Gln Leu Glu His Leu Leu Asp Leu Gln Met Ile
        660                 665                 670
Leu Asn Gly Ile Asn Asn Tyr Lys Asn Pro Lys Leu Thr Arg Met Leu
    675                 680                 685
Thr Phe Lys Phe Tyr Met Pro Lys Lys Ala Thr Glu Leu Lys His Leu
    690                 695                 700
Gln Cys Leu Glu Glu Glu Leu Lys Pro Leu Glu Val Leu Asn Leu
705                 710                 715                 720
Ala Gln Ser Lys Asn Phe His Leu Arg Pro Arg Asp Leu Ile Ser Asn
                725                 730                 735
Ile Asn Val Ile Val Leu Glu Leu Lys Gly Ser Glu Thr Thr Phe Met
            740                 745                 750
Cys Glu Tyr Ala Asp Glu Thr Ala Thr Ile Val Glu Phe Leu Asn Arg
        755                 760                 765
```

```
Trp Ile Thr Phe Cys Gln Ser Ile Ile Ser Thr Leu Thr
        770                 775                 780
```

<210> SEQ ID NO 64
<211> LENGTH: 785
<212> TYPE: PRT
<213> ORGANISM: Artificial
<220> FEATURE:
<223> OTHER INFORMATION: Synthetic

<400> SEQUENCE: 64

```
Gln Val Gln Leu Val Gln Ser Gly Thr Glu Val Arg Lys Pro Gly Ser
1               5                   10                  15

Ser Val Lys Val Ser Cys Lys Thr Ser Gly Val Thr Phe Asn Asn Tyr
            20                  25                  30

Ala Ile Thr Trp Val Arg Gln Ala Pro Gly Gln Gly Leu Glu Trp Met
        35                  40                  45

Gly Gly Ile Ile Pro Val Phe Ser Pro Pro Asn Tyr Ala Gln Lys Phe
    50                  55                  60

Gln Gly Arg Val Thr Ile Thr Ala Asp Glu Ser Thr Asn Thr Ala Tyr
65                  70                  75                  80

Met Glu Leu Asn Ser Leu Arg Ser Asp Asp Thr Ala Ile Tyr Phe Cys
                85                  90                  95

Ala Arg Glu Gly Glu Arg Gly Tyr Thr Tyr Gly Tyr Asp Tyr Trp Gly
            100                 105                 110

Gln Gly Thr Leu Val Thr Val Ser Ala Ser Thr Lys Gly Pro Ser
        115                 120                 125

Val Phe Pro Leu Ala Pro Cys Ser Arg Ser Thr Ser Glu Ser Thr Ala
130                 135                 140

Ala Leu Gly Cys Leu Val Lys Asp Tyr Phe Pro Glu Pro Val Thr Val
145                 150                 155                 160

Ser Trp Asn Ser Gly Ala Leu Thr Ser Gly Val His Thr Phe Pro Ala
                165                 170                 175

Val Leu Gln Ser Ser Gly Leu Tyr Ser Leu Ser Ser Val Val Thr Val
            180                 185                 190

Pro Ser Ser Ser Leu Gly Thr Lys Thr Tyr Thr Cys Asn Val Asp His
        195                 200                 205

Lys Pro Ser Asn Thr Lys Val Asp Lys Arg Val Glu Ser Lys Tyr Gly
    210                 215                 220

Pro Pro Cys Pro Pro Cys Pro Ala Pro Pro Val Ala Gly Pro Ser Val
225                 230                 235                 240

Phe Leu Phe Pro Pro Lys Pro Lys Asp Thr Leu Met Ile Ser Arg Thr
                245                 250                 255

Pro Glu Val Thr Cys Val Val Val Asp Val Ser Gln Glu Asp Pro Glu
            260                 265                 270

Val Gln Phe Asn Trp Tyr Val Asp Gly Val Glu Val His Asn Ala Lys
        275                 280                 285

Thr Lys Pro Arg Glu Glu Gln Phe Asn Ser Thr Tyr Arg Val Val Ser
    290                 295                 300

Val Leu Thr Val Leu His Gln Asp Trp Leu Asn Gly Lys Glu Tyr Lys
305                 310                 315                 320

Cys Lys Val Ser Asn Lys Gly Leu Pro Ser Ser Ile Glu Lys Thr Ile
                325                 330                 335

Ser Lys Ala Lys Gly Gln Pro Arg Glu Pro Gln Val Tyr Thr Leu Pro
            340                 345                 350
```

-continued

```
Pro Ser Gln Glu Met Thr Lys Asn Gln Val Ser Leu Thr Cys Leu
        355                 360                 365

Val Lys Gly Phe Tyr Pro Ser Asp Ile Ala Val Glu Trp Glu Ser Asn
370                 375                 380

Gly Gln Pro Glu Asn Asn Tyr Lys Thr Thr Pro Pro Val Leu Asp Ser
385                 390                 395                 400

Asp Gly Ser Phe Phe Leu Tyr Ser Arg Leu Thr Val Asp Lys Ser Arg
                405                 410                 415

Trp Gln Glu Gly Asn Val Phe Ser Cys Ser Val Met His Glu Ala Leu
            420                 425                 430

His Asn His Tyr Thr Gln Lys Ser Leu Ser Leu Ser Leu Gly Lys Gly
        435                 440                 445

Gly Gly Gly Ser Gly Gly Gly Ser Gly Gly Gly Ser Glu Leu
450                 455                 460

Cys Asp Asp Asp Pro Glu Ile Pro His Ala Thr Phe Lys Ala Met
465                 470                 475                 480

Ala Tyr Lys Glu Gly Thr Met Leu Asn Cys Glu Cys Lys Arg Gly Phe
                485                 490                 495

Arg Arg Ile Lys Ser Gly Ser Leu Tyr Met Leu Cys Thr Gly Asn Ser
                500                 505                 510

Ser His Ser Ser Trp Asp Asn Gln Cys Gln Cys Thr Ser Ser Ala Thr
        515                 520                 525

Arg Asn Thr Thr Lys Gln Val Thr Pro Gln Pro Glu Gln Lys Glu
        530                 535                 540

Arg Lys Thr Thr Glu Met Gln Ser Pro Met Gln Pro Val Asp Gln Ala
545                 550                 555                 560

Ser Leu Pro Gly His Cys Arg Glu Pro Pro Trp Glu Asn Glu Ala
                565                 570                 575

Thr Glu Arg Ile Tyr His Phe Val Val Gly Gln Met Val Tyr Tyr Gln
                580                 585                 590

Cys Val Gln Gly Tyr Arg Ala Leu His Arg Gly Pro Ala Glu Ser Val
            595                 600                 605

Cys Lys Met Thr His Gly Lys Thr Arg Trp Thr Gln Pro Gln Leu Ile
610                 615                 620

Cys Thr Gly Gly Gly Gly Ser Gly Gly Gly Ser Gly Gly
625                 630                 635                 640

Gly Ser Gly Gly Gly Ser Gly Gly Gly Ser Ala Pro Thr Ser
                645                 650                 655

Ser Ser Thr Lys Lys Thr Gln Leu Gln Leu Glu His Leu Leu Asp
        660                 665                 670

Leu Gln Met Ile Leu Asn Gly Ile Asn Asn Tyr Lys Asn Pro Lys Leu
            675                 680                 685

Thr Arg Met Leu Thr Phe Lys Phe Tyr Met Pro Lys Lys Ala Thr Glu
690                 695                 700

Leu Lys His Leu Gln Cys Leu Glu Glu Glu Leu Lys Pro Leu Glu Glu
705                 710                 715                 720

Val Leu Asn Leu Ala Gln Ser Lys Asn Phe His Leu Arg Pro Arg Asp
                725                 730                 735

Leu Ile Ser Asn Ile Asn Val Ile Val Leu Glu Leu Lys Gly Ser Glu
                740                 745                 750

Thr Thr Phe Met Cys Glu Tyr Ala Asp Glu Thr Ala Thr Ile Val Glu
            755                 760                 765

Phe Leu Asn Arg Trp Ile Thr Phe Cys Gln Ser Ile Ile Ser Thr Leu
```

-continued

```
            770                 775                 780
Thr
785

<210> SEQ ID NO 65
<211> LENGTH: 785
<212> TYPE: PRT
<213> ORGANISM: Artificial
<220> FEATURE:
<223> OTHER INFORMATION: Synthetic

<400> SEQUENCE: 65

Gln Val Gln Leu Val Gln Ser Gly Ala Glu Val Lys Arg Pro Gly Ser
1               5                   10                  15

Ser Val Lys Val Ser Cys Lys Val Ser Gly Val Thr Phe Arg Asn Phe
            20                  25                  30

Ala Ile Ile Trp Val Arg Gln Ala Pro Gly Gln Gly Leu Glu Trp Met
        35                  40                  45

Gly Gly Ile Ile Pro Phe Phe Ser Ala Ala Asn Tyr Ala Gln Ser Phe
    50                  55                  60

Gln Gly Arg Val Thr Ile Thr Pro Asp Glu Ser Thr Ser Thr Ala Phe
65                  70                  75                  80

Met Glu Leu Ala Ser Leu Arg Ser Glu Asp Thr Ala Val Tyr Tyr Cys
                85                  90                  95

Ala Arg Glu Gly Glu Arg Gly His Thr Tyr Gly Phe Asp Tyr Trp Gly
            100                 105                 110

Gln Gly Thr Leu Val Thr Val Ser Ser Ala Ser Thr Lys Gly Pro Ser
        115                 120                 125

Val Phe Pro Leu Ala Pro Cys Ser Arg Ser Thr Ser Glu Ser Thr Ala
    130                 135                 140

Ala Leu Gly Cys Leu Val Lys Asp Tyr Phe Pro Glu Pro Val Thr Val
145                 150                 155                 160

Ser Trp Asn Ser Gly Ala Leu Thr Ser Gly Val His Thr Phe Pro Ala
                165                 170                 175

Val Leu Gln Ser Ser Gly Leu Tyr Ser Leu Ser Ser Val Val Thr Val
            180                 185                 190

Pro Ser Ser Ser Leu Gly Thr Lys Thr Tyr Thr Cys Asn Val Asp His
        195                 200                 205

Lys Pro Ser Asn Thr Lys Val Asp Lys Arg Val Glu Ser Lys Tyr Gly
    210                 215                 220

Pro Pro Cys Pro Pro Cys Pro Ala Pro Val Ala Gly Pro Ser Val
225                 230                 235                 240

Phe Leu Phe Pro Pro Lys Pro Lys Asp Thr Leu Met Ile Ser Arg Thr
                245                 250                 255

Pro Glu Val Thr Cys Val Val Asp Val Ser Gln Glu Asp Pro Glu
            260                 265                 270

Val Gln Phe Asn Trp Tyr Val Asp Gly Val Glu Val His Asn Ala Lys
        275                 280                 285

Thr Lys Pro Arg Glu Glu Gln Phe Asn Ser Thr Tyr Arg Val Val Ser
    290                 295                 300

Val Leu Thr Val Leu His Gln Asp Trp Leu Asn Gly Lys Glu Tyr Lys
305                 310                 315                 320

Cys Lys Val Ser Asn Lys Gly Leu Pro Ser Ser Ile Glu Lys Thr Ile
                325                 330                 335

Ser Lys Ala Lys Gly Gln Pro Arg Glu Pro Gln Val Tyr Thr Leu Pro
```

-continued

```
                340                 345                 350
    Pro Ser Gln Glu Glu Met Thr Lys Asn Gln Val Ser Leu Thr Cys Leu
                355                 360                 365
    Val Lys Gly Phe Tyr Pro Ser Asp Ile Ala Val Glu Trp Glu Ser Asn
                370                 375                 380
    Gly Gln Pro Glu Asn Asn Tyr Lys Thr Thr Pro Pro Val Leu Asp Ser
385                 390                 395                 400
    Asp Gly Ser Phe Phe Leu Tyr Ser Arg Leu Thr Val Asp Lys Ser Arg
                405                 410                 415
    Trp Gln Glu Gly Asn Val Phe Ser Cys Ser Val Met His Glu Ala Leu
                420                 425                 430
    His Asn His Tyr Thr Gln Lys Ser Leu Ser Leu Ser Leu Gly Lys Gly
                435                 440                 445
    Gly Gly Gly Ser Gly Gly Gly Ser Gly Gly Gly Ser Glu Leu
                450                 455                 460
    Cys Asp Asp Pro Pro Glu Ile Pro His Ala Thr Phe Lys Ala Met
465                 470                 475                 480
    Ala Tyr Lys Glu Gly Thr Met Leu Asn Cys Glu Cys Lys Arg Gly Phe
                485                 490                 495
    Arg Arg Ile Lys Ser Gly Ser Leu Tyr Met Leu Cys Thr Gly Asn Ser
                500                 505                 510
    Ser His Ser Ser Trp Asp Asn Gln Cys Gln Cys Thr Ser Ser Ala Thr
                515                 520                 525
    Arg Asn Thr Thr Lys Gln Val Thr Pro Gln Pro Glu Glu Gln Lys Glu
                530                 535                 540
    Arg Lys Thr Thr Glu Met Gln Ser Pro Met Gln Pro Val Asp Gln Ala
545                 550                 555                 560
    Ser Leu Pro Gly His Cys Arg Glu Pro Pro Pro Trp Glu Asn Glu Ala
                565                 570                 575
    Thr Glu Arg Ile Tyr His Phe Val Val Gly Gln Met Val Tyr Tyr Gln
                580                 585                 590
    Cys Val Gln Gly Tyr Arg Ala Leu His Arg Gly Pro Ala Glu Ser Val
                595                 600                 605
    Cys Lys Met Thr His Gly Lys Thr Arg Trp Thr Gln Pro Gln Leu Ile
                610                 615                 620
    Cys Thr Gly Gly Gly Gly Ser Gly Gly Gly Ser Gly Gly Gly
625                 630                 635                 640
    Gly Ser Gly Gly Gly Ser Gly Gly Gly Ser Ala Pro Thr Ser
                645                 650                 655
    Ser Ser Thr Lys Lys Thr Gln Leu Gln Leu Glu His Leu Leu Leu Asp
                660                 665                 670
    Leu Gln Met Ile Leu Asn Gly Ile Asn Asn Tyr Lys Asn Pro Lys Leu
                675                 680                 685
    Thr Arg Met Leu Thr Phe Lys Phe Tyr Met Pro Lys Lys Ala Thr Glu
                690                 695                 700
    Leu Lys His Leu Gln Cys Leu Glu Glu Glu Leu Lys Pro Leu Glu Glu
705                 710                 715                 720
    Val Leu Asn Leu Ala Gln Ser Lys Asn Phe His Leu Arg Pro Arg Asp
                725                 730                 735
    Leu Ile Ser Asn Ile Asn Val Ile Val Leu Glu Leu Lys Gly Ser Glu
                740                 745                 750
    Thr Thr Phe Met Cys Glu Tyr Ala Asp Glu Thr Ala Thr Ile Val Glu
                755                 760                 765
```

```
Phe Leu Asn Arg Trp Ile Thr Phe Cys Gln Ser Ile Ile Ser Thr Leu
    770                 775                 780
Thr
785

<210> SEQ ID NO 66
<211> LENGTH: 174
<212> TYPE: PRT
<213> ORGANISM: Artificial
<220> FEATURE:
<223> OTHER INFORMATION: Synthetic

<400> SEQUENCE: 66

Leu Asp Ser Pro Asp Arg Pro Trp Asn Pro Thr Phe Ser Pro Ala
1               5                   10                  15

Leu Leu Val Val Thr Glu Gly Asp Asn Ala Thr Phe Thr Cys Ser Phe
            20                  25                  30

Ser Asn Thr Ser Glu Ser Phe Val Leu Asn Trp Tyr Arg Met Ser Pro
        35                  40                  45

Ser Asn Gln Thr Asp Lys Leu Ala Ala Phe Pro Glu Asp Arg Ser Gln
    50                  55                  60

Pro Gly Gln Asp Ser Arg Phe Arg Val Thr Gln Leu Pro Asn Gly Arg
65                  70                  75                  80

Asp Phe His Met Ser Val Val Arg Ala Arg Arg Asn Asp Ser Gly Thr
                85                  90                  95

Tyr Leu Cys Gly Ala Ile Ser Leu Ala Pro Lys Ala Gln Ile Lys Glu
            100                 105                 110

Ser Leu Arg Ala Glu Leu Arg Val Thr Glu Arg Arg Ala Glu Val Pro
        115                 120                 125

Thr Ala His Pro Ser Pro Ser Pro Arg Pro Ala Gly Gln Phe Gln Thr
    130                 135                 140

Leu Val Glu Gln Lys Leu Ile Ser Glu Glu Asp Leu Gly Gly Glu Gln
145                 150                 155                 160

Lys Leu Ile Ser Glu Glu Asp Leu His His His His His
                165                 170

<210> SEQ ID NO 67
<211> LENGTH: 5
<212> TYPE: PRT
<213> ORGANISM: Artificial
<220> FEATURE:
<223> OTHER INFORMATION: Synthetic

<400> SEQUENCE: 67

Gly Gly Gly Gly Ser
1               5

<210> SEQ ID NO 68
<211> LENGTH: 4
<212> TYPE: PRT
<213> ORGANISM: Artificial
<220> FEATURE:
<223> OTHER INFORMATION: Synthetic

<400> SEQUENCE: 68

Gly Gly Gly Gly
1

<210> SEQ ID NO 69
<211> LENGTH: 5
```

-continued

```
<212> TYPE: PRT
<213> ORGANISM: Artificial
<220> FEATURE:
<223> OTHER INFORMATION: Synthetic

<400> SEQUENCE: 69

Gly Gly Gly Gly Gly
1               5

<210> SEQ ID NO 70
<211> LENGTH: 6
<212> TYPE: PRT
<213> ORGANISM: Artificial
<220> FEATURE:
<223> OTHER INFORMATION: Synthetic

<400> SEQUENCE: 70

Gly Gly Gly Gly Gly Gly
1               5

<210> SEQ ID NO 71
<211> LENGTH: 7
<212> TYPE: PRT
<213> ORGANISM: Artificial
<220> FEATURE:
<223> OTHER INFORMATION: Synthetic

<400> SEQUENCE: 71

Gly Gly Gly Gly Gly Gly Gly
1               5

<210> SEQ ID NO 72
<211> LENGTH: 8
<212> TYPE: PRT
<213> ORGANISM: Artificial
<220> FEATURE:
<223> OTHER INFORMATION: Synthetic

<400> SEQUENCE: 72

Gly Gly Gly Gly Gly Gly Gly Gly
1               5

<210> SEQ ID NO 73
<211> LENGTH: 9
<212> TYPE: PRT
<213> ORGANISM: Artificial
<220> FEATURE:
<223> OTHER INFORMATION: Synthetic

<400> SEQUENCE: 73

Gly Gly Gly Gly Gly Gly Gly Gly Gly
1               5

<210> SEQ ID NO 74
<211> LENGTH: 366
<212> TYPE: PRT
<213> ORGANISM: Artificial
<220> FEATURE:
<223> OTHER INFORMATION: Synthetic

<400> SEQUENCE: 74

Ala Pro Thr Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
                20                  25                  30

Asn Pro Lys Leu Thr Arg Met Leu Thr Phe Lys Phe Tyr Met Pro Lys
```

```
            35                  40                  45
Lys Ala Thr Glu Leu Lys His Leu Gln Cys Leu Glu Glu Leu Lys
 50                  55                  60

Pro Leu Glu Glu Val Leu Asn Leu Ala Gln Ser Lys Asn Phe His Leu
 65                  70                  75                  80

Arg Pro Arg Asp Leu Ile Ser Asn Ile Asn Val Ile Val Leu Glu Leu
                 85                  90                  95

Lys Gly Ser Glu Thr Thr Phe Met Cys Glu Tyr Ala Asp Glu Thr Ala
                100                 105                 110

Thr Ile Val Glu Phe Leu Asn Arg Trp Ile Thr Phe Cys Gln Ser Ile
                115                 120                 125

Ile Ser Thr Leu Thr Gly Gly Gly Ser Glu Ser Lys Tyr Gly Pro
130                 135                 140

Pro Cys Pro Pro Cys Pro Ala Pro Pro Val Ala Gly Pro Ser Val Phe
145                 150                 155                 160

Leu Phe Pro Pro Lys Pro Lys Asp Thr Leu Met Ile Ser Arg Thr Pro
                165                 170                 175

Glu Val Thr Cys Val Val Val Asp Val Ser Gln Glu Asp Pro Glu Val
                180                 185                 190

Gln Phe Asn Trp Tyr Val Asp Gly Val Glu Val His Asn Ala Lys Thr
                195                 200                 205

Lys Pro Arg Glu Glu Gln Phe Asn Ser Thr Tyr Arg Val Val Ser Val
210                 215                 220

Leu Thr Val Leu His Gln Asp Trp Leu Asn Gly Lys Glu Tyr Lys Cys
225                 230                 235                 240

Lys Val Ser Asn Lys Gly Leu Pro Ser Ser Ile Glu Lys Thr Ile Ser
                245                 250                 255

Lys Ala Lys Gly Gln Pro Arg Glu Pro Gln Val Tyr Thr Leu Pro Pro
                260                 265                 270

Ser Gln Glu Glu Met Thr Lys Asn Gln Val Ser Leu Thr Cys Leu Val
                275                 280                 285

Lys Gly Phe Tyr Pro Ser Asp Ile Ala Val Glu Trp Glu Ser Asn Gly
                290                 295                 300

Gln Pro Glu Asn Asn Tyr Lys Thr Thr Pro Pro Val Leu Asp Ser Asp
305                 310                 315                 320

Gly Ser Phe Phe Leu Tyr Ser Arg Leu Thr Val Asp Lys Ser Arg Trp
                325                 330                 335

Gln Glu Gly Asn Val Phe Ser Cys Ser Val Met His Glu Ala Leu His
                340                 345                 350

Asn His Tyr Thr Gln Lys Ser Leu Ser Leu Ser Leu Gly Lys
                355                 360                 365
```

<210> SEQ ID NO 75
<211> LENGTH: 133
<212> TYPE: PRT
<213> ORGANISM: Artificial
<220> FEATURE:
<223> OTHER INFORMATION: Synthetic

<400> SEQUENCE: 75

```
Ala Pro Thr Ser Ser Ser Thr Lys Lys Thr Gln Leu Gln Leu Glu His
 1               5                  10                  15

Leu Leu Leu Asp Leu Gln Met Ile Leu Asn Gly Ile Asn Asn Tyr Lys
                20                  25                  30

Asn Pro Lys Leu Thr Arg Met Leu Thr Phe Lys Phe Tyr Met Pro Lys
```

```
                35                    40                    45
Lys Ala Thr Glu Leu Lys His Leu Gln Cys Leu Glu Glu Glu Leu Lys
        50                    55                    60

Pro Leu Glu Glu Val Leu Asn Leu Ala Gln Ser Lys Asn Phe His Leu
65                      70                    75                    80

Arg Pro Arg Asp Leu Ile Ser Asn Ile Asn Val Ile Val Leu Glu Leu
                85                    90                    95

Lys Gly Ser Glu Thr Thr Phe Met Cys Glu Tyr Ala Asp Glu Thr Ala
                100                   105                   110

Thr Ile Val Glu Phe Leu Asn Arg Trp Ile Thr Phe Cys Gln Ser Ile
            115                   120                   125

Ile Ser Thr Leu Thr
        130
```